(12) United States Patent
Sawaki et al.

(10) Patent No.: US 6,396,636 B2
(45) Date of Patent: May 28, 2002

(54) OPTICAL DEVICE AND DISPLAY DEVICE USING THE SAME

(75) Inventors: Ippei Sawaki; Michio Miura; Fumitaka Abe, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/810,775

(22) Filed: Mar. 16, 2001

Related U.S. Application Data

(63) Continuation of application No. PCT/JP99/04315, filed on Aug. 9, 1999.

(30) Foreign Application Priority Data

| Sep. 16, 1998 | (JP) | 10-261809 |
| Nov. 19, 1998 | (JP) | 10-329307 |
| Mar. 11, 1999 | (JP) | 11-065465 |

(51) Int. Cl.⁷ ............................................. G02B 27/10
(52) U.S. Cl. ...................... 359/624; 359/623; 359/619
(58) Field of Search .......................... 359/457, 619, 359/622, 621, 623, 624, 464, 455, 542, 599; 250/204

(56) References Cited

U.S. PATENT DOCUMENTS

| 2,303,113 A | * | 11/1942 | Eckel ........................ 359/542 |
| 4,230,942 A | * | 10/1980 | Stauffer .................... 250/204 |
| 4,336,978 A | * | 6/1982 | Suzuki ...................... 359/599 |
| 4,531,812 A | * | 7/1985 | Oguino ...................... 359/457 |
| 5,396,350 A |   | 3/1995 | Beeson et al. ............... 349/62 |
| 6,046,846 A | * | 4/2000 | van de Ven ................. 359/455 |
| 6,061,179 A | * | 5/2000 | Inoguchi et al. ............. 359/464 |
| 6,215,594 B1 | * | 4/2001 | Inoguchi et al. ............. 359/619 |
| 6,292,294 B1 | * | 9/2001 | Takahasi et al. ............ 359/455 |

FOREIGN PATENT DOCUMENTS

| JP | 5-281508 | | 10/1993 | |
| JP | 6-118204 | * | 4/1994 | ............ G02B/3/00 |
| JP | 6-250117 | | 9/1994 | |
| JP | 7-072809 | | 3/1995 | |
| JP | 63142318 | | 6/1998 | |
| JP | 10-253920 | | 9/1998 | |
| WO | WO 89/04979 | | 6/1989 | |
| WO | WO 97/04352 | | 9/1997 | |

\* cited by examiner

*Primary Examiner*—Georgia Epps
*Assistant Examiner*—Gary O'Neill
(74) *Attorney, Agent, or Firm*—Greer, Burns & Crain, Ltd.

(57) ABSTRACT

An optical device comprising an image formation unit consisting of a plurality of lens substrates each formed on the front and rear faces thereof with lens arrays and a display unit disposed on an object surface with respect to the image formation unit and displaying an image to be projected by the image formation unit, characterized in that the lens array is a cylindrical lens array and the generating line of a cylindrical array formed on the front face and the generating line of a cylindrical array formed on the rear face cross each other. The lens substrate formed on the front and rear faces thereof with cylindrical lens array is used to provide a small lightweight optical device of a full-size or magnified image system.

45 Claims, 52 Drawing Sheets

SURFACE WITH FLECKED EFFECT

SURFACE WITH FLECKED EFFECT

FIG. 39 (a) X-DIRECTION LIGHT-SHIELDING WALL
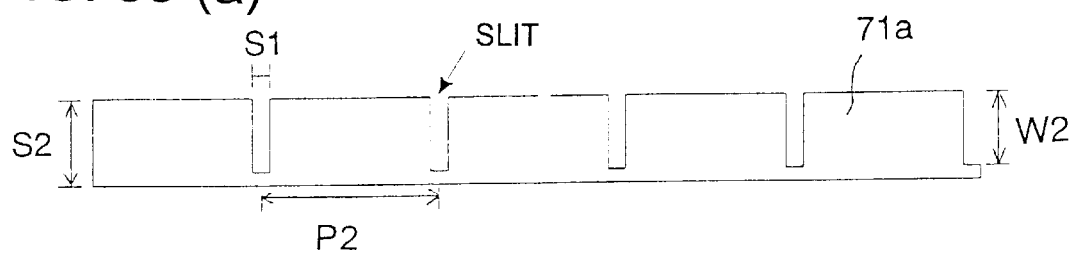
FIG. 39 (b) Y-DIRECTION LIGHT-SHIELDING WALL
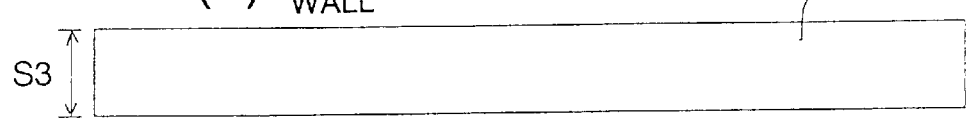

PATTERN OF GROOVES

71

PATTERN OF HOLES

71

LIGHT REFLECTED BY FACE OF LIGHT-SHIELDING WALL

OPTICAL DEVICE AND DISPLAY DEVICE USING THE SAME

This is a continuation of International Application No. PCT/JP99/04315 filed Aug. 9, 1999 and not published in English.

TECHNICAL FIELD

The present invention relates to an optical device, more particularly, an optical device of a full-size or magnified image forming type which can be used for a lightweight low-profile flat display.

BACKGROUND ART

Recently lightweight low-profile flat displays such as LCDs and PDPs have been becoming widespread, and larger screens of higher definition are expected.
However, it is difficult to apply a micromachining (micropatterning) process, which is used for LCDs and the like, to a large-size substrate from the viewpoint of yield. Taking the yield into account, it is considered to be desirable to combine several small-size substrates to form a large screen.

For this purpose, there can be proposed a method of producing a large screen by connecting a plurality of small-sized substrates without gaps. However, this method involves great difficulty during manufacture in view of precise alignment, complicated wiring and others.

Also a so-called multi-panel display is proposed which is a method of arranging a plurality of already assembled displays of small size, placing optical devices for magnifying images in front of the respective displays and connecting respective images of the displays without boundary lines for a large screen. This multi-panel display is considered promising since magnification is easy. For realization of the multi-panel display, optical devices of a magnified image formation system with a large aperture (e.g., 18 cm×24 cm).

As such an optical device of the magnified image formation system, is conventionally proposed a combination of a rod lens array having the function of forming erect full-size images and a Fresnel lens for magnifying images.

However, since the rod lens array is typically produced of a large number of cylindrical glass lenses in a bundle, the rod lens array with a large aperture is heavy and expensive.

For further spread of multi-panel displays, there is a demand for a reduction in the price and a decrease in the weight of optical devices. Further, the Fresnel lens has a problem in that, if is magnifying power is increased, utilization efficiency decreases in a peripheral part of the lens and brightness becomes uneven.

DISCLOSURE OF INVENTION

An object of the present invention is to provide an optical device of an erect full-size image formation system or magnified image formation system with use of lens substrates formed with cylindrical lens arrays on a front and a rear face thereof.

The present invention provides an optical device characterized by including an image formation unit having a plurality of lens substrates each formed with lens arrays on both a front face and a rear face thereof; and a display unit disposed on an object side with respect to the image formation unit for displaying an image to be projected by the image formation unit, wherein, on each of said plurality of lens substrates, the lens array on both the front and rear faces are cylindrical lens arrays, and the generatrix of the cylindrical array formed on the front face and the generatrix of the cylindrical array formed on the rear face are orthogonal to each other.

Further said plurality of lens substrates may be constructed of a first lens substrate; a second lens substrate having the same lens shape as that of the lens array on the first lens substrate and disposed adjacently to the first lens substrate so that the generatrix of the lens array on a face opposing to the first lens substrate is parallel to the generatrix of the lens array on an opposing face of the first lens substrate; a third lens substrate disposed adjacently to the first lens substrate on a different side from a second lens substrate side with respect to the first lens substrate so that the generatrix of the lens array on a face opposing to the first lens substrate is orthogonal to the generatrix of the lens array on an opposing face of the first lens substrate; and a fourth lens substrate having the same lens shape as that of the lens array on the third lens substrate and disposed adjacently to the second lens substrate on a different side from a first lens substrate side with respect to the second lens substrate so that the generatrix of the lens array on a face opposing to the second lens substrate is orthogonal to the generatrix of the lens array on an opposing face of the second lens substrate. Thereby obtained is an optical device of the erect full-size image formation system.

Further the present invention provides an optical device further comprising a Fresnel concave lens disposed between the image formation unit and the display unit adjacently to a display face of the display unit.

Here, the plurality of lens substrates may be so constructed that it is composed of a first lens substrate; a second lens substrate disposed adjacently to the first lens substrate so that the generatrix of the lens array on a face opposing to the first lens substrate is parallel to the generatrix of the lens array on an opposing face of the first lens substrate; a third lens substrate disposed adjacently to the first lens substrate on a different side from a second lens substrate side with respect to the first lens substrate so that the generatrix of the lens array on a face opposing to the first lens substrate is orthogonal to the generatrix of the lens array on an opposing face of the first lens substrate; and a fourth lens substrate disposed adjacently to the second lens substrate on a different side from a first lens substrate side with respect to the second lens substrate so that the generatrix of the lens array on a face opposing to the second lens substrate is orthogonal to the generatrix of the lens array on an opposing face of the second lens substrate, and that the pitch of the lens array on lens substrate disposed nearest to the display unit is the smallest and the pitches of the lens arrays on the lens substrates are set to be gradually larger as the lens substrates are farther from the display unit. With this construction, obtained is an optical device of the magnified image formation system.

BRIEF DESCRIPTION OF DRAWINGS

FIGS. 39(a) and 39(b) are views illustrating the construction of an example of a light-shielding wall in accordance with the present invention;

BEST MODE FOR CARRYING OUT THE INVENTION

Figure 1:
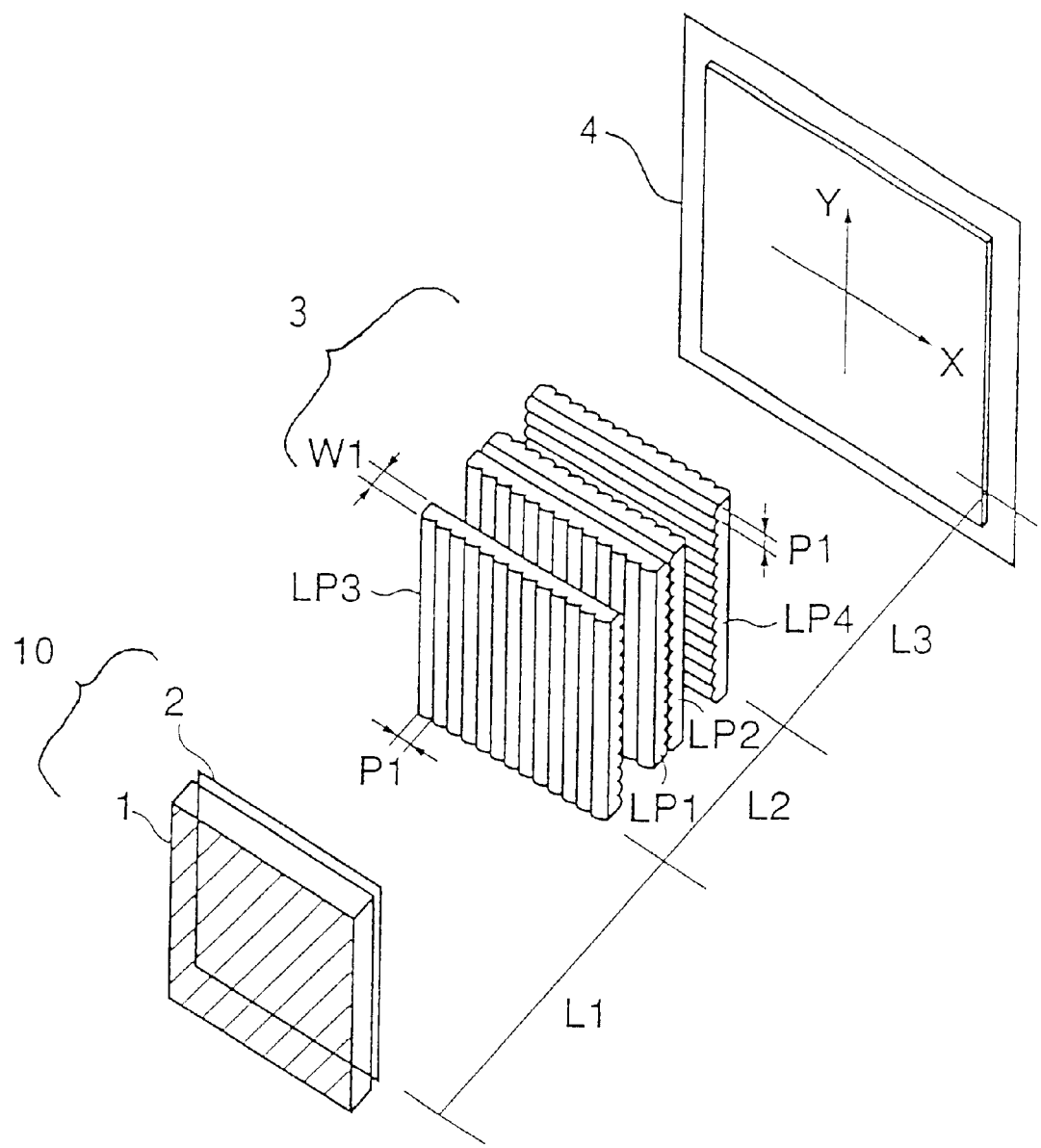
FIG. 1 is a schematic perspective view of an example of an optical device in accordance with the present invention.

In the case where the image formation unit of the present invention is constructed of at least four lens substrates, two lens substrates in the center, i.e., the first lens substrate and the second lens substrate, are preferably in close contact from the viewpoint of image-forming performance. However, a spacer substrate may intervene between the first lens substrate and the second lens substrate.

Also, it is preferable from the viewpoint of the image-forming performance that the display unit emits light toward the image formation unit, that a major part of the light is included within angles of radiation of ±20 degrees or less and that each of the lens arrays formed on the four lens substrates has such a lens aperture width and lens pitch as to prevent cross talk between adjacent lenses constituting the lens array.

Also, it is preferable for keeping constant the intervals between the lens substrates to place spacer plates between the first lens substrate and the third lens substrate and between the second lens substrate and the fourth lens substrate.

Further, the spacer plate may be formed of a resin plate or a metal plate having a large number of openings in a lattice form.

Also, the spacer plate may be formed by combining metal plates in parallel crosses.

Also, according to the present invention, the first lens plate and the third lens plate, the first lens plate and the second lens plate, and the second lens plate and the fourth lens plate may be in close contact, respectively.

Here, protrusions may be formed at joints between lenses of the lens arrays on opposing surfaces of two lens substrates contacted closely to each other.

Further, the present invention provides an optical device characterized by including an image formation unit having two lens substrates with a plurality of lenses formed on both a front face and a rear face thereof; and a display unit disposed on an object side with respect to the image formation unit for displaying an image to be projected by the image formation unit, wherein, on each of the lens substrates, the lenses are so arranged two-dimensionally on the front and rear faces of the lens substrates that optical axes of a pair of opposing lenses on the front and rear faces agree with each other.

Here, it is preferable for obtaining good image formation characteristics that the plurality of lenses formed on both the front and rear faces of the lens substrates are arranged at the highest density. The highest density arrangement means that the lenses are arranged without gaps therebetween on both the front and rear faces of the lens substrates.

Further, the present invention provides an optical device characterized by comprising an image formation unit having a plurality of lens substrates each formed with lens arrays on both a front face and a rear face thereof; a display unit disposed on an object side with respect to the image formation unit for displaying an image to be projected by the image formation unit; a Fresnel concave lens between the image formation unit and the display unit adjacently to a display face of the display unit, wherein each lens of each lens array is so formed that its optical axis substantially agrees with a traveling direction of light passing near the apex of the lens.

Here, parameters of the lenses of the lens arrays may be so adjusted that the image formation characteristics are optimized with regard to light passing at or near the apex of the lens.

Further, cylindrical lens arrays may be used as the lens arrays formed on both the front and rear faces of each of the plurality of lens substrates, and the generatrix of the cylindrical lens array formed on one face of each lens substrate may be orthogonal to the generatrix of the cylindrical lens array formed of the other face. In the case of using lens substrates formed with cylindrical lens array, the optical device may be composed of four lens substrates.

Furthermore, the image formation unit may be constructed of two lens substrate, each of which is formed with two-dimensional lens arrays on its front and rear faces.

Here, in the two-dimensional lens arrays of the lens substrates, lenses of specific shape may be arranged at the highest density.

Also, it is preferable, from the viewpoint of preventing the cross talk, that the array pitch of the lens array on each of the lens substrates is larger in a peripheral part of the lens substrate than in a central part of the lens substrate.

Further, protrusions may be formed at joints of the lenses of the lens arrays of the lens substrates.

Also, in the case where a display device for forming magnified images is made by combining optical devices as described above, it is preferable a Fresnel convex lens is placed between the image formation unit of the optical device and a screen on which the magnified images are displayed, at a position adjacent to the screen.

The present invention is now described in detail with reference to embodiments as shown in the drawings. However, the present invention is not limited thereto.

FIG. 1 shows an overall schematic perspective view of an optical device in accordance with the present invention.

FIG. 1 shows a major construction of an optical device of the full-size image formation system.

The optical device is constructed of a screen 4 on which an image actually seen by a user is projected, a display unit 10 for generating an original image of the image displayed on the screen 4, and an image formation unit 3 for forming the image generated by the display unit on the screen.

The display unit 10, as shown in FIG. 1, is constructed of a backlight 1 and an LCD panel 2, for example. The image formation unit 3 is typically constructed of several cylindrical lens plates 3, but FIG. 1 shows a construction in which four cylindrical lens plates (LP1 to LP4) are arranged at spaced intervals.

An image, which is displayed on the LCD panel 2, is formed on the screen 4 by light from the backlight 1 via the cylindrical lens plates 3.

The user stands on the right of FIG. 1 and sees the image on the screen 4. In order to project a full-size image of that on the LCD panel 2, each constituent element may be so arranged that L1 is 40 mm, L2 is 5.62 mm and L3 is 40 mm in FIG. 1, for example.

Here, L1 is a distance from the surface of the LCD panel 2 to the surface of the leftmost cylindrical lens plate LP3, L2 is the thickness of the whole image formation unit 3, and L3 is a distance from the surface of the rightmost cylindrical lens plate LP4 to the screen 4.

In FIG. 1, the image formation unit 3 is composed of four lens plates (LP1, LP2, LP3, LP4). For keeping predetermined intervals between the lens plates LP1 and LP3 and between the lens plates LP2 and LP4, spacer plates SP1 and SP2, not shown, are inserted between the lens plates (see FIG. 4).

Figure 2:
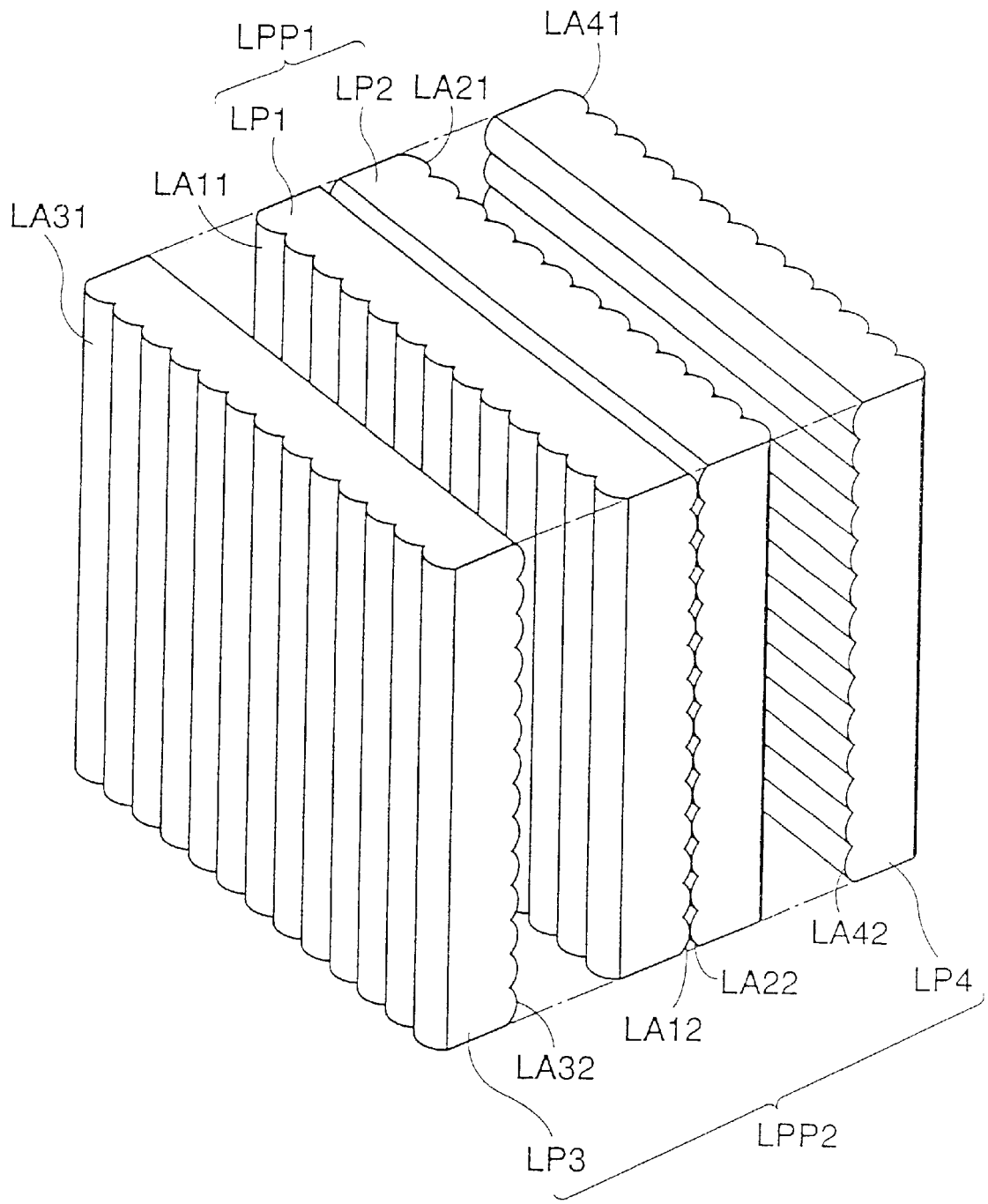
FIG. 2 is a perspective view of an example of an image formation unit of a full-size image formation system in accordance with the present invention.

FIG. 2 shows a perspective view of an image formation unit of the full-size image formation system in accordance with the present invention.

For simple illustration, spacer plates arranged between cylindrical lens plates are not shown in FIG. 2, as in FIG. 1.

Each of four cylindrical lens plates (LP1 to LP4) is a flat plate having surfaces on which partial curved faces of circular cylinders are arranged in certain directions. The axial direction (generatrix) of the curved faces formed on one surface is orthogonal to the axial direction (generatrix) of the curved faces formed on the other surface. The curved faces formed on both the front and rear faces function as lenses, and the whole surfaces are referred to as cylindrical lens arrays (or simply lens arrays).

On one surface of the first lens plate LP1, a cylindrical lens array LA11 is formed in which cylindrical lenses having a curved face (with a focal length of 2.06 mm) with an aperture width of 0.85 mm, a radius of curvature of 1.39 mm and a conic coefficient of 2.43 are arranged at an array pitch (P1) of 0.85 mm. On the other surface, formed is a cylindrical lens array LA12 whose generatrix is orthogonal to that of the cylindrical lens array LA11 and which has an aperture width of 0.85 mm, an array pitch (P1) of 0.85 mm, a radius of curvature of 1.253 mm and a conic coefficient of 0.77 (a focal length of 2.06 mm).

On the second lens plate LP2, cylindrical lens arrays LA21 and LA22 are formed on both the front and rear faces so that their generatrices are orthogonal to each other. The cylindrical lens arrays LA21 and LA22 have the same parameters (aperture width, etc.) as those of the cylindrical lens arrays LA11 and LA12 of the first lens plate LP1, respectively.

Further, the first lens plate LP1 and the second lens plate LP2 are so placed in close contact that the generatrices of the lenses of LA12 and LA22 are opposed in parallel. In FIG. 2, the generatrices of LA12 and LA22 are parallel in a horizontal direction (X-axis). A plate formed of the first lens plate LP1 and the second lens plate LP2 is referred to as a first lens substrate pair LPP1. For the close contact, a transparent adhesive may be used.

However, the first lens plate LP1 and the second lens plate LP2 are not always required to be in close contact. They may be placed at a spaced interval with intervention of a spacer plate between the lens plates.

On one surface of the third lens plate LP3, formed is a cylindrical lens array LA31 with an aperture width of 0.85 mm, an array pitch (P1) of 0.85 mm, a radius of curvature of 1.407 mm and a conic coefficient of 0.603 (a focal length of 2.32 mm). On the other surface, formed is a cylindrical lens array LA32 whose generatrix is orthogonal to that of the cylindrical lens array LA31 and which has an aperture width of 0.85 mm, an array pitch (P1) of 0.85 mm, a radius of curvature of 1.193 mm and a conic coefficient of 2.328 (a focal length of 1.96 mm).

On the fourth lens plate LP4, cylindrical lens arrays LA41 and LA42 are so formed on the front and rear faces that their generatrices are orthogonal to each other.

The cylindrical lens arrays LA41 and LA42 have the same parameters as those of the cylindrical lens arrays LA31 and LA32 of the third lens plate LP3, respectively.

Further, the first lens plate LP1 and the third lens plate LP3 are placed with intervention of the spacer plate SP1 with a thickness (W2) of 1.72 mm in such a manner that the cylindrical lens array LA11 of the first lens plate and the cylindrical lens array LA32 of the third lens plate are opposed with their generatrices being orthogonal to each other. In FIG. 2, the generatrix of LA11 lies in a vertical direction (Y-axis) while the generatrix of LA32 lies in the horizontal direction (X-axis).

Similarly, the second lens plate LP2 and the fourth lens plate LP4 are placed with intervention of the spacer plate SP2 with a thickness (W2) of 1.72 mm in such a manner that the cylindrical lens array LA21 of the second lens plate and the cylindrical lens array LA42 of the fourth lens plate are opposed with their generatrices being orthogonal to each other. In FIG. 2, the generatrix of LA21 lies in the vertical direction (Y-axis) while the generatrix of LA42 lies in the horizontal direction (X-axis).

As described above, in the case where the image formation unit is composed of four lens plates, the lens plates are so placed that the lens arrays on the lens plates are arranged in order of LA31, LA32, LA11, LA12, LA22, LA21, LA42 and LA41 from the left, the generatrices of LA31, LA11, LA21 and LA41 are parallel to the Y-axis and the generatrices of LA32, LA12, LA22 and LA42 are parallel to the X-axis.

The lens plates LP1 to LP4 are produced by transferring the shape of lenses onto surfaces of resin plates by a thermal press method using a matrix formed on a mold as a base. Here, as a result of conducting thermal press using polycarbonate plates of 0.5 mm thickness, lens plates with a thickness (W1) of 0.545 mm were obtained. In the display unit 10 including the backlight 1 and the LCD panel 2, the directivity of the backlight 1 is so set that a major part (about 90%) of light emitted from its screen is included within angles of radiation of ±10 degrees or less.

In the case where the cylindrical lens are constructed as shown in FIG. 2 and the components are arranged as shown in FIG. 1, light emitted from the LCD panel 2 passes sequentially through the lens arrays, reaches the screen 4 and forms an erect full-size image equal to the image displayed on the LCD panel.

In FIG. 2, the light is incident on the lens array LA31 which is the nearest to the LCD panel 2, with an incident angle of ±10 degrees or less. Therefore, the cross talk to adjacent lenses does not take place and an image of high contrast can be obtained.

Even if the directivity of light from the backlight 1 is different from that mentioned above, the cross talk may be prevented by changing the parameters of the lenses and the parameters of arrangement distances of the lenses. However, in order to prevent the cross talk when the angle of radiation of light is large, the aperture width of the lenses is required to be larger.

However, if the aperture width is increased, an aberration enlarges and the image forming performance deteriorates. It becomes difficult to produce lenses having sufficient performance.

Figure 3:
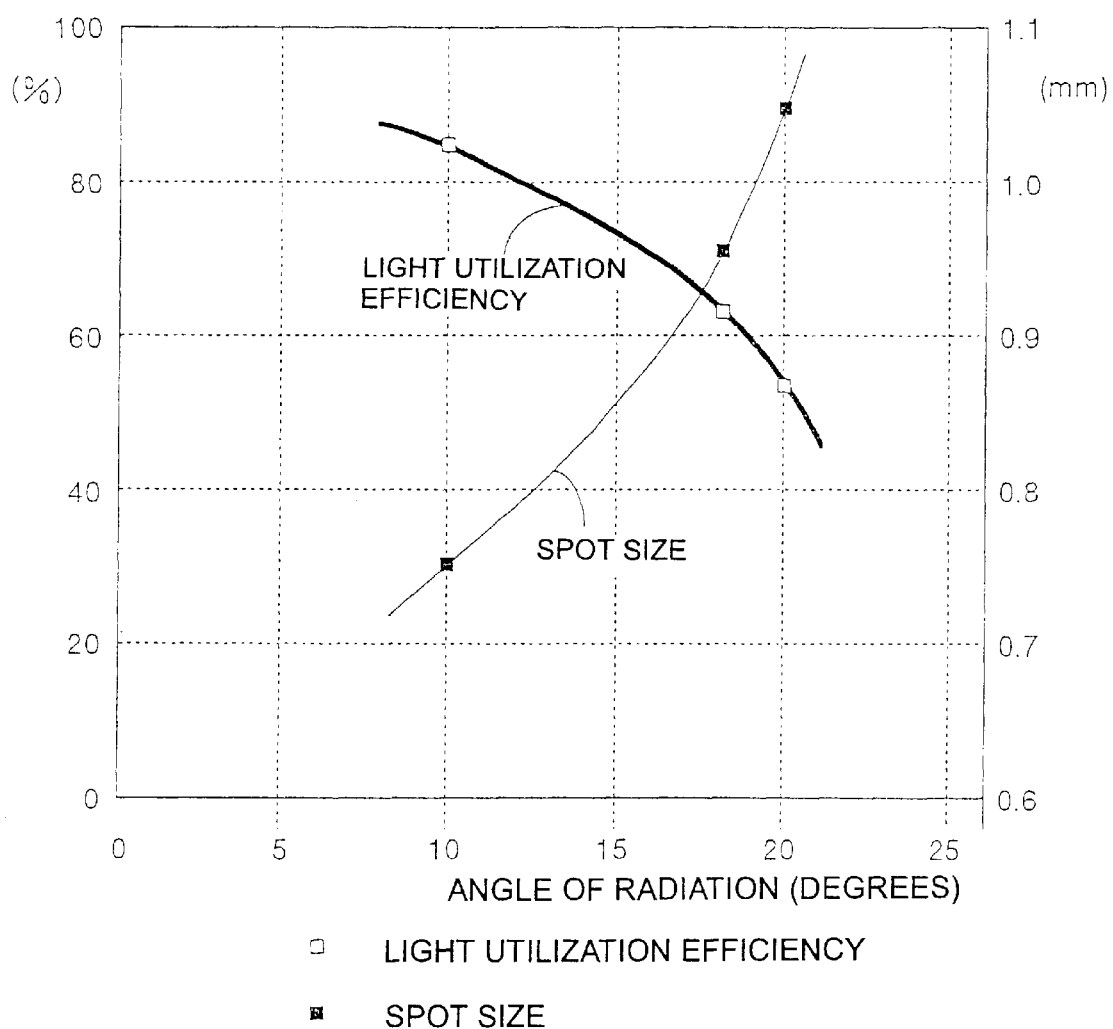
FIG. 3 is a graph of a light utilization efficiency and a spot size with respect to an angle of radiation of light in accordance with the preset invention.

FIG. 3 shows a graph of a light utilization efficiency and a spot size with respect to the angle of radiation of the light emitted from the LCD panel 2 in the preset invention.

The spot size means an expansion (area) on the screen corresponding to a pattern of 0.5 square on the LCD panel 2.

According to this graph, it is understood that as the angle of radiation of the emitted light increases, the image forming performance falls and that when the angle of radiation exceeds ±20 degrees, the performance deteriorates sharply. Therefore, it is preferable that the angle of radiation of the major part (about 90%) of the light emitted from the LCD panel 2 is ±20 degrees or smaller. Particularly, it is preferable for obtaining high-definition image forming performance that the angle of radiation of the major part (about 90%) of the emitted light is ±10 degrees or smaller.

For setting the angle of radiation of the emitted light within the range of ±10 degrees or less, the backlight 1 may be composed of a great number of reversed trapezoidal prisms placed on a light-guiding plate as disclosed in U.S. Pat. No. 5,396,350 (see FIG. 9).

Figure 9:
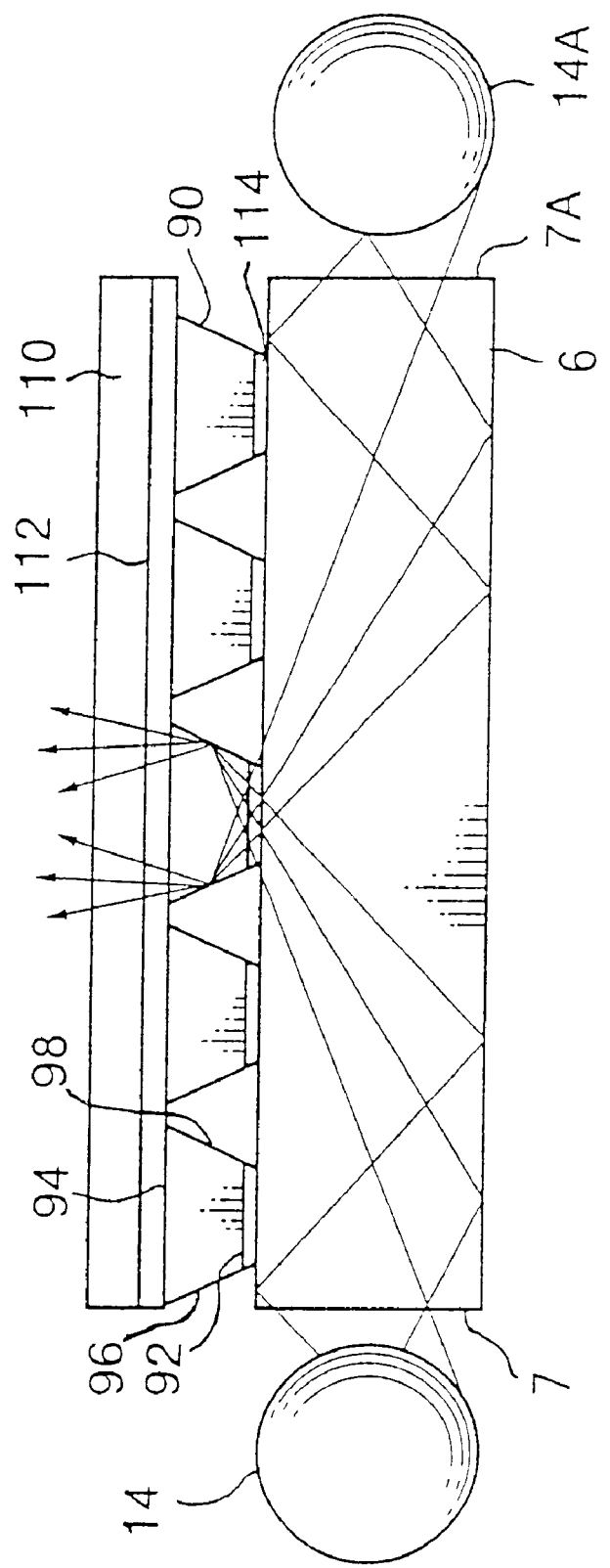
FIG. 9 is a view illustrating the construction of a conventional backlight.

FIG. 9 shows a view illustrating the structure of the conventional backlight. In FIG. 9, light emitted from light generating means 14 and 14A passes through light receptive surfaces 7 and 7A and is guided into a slab waveguide 6. On the slab waveguide 6, microprisms 90 are attached in parallel with intervention of an adhesive layer 114. Further on the microprisms 90, a substrate layer 110 is attached with intervention of an adhesive layer 112. The microprism 90 has a light input surface 92 contacted with the adhesive layer 114, a light output surface 94 having a larger surface area than the light input surface 92 and two inclined side faces 96 and 98 opposing to each other and has a trapezoidal shape. The light guided by the slab waveguide 6, when it is incident on the microprism 9, is reflected by its side faces 96 and 98 and sent out from the light output surface 94 upward in a substantially vertical direction.

Figure 4:
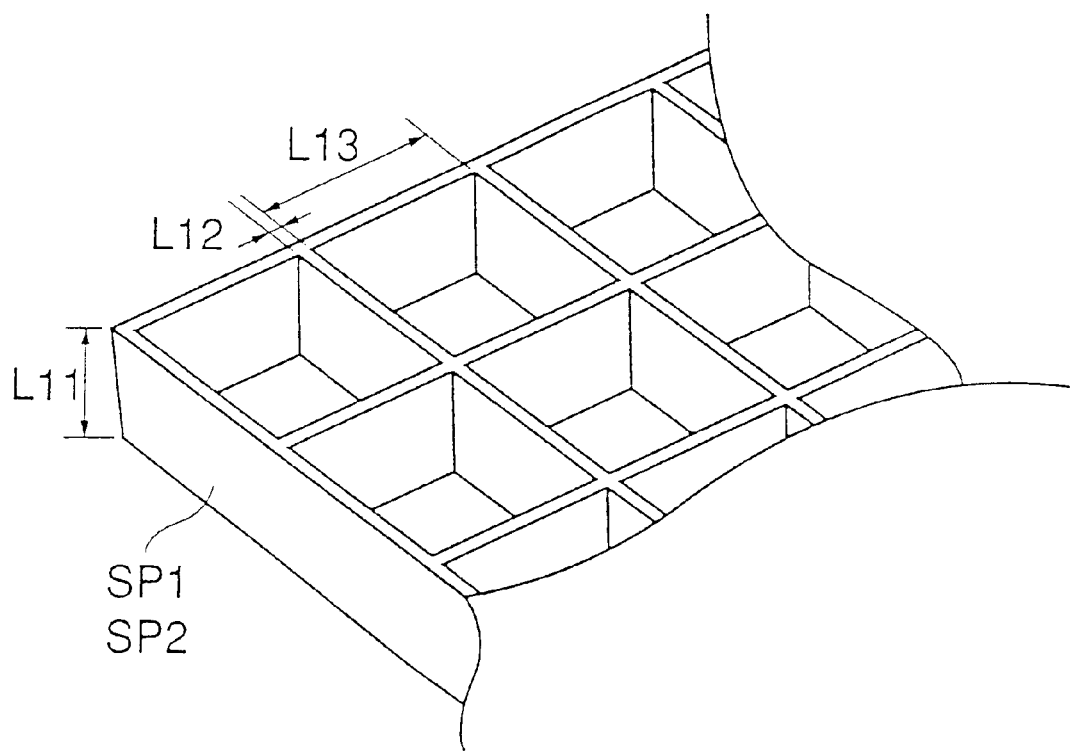
FIG. 4 is a schematic perspective view of an example of a spacer plate in accordance with the present invention.

FIG. 4 shows a perspective view of an example of a construction of spacer plates SP1 and SP2.

FIG. 4 shows a spacer plate having a construction in which a large number of openings are arranged in a lattice form. Here, thickness L11 is about 1.86 mm, the width L12 of a rib (thickness of a wall) is about 0.5 mm and the width L13 of the opening is about 40 mm. The spacer plate may be formed of a plate of a transparent resin, for example, an acrylic resin.

Parts of the lens plate contacting rib portions are shielded from light and an image forming action is prevented. However, this does not affect much the quality of image formation since an image on the screen 4 is formed of images made by a large number of lenses which images overlap each other a little. Usually, the spacer plates SP1 and SP2 may be so arranged that their ribs are aligned and their openings are overlaid in parallel.

However, taking into consideration a local decline in the image formation, it is more preferable that the ribs of the spacer plates SP1 and SP2 are not overlaid in parallel. For example, the ribs of SP1 and SP2 may suitably be shifted either leftward or rightward by half a cycle so that their openings are not aligned.

Figure 5:
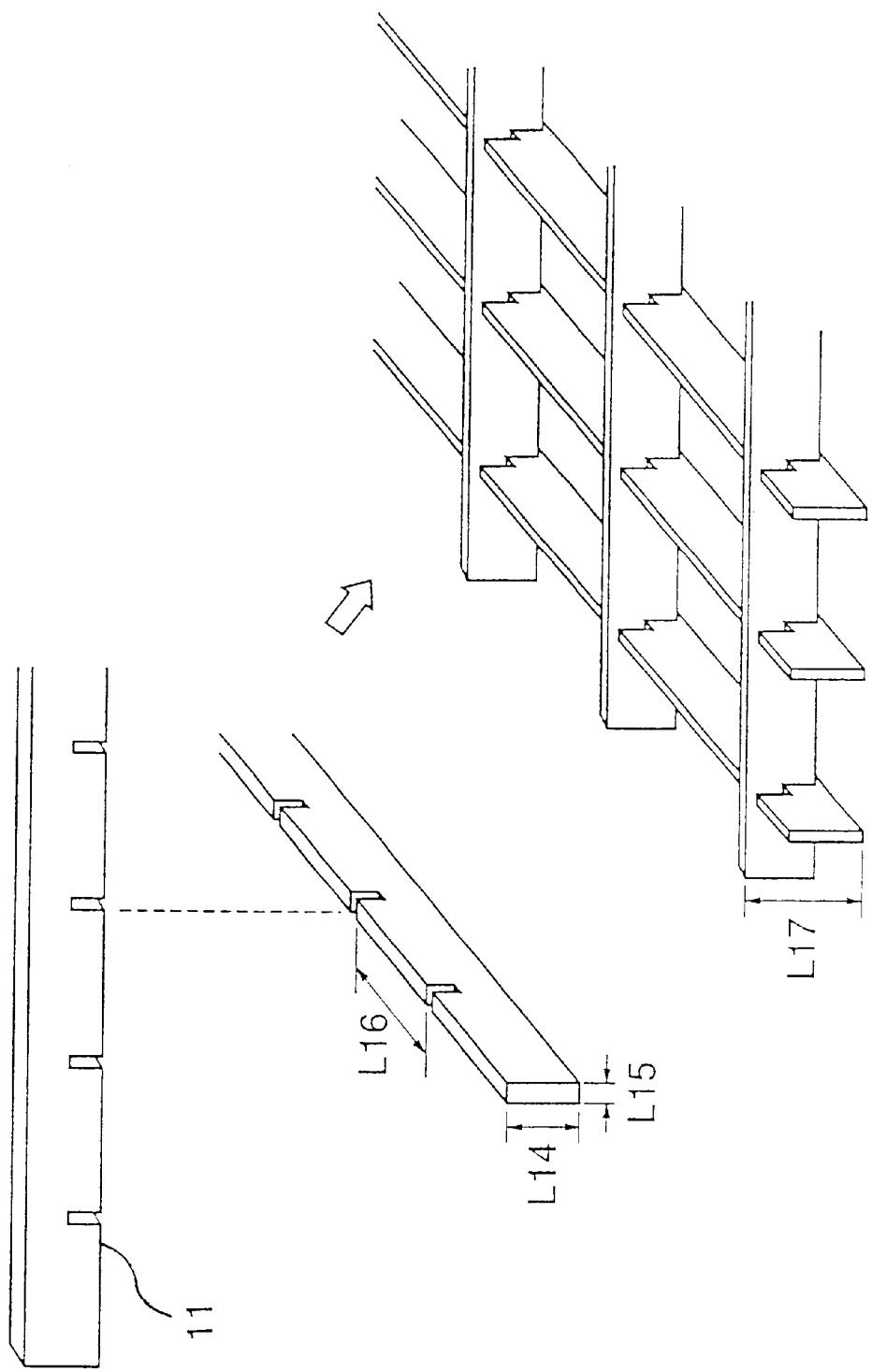
FIG. 5 is a schematic perspective view of a spacer plate produced by arranging components in parallel crosses in accordance with the present invention.

Each of the spacer plates SP1 and SP2 as shown in FIG. 4 may be produced in one piece using a mold. Alternatively, the spacer plate may be produced by combining elongated metal plates 11 in a parallel cross pattern. FIG. 5 shows a schematic perspective view of a spacer plate SP1 or SP2 produced by arrangement in the parallel cross pattern.

Here, one metal plate 11 has a width L14 of 2.5 mm, a thickness L15 of 0.5 mm, and cuts of 1.07 mm at a pitch L16 of 40 mm. Such metal plates 11 are crossed in the parallel cross pattern to form a spacer plate SP1 or SP2 with a rib width of 0.5 mm and a thickness L17 of 2.86 mm, as shown in FIG. 5. As the metal plates 11, may be used aluminum plates whose surface is anodized in black to prevent stray light by reflection.

Figure 6:
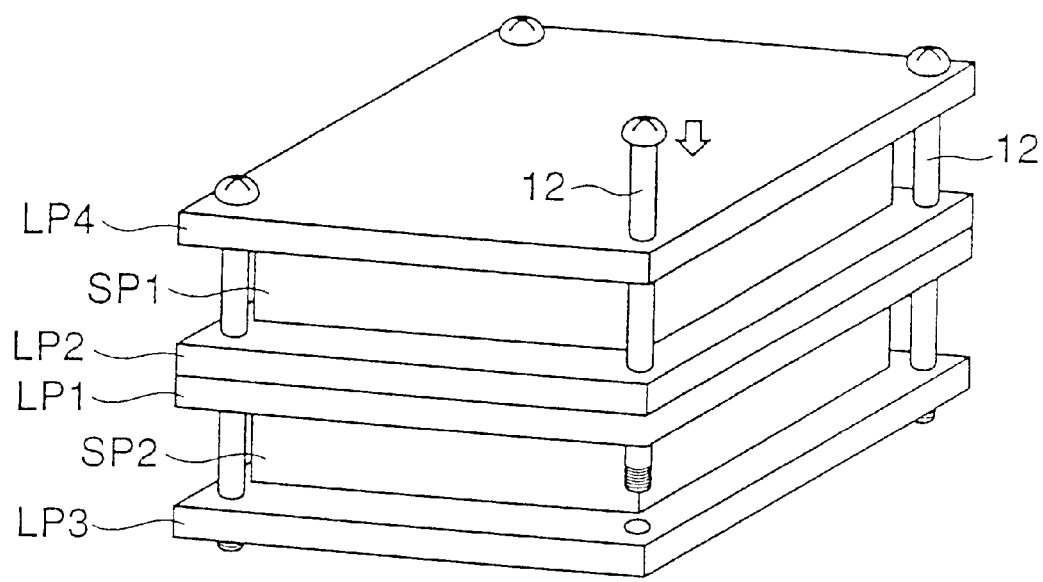
FIG. 6 is a view illustrating assembly of lens substrates and spacer plates in accordance with the present invention.

FIG. 6 shows a view illustrating assembly of cylindrical lens plates and spacer plates used in the present invention.

Small holes (of about 5 mm diameter) for alignment are opened in outer peripheries of the lens plates (LP1 to LP4) which are irresponsible for image formation.

The spacer plate SP1 is inserted in a predetermined position between the lens plates LP3 and LP1, and the spacer plate SP2 is inserted in a predetermined position between the lens plates LP2 and LP4. Then through pins 12 are put through the small holes for aligning the plates.

Further the through pins are screwed to fix the plates by pressing. Alternatively, the lens plates and spacer plates may be fixed by boding with an adhesive.

As described above, the optical device of the full-size image formation system of the present invention can be produced more easily than the conventional optical device using rod lens arrays and production costs can be reduced, because it utilizes lens plates capable of being replicated on a large scale by the thermal press technique or the like. Also, since a light-weight material such as acrylic resin or the like can be used for the lens plates, it is possible to reduce the weight of the optical device itself.

Figure 10:
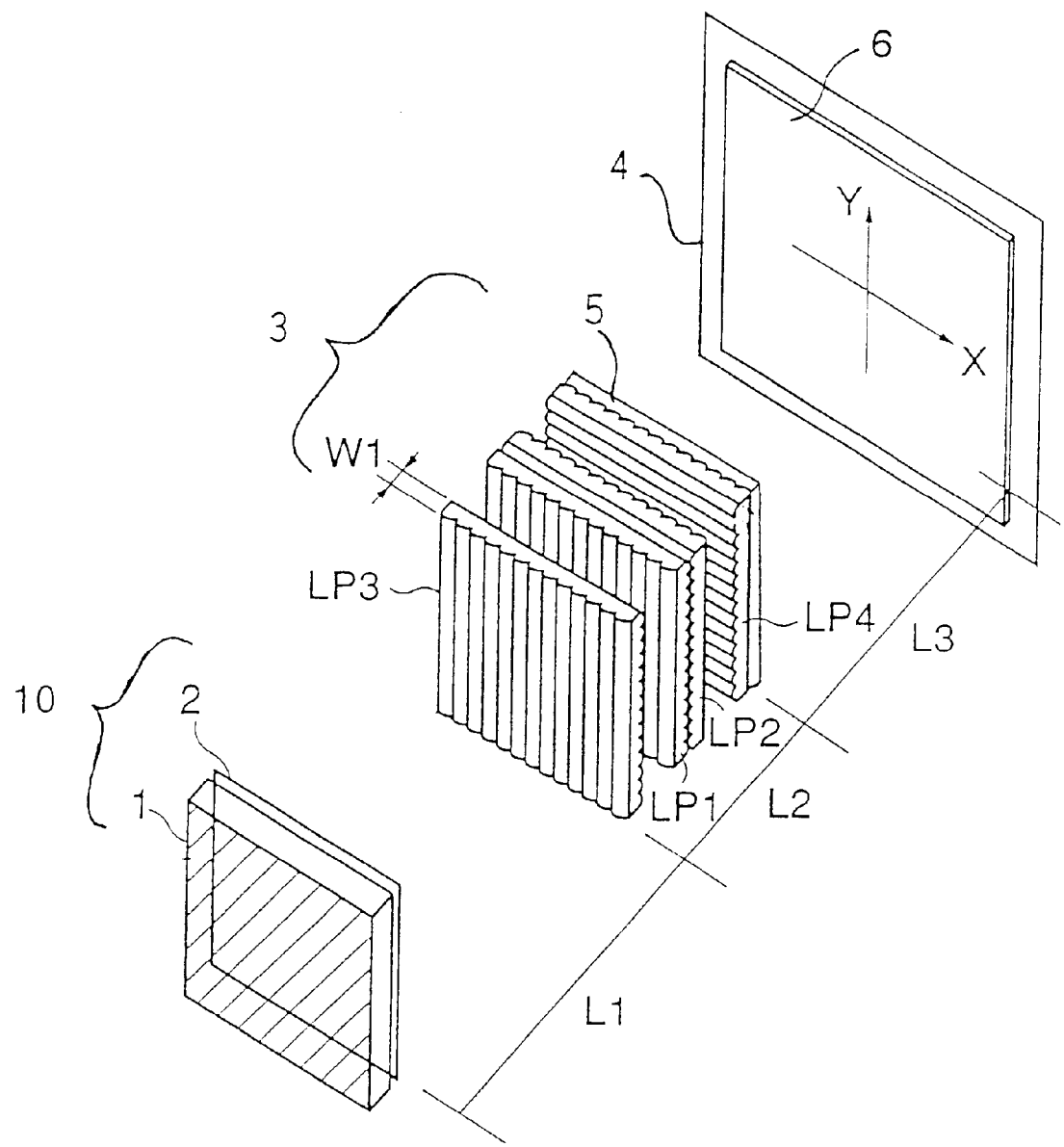
FIG. 10 is a schematic view illustrating the construction for magnifying an image by use of an optical device of the full-size image formation system in accordance with the present invention.

FIG. 10 shows a schematic view illustrating the construction of an example in the case where an image is magnified by use of the optical device of the full-size image formation system of the present invention.

In order to magnify an image by use of the optical device of the full-size image formation system of the present invention, a Fresnel concave lens 5 may be disposed immediately in front of the surface LA41 of the lens plate 4 which is the nearest to the screen. Also a Fresnel convex lens 6 may be disposed in the vicinity of the surface of the screen 4. However, without the Fresnel convex lens 6, an image can be magnified. In this case, if the magnifying ratio of the image is 1.15, the focal length of the Fresnel concave lens 5 is 300 mm and the distance L3 between LA41 and the screen is 45 mm.

Figure 12:
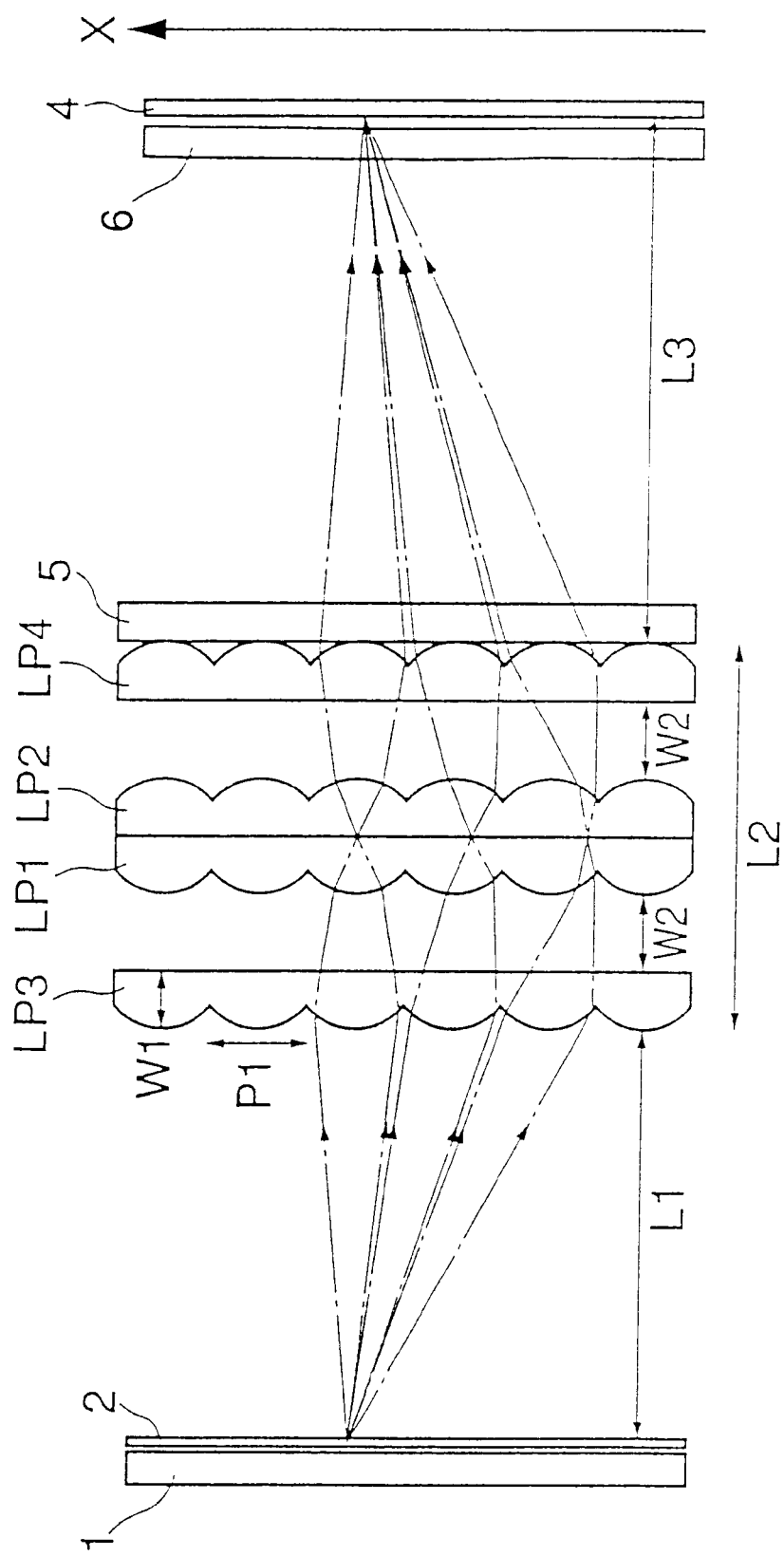
FIG. 12 is a sectional view of the optical device of FIG. 10 as seen in a direction of Y-axis (vertical direction)
Figure 13:
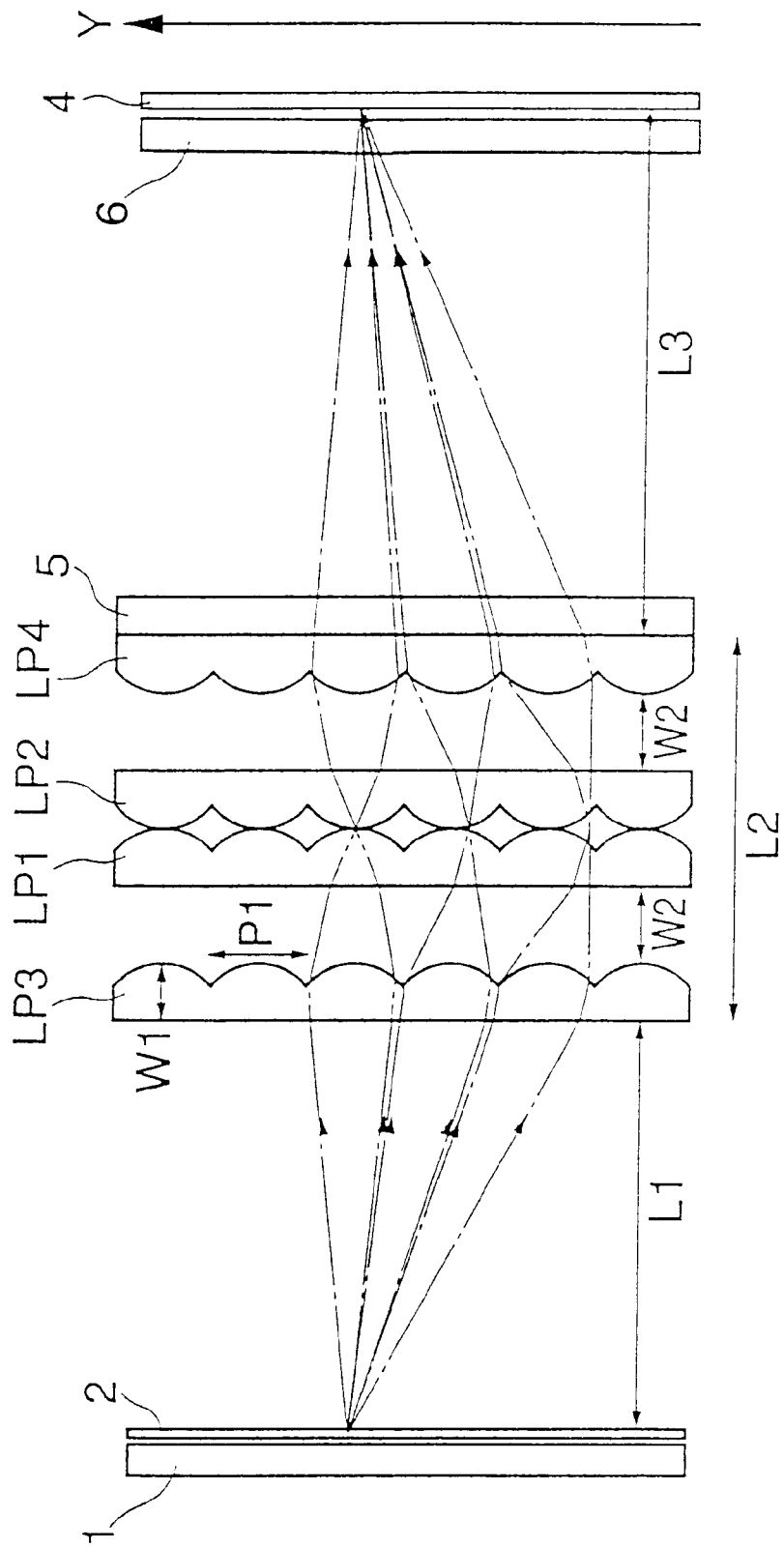
FIG. 13 is a sectional view of the optical device of FIG. 10 as seen in a direction of X-axis (lateral direction)

FIG. 12 shows a sectional view of the optical device of the full-size image formation system shown in FIG. 10 as seen in the Y-axis direction, that is, the vertical direction. FIG. 13 shows a sectional view of the optical device of the full-size image formation system shown in FIG. 10 as seen in the X-axis direction, that is, the lateral direction.

In FIG. 12 and FIG. 13, arrows indicate examples of routes of the light emitted from the LCD panel 2.

From comparison of FIG. 12 with FIG. 13, it is understood that outside lenses of LP3 and LP4 form an image with a longer optical path length as shown in FIG. 12.

Reference mark W2 in the figures indicates the thickness of the spacer plate (SP3, SP4), which is 1.72 mm.

Figure 7:
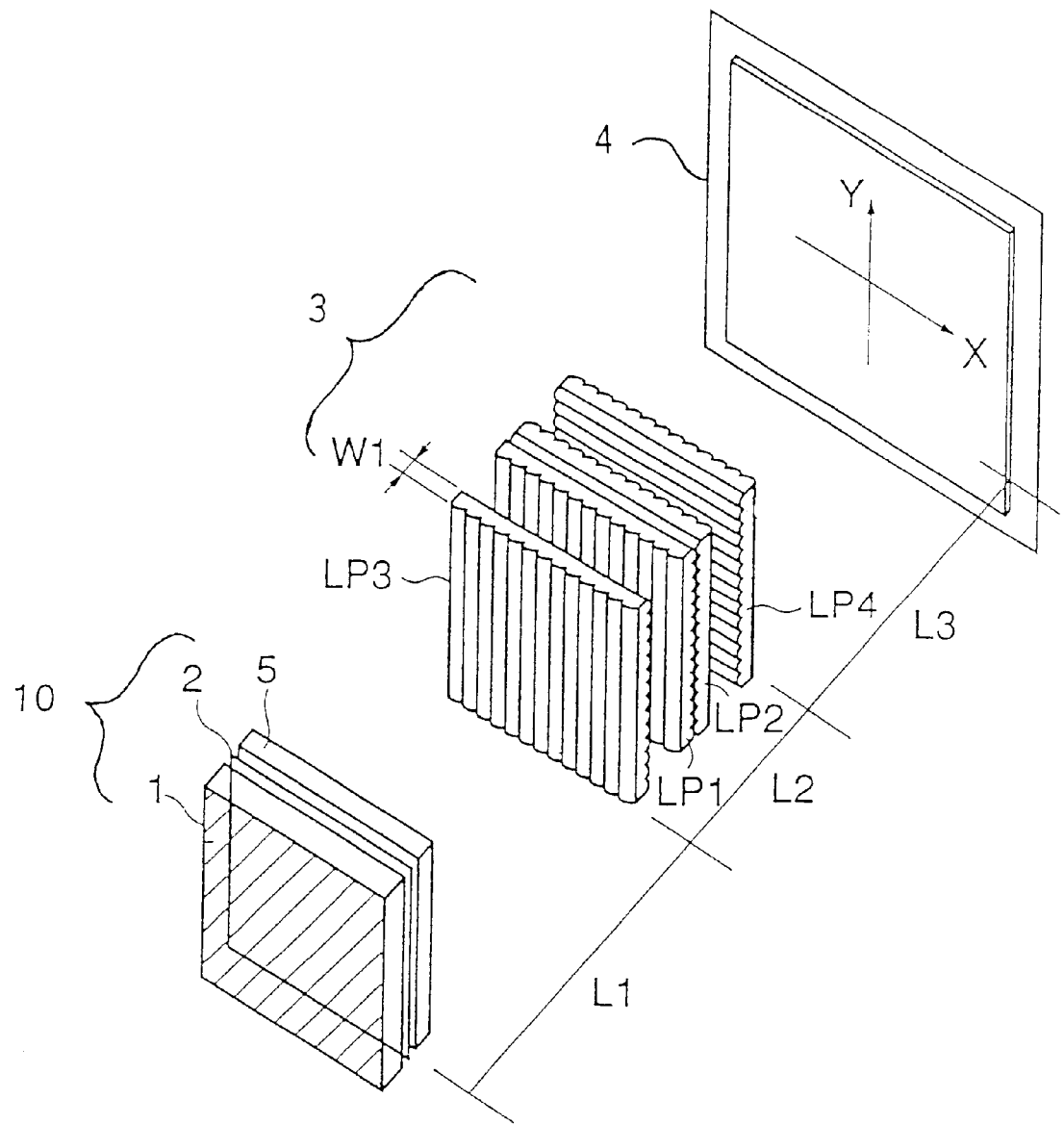
FIG. 7 is a schematic perspective view of an example of an optical device in accordance with the present invention.

Next, FIG. 7 shows an overall schematic perspective view of an optical device in accordance with the present invention. This is an optical device of the magnified image formation system, which is different from the device of FIG. 1 in that it is provided with a Fresnel concave lens 5 for magnifying images in a position as shown in FIG. 7. Further, as discussed later, parameters of cylindrical lens plates such as the aperture width and the like are different.

The Fresnel concave lens 5 is disposed in such a position in the vicinity of the surface of the LCD panel 2 that the light emitted from the LCD panel 2 passes immediately. For example, the Fresnel concave lens 5 may be disposed in close contact with the surface of the LCD panel 2 or may be bonded to the LCD panel 2 with intervention of a spacer plate to maintain a certain distance.

The image formation unit of the magnified image formation system is composed of four lens plates (LP1 to LP4) formed with cylindrical lens arrays on their surfaces like the image formation unit of the full-size image formation system shown in FIG. 1.

Figure 8:
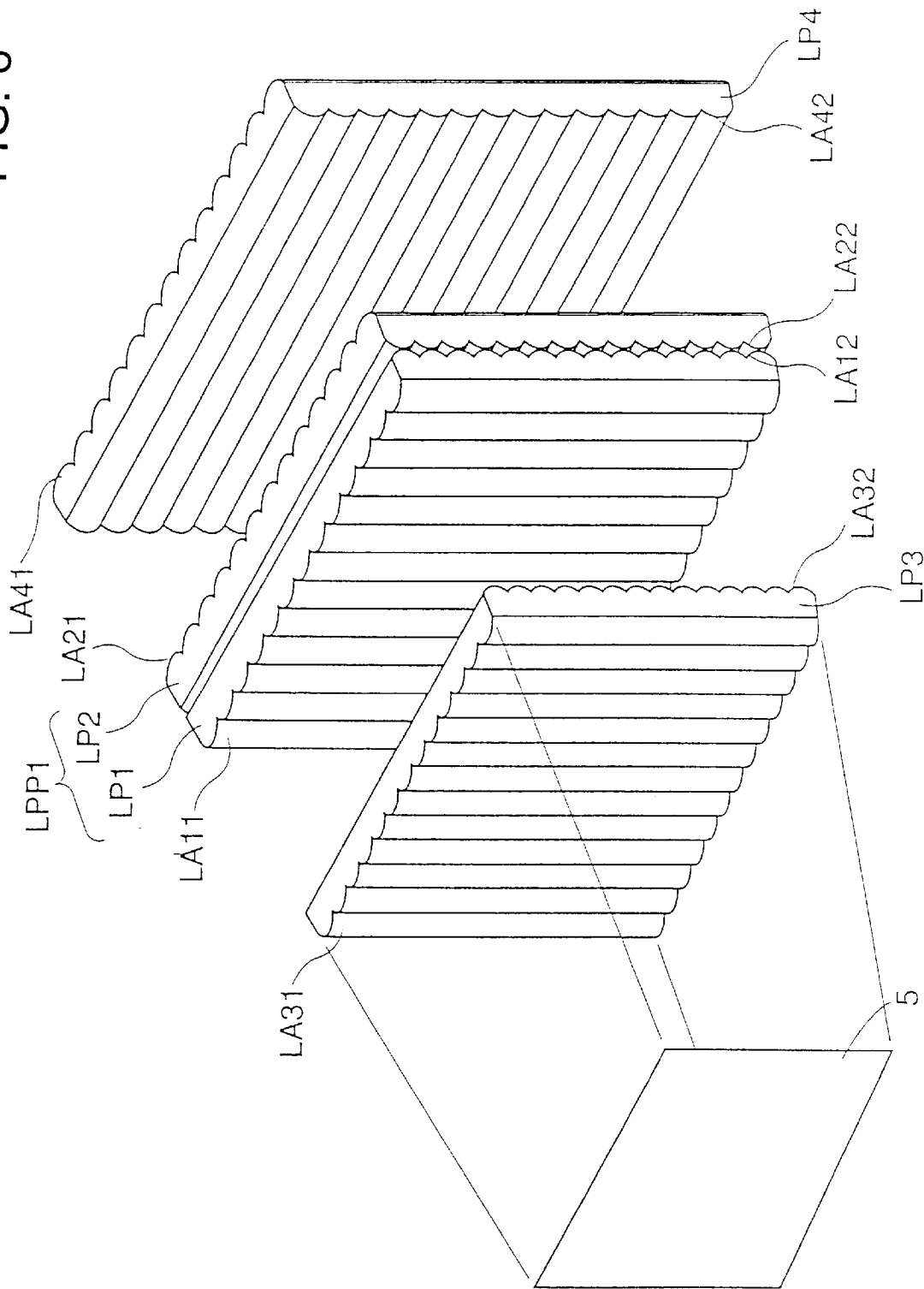
FIG. 8 is a perspective view of an example of an image formation unit of the magnified image formation system in accordance with the present invention.

FIG. 8 is a perspective view of the image formation unit of the magnified image formation system of the present invention shown in FIG. 7.

On one surface of a first lens plate LP1, a cylindrical lens array LA11 is formed in which cylindrical lenses having an aperture width of 2.096 mm and a focal length of 2.741 mm are arranged at an array pitch of 2.096 mm. On the other surface, formed is a cylindrical lens array LA12 whose generatrix is orthogonal to that of the cylindrical lens array LA11 and which has an aperture width of 2.1 mm, an array pitch of 2.1 mm and a focal length of 2.741 mm.

On a second lens plate LP2, cylindrical lens arrays LA21 and LA22 are formed on the front and rear faces so that their generatrices are orthogonal to each other. LA21 is a cylindrical lens array with an aperture width of 2.104 mm, an array pitch of 2.104 mm and a focal length of 2.729 mm. LA22 is a cylindrical lens arrays having the same aperture width and array pitch as the cylindrical lens array LA12 of the first lens plate LP1 and having a focal length of 2.729 mm.

Further, the first lens plate LP1 and the second lens plate LP2 are so placed in close contact that the generatrices of the lenses of LA12 and LA22 are opposed in parallel.

However, the lens plates LP1 and LP2 are not always required to be in close contact. They may be placed at a spaced interval with intervention of a spacer plate therebetween.

On one surface of a third lens plate LP3, formed is a cylindrical lens array LA31 with an aperture width of 2.087 mm, an array pitch of 2.087 mm and a focal length of 4.672 mm. On the other surface, formed is a cylindrical lens array LA32 whose generatrix is orthogonal to that of the cylindrical lens array LA31 and which has an aperture width of 2.091 mm, an array pitch of 2.091 mm and a focal length of 2.570 mm.

On a fourth lens plate LP4, cylindrical lens arrays LA41 and LA42 are so formed on the front and rear faces that their generatrices are orthogonal to each other.

The lean array LA41 is a cylindrical lens array with an aperture width of 2.113 mm, an array pitch of 2.113 mm and a focal length of 4.743 mm. The lens array LA42 is a cylindrical lens array with an aperture width of 2.109 mm, an array pitch of 2.109 mm and a focal length of 2.580 mm.

Further, the first lens plate LP1 and the third lens plate LP3 are placed with intervention of a spacer plate SP1 with a thickness of 1.42 mm in such a manner that the cylindrical lens array LA11 of the first lens plate and the cylindrical lens array LA32 of the third lens plate are opposed with their generatrices being orthogonal to each other. In FIG. 8, the generatrix of LA11 lies in the vertical direction (Y-axis) while the generatrix of LA32 lies in the horizontal direction (X-axis).

Similarly, the second lens plate LP2 and the fourth lens plate LP4 are placed with intervention of a spacer plate SP2 with a thickness of 1.408 mm in such a manner that the cylindrical lens array LA21 of the second lens plate and the cylindrical lens array LA42 of the fourth lens plate are opposed with their generatrices being orthogonal to each other. In FIG. 8, the generatrix of LA21 lies in the vertical direction (Y-axis) while the generatrix of LA42 lies in the horizontal direction (X-axis).

As each the lens plates LP1 to LP4, lens plates with a final thickness (W1) of 2.1 mm were obtained as a result of conducting thermal press using polycarbonate plates of 1.8 mm thickness. Also in FIG. 7, in a display unit composed of a backlight 1 and an LCD panel 2, the directivity of the backlight 1 is so set that a major part (about 90%) of the emitted light is included within angles of radiation of ±10 degrees or less. Further, in FIG. 7, L1 is 40.0 mm, L2 is 11.227 mm, L3 is 45.987 mm, and the distance from the LCD panel 2 to a screen is 97.214 mm.

Further, the Fresnel concave lens 5 for magnification closely contacted with the surface of the LCD panel 2 is a concave lens with a focal length of 627 mm and functions to bend the direction of light traveling toward the screen more outward in peripheral parts according to the magnification ratio (1.15 in this case) of an image on the screen lying at a distance of 45.987 mm (=L3) from the surface LA41.

In the case where the optical device is constructed as shown in FIG. 7, the light emitted from the LCD panel 2 is expanded outward by the Fresnel lens 5, then passes sequentially through the lens arrays while gradually expanded until it reaches the screen 4, where it forms an erect magnified image.

In the optical device of the magnified image formation system shown in FIG. 7, the numerical values such as the thickness of the lens plates are only examples and not limitative values.

For example, by setting the parameters of the lens arrays of the four lens substrate LP1 to LP4 as mentioned below, it is possible to reduce the distance between the LCD panel 2 and the screen greatly from 97.214 mm in the case of FIG. 7 to 48.396 mm. In this case, L1 is 17.3 mm, L2 is 11.213 mm and L3 is 19.883 mm.

|  | Focal Length (mm) | Aperture Width (mm) | Pitch (mm) |
| --- | --- | --- | --- |
| LA11 | 2.741 | 2.091 | 2.091 |
| LA12 | 2.741 | 2.1 | 2.1 |
| LA21 | 2.729 | 2.109 | 2.109 |
| LA22 | 2.729 | 2.1 | 2.1 |
| LA31 | 4.051 | 2.074 | 2.074 |
| LA32 | 2.389 | 2.082 | 2.082 |
| LA41 | 4.176 | 2.126 | 2.126 |
| LA42 | 2.406 | 2.118 | 2.118 |

In this case, the spacer plate SP1 is 1.42 mm thick, the spacer plate SP2 is 1.393 mm thick, and the focal length of the Fresnel concave lens 5 for magnification closely contact with the surface of the LCD panel 2 is 302 mm. The thickness (W1) of each of the lens plates is 2.1 mm as in the case of FIG. 7.

In this example, the focal length of the lenses of the lens arrays LA31, LA32, LA41 and LA42 is a little shorter than in the case of FIG. 7, and a significant change does not take place in focusing characteristics of the lens arrays. However, the focal length of the Fresnel concave lens 5 is about half, and the light utilization efficiency (i.e., brightness) falls a little around the Fresnel concave lens. The shorter the focal length of the Fresnel concave lens, the more the light utilization efficiency drops around the lens. Therefore, the reduction of the thickness is limited, with view to satisfying demanded display quality.

As compared with the device of magnifying system in which the Fresnel concave lens 5 is disposed immediately in front of the surface LA41 of the lens plate LP4 of the example of the full-size image formation system shown in FIG. 1, the construction of FIG. 7 is more advantageous in the light utilization efficiency around the Fresnel concave lens and can realize a thinner optical device, because the image is gradually magnified from the Fresnel concave lens immediately in front of the LCD panel 2 toward the screen and therefore the focal length of the Fresnel concave lens can be relatively longer.

Figure 11:
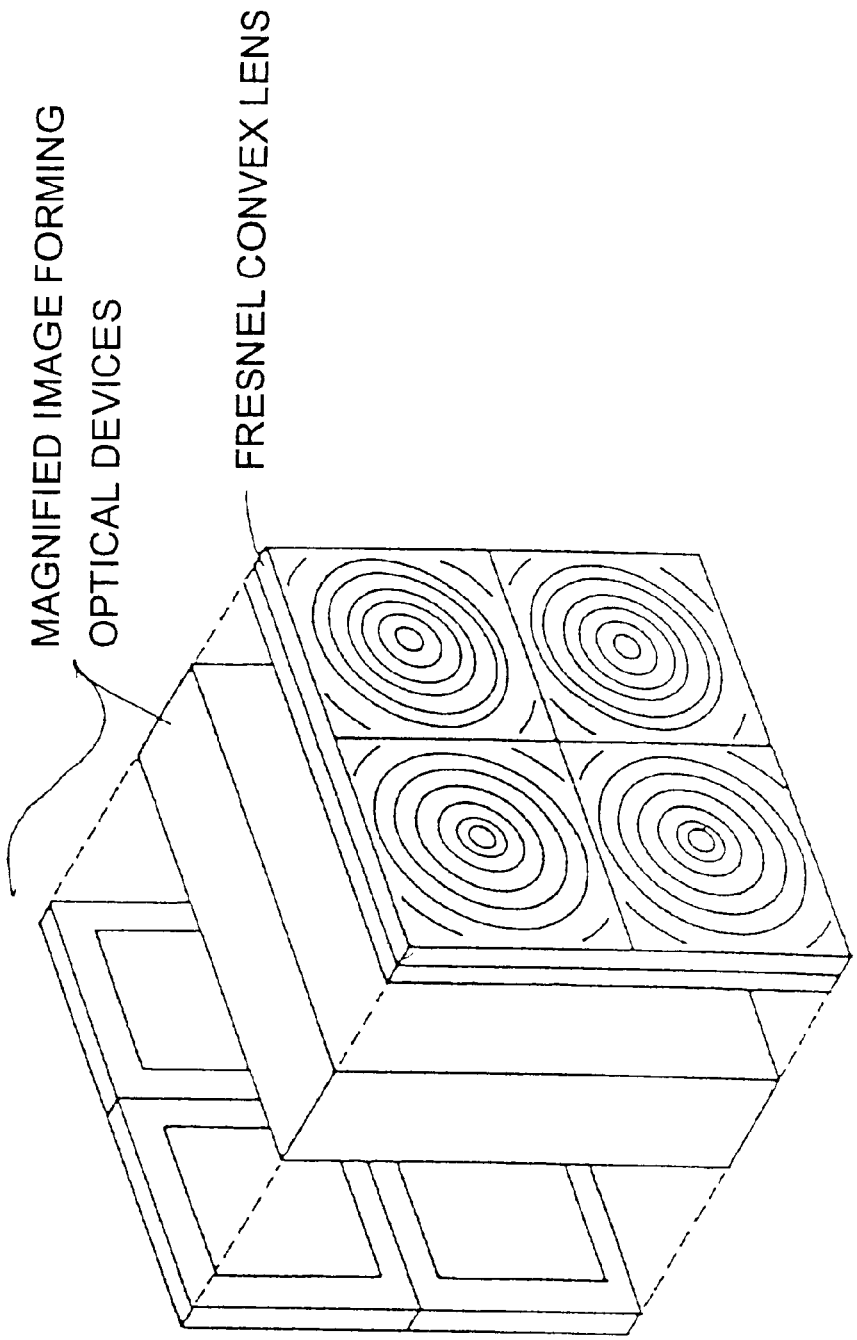
FIG. 11 shows a display device using optical devices of the magnified image formation system in accordance with the present invention

It is possible to construct a large-size high-definition display by combining a plurality of magnified image forming optical devices as shown in FIG. 10 or in FIG. 7 and placing a Fresnel convex lens for compensating inclination of optical axis on an image face of each of the optical devices. FIG. 11 shows an example of a display device using four magnified image forming optical devices. Here, as each of the magnified image forming optical devices, may be used either the optical device shown in FIG. 10 or the optical device shown in FIG. 7. A lenticular lens may further be placed on the image face for enlarging a viewing angle.

Next, explanation is given of an optical device of the erect full-size image formation system constructed so that lens plates formed with cylindrical lens arrays on their front and rear faces are arranged in close contact.

In this construction, since spacer plates as shown in FIG. 4 and other figures are not used, it is possible to reduce the number of components, simplify the assembly of the optical device and reduce the size and weight of the optical device.

Figure 14:
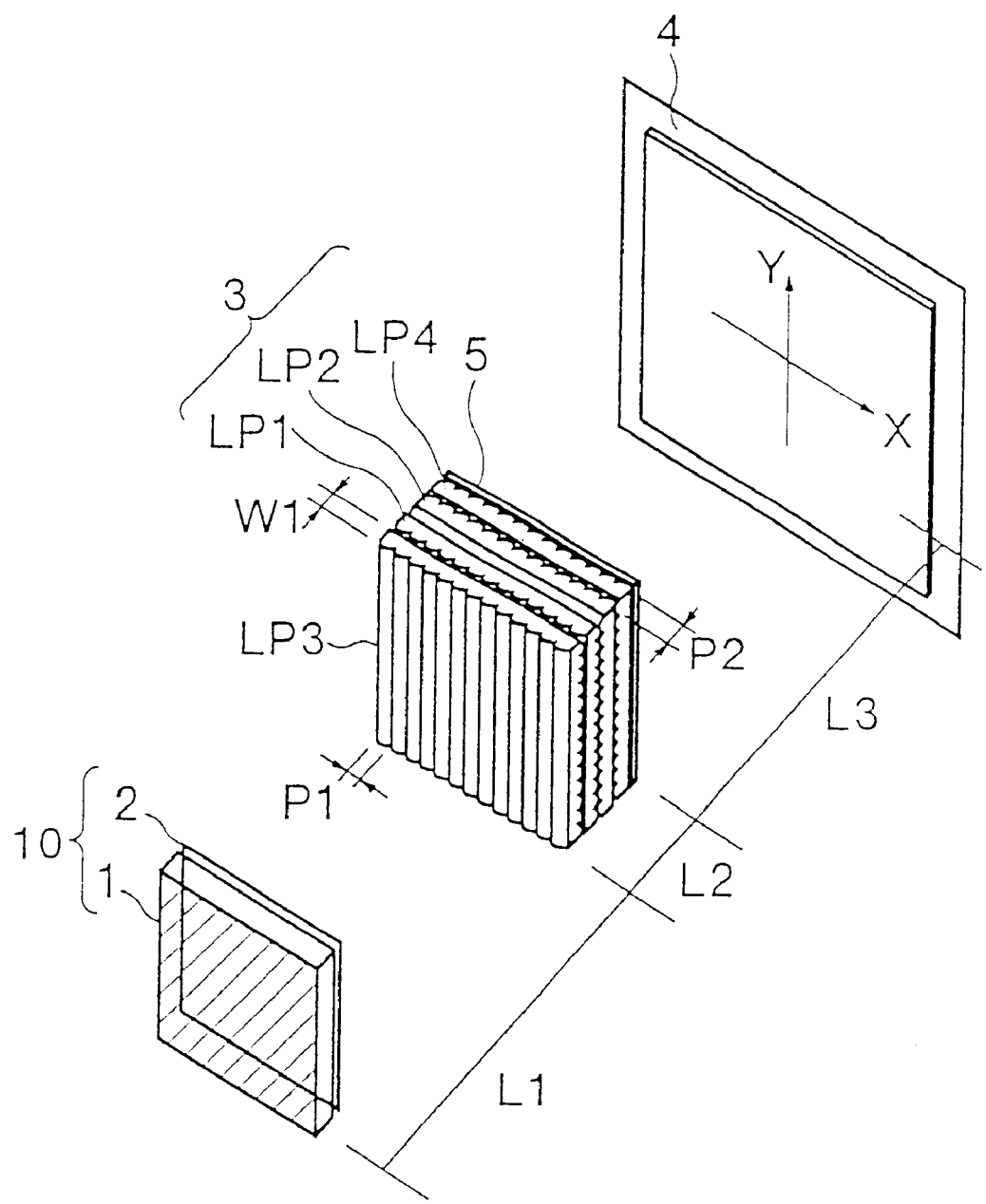
FIG. 14 is a schematic view illustrating the construction of an example of an optical device of the full-size image formation system in accordance with the present invention.

FIG. 14 shows a schematic view illustrating the construction of an optical device of the full-size image formation system in accordance with the present invention.

The cylindrical lens plates (LP1 to LP4) of the image formation unit 3 of FIG. 10 are arranged with intervention of the spacer plates SP1 and SP2, but the device of FIG. 4 is different from that of FIG. 10 in that it does not include such spacer plates.

Figure 15:
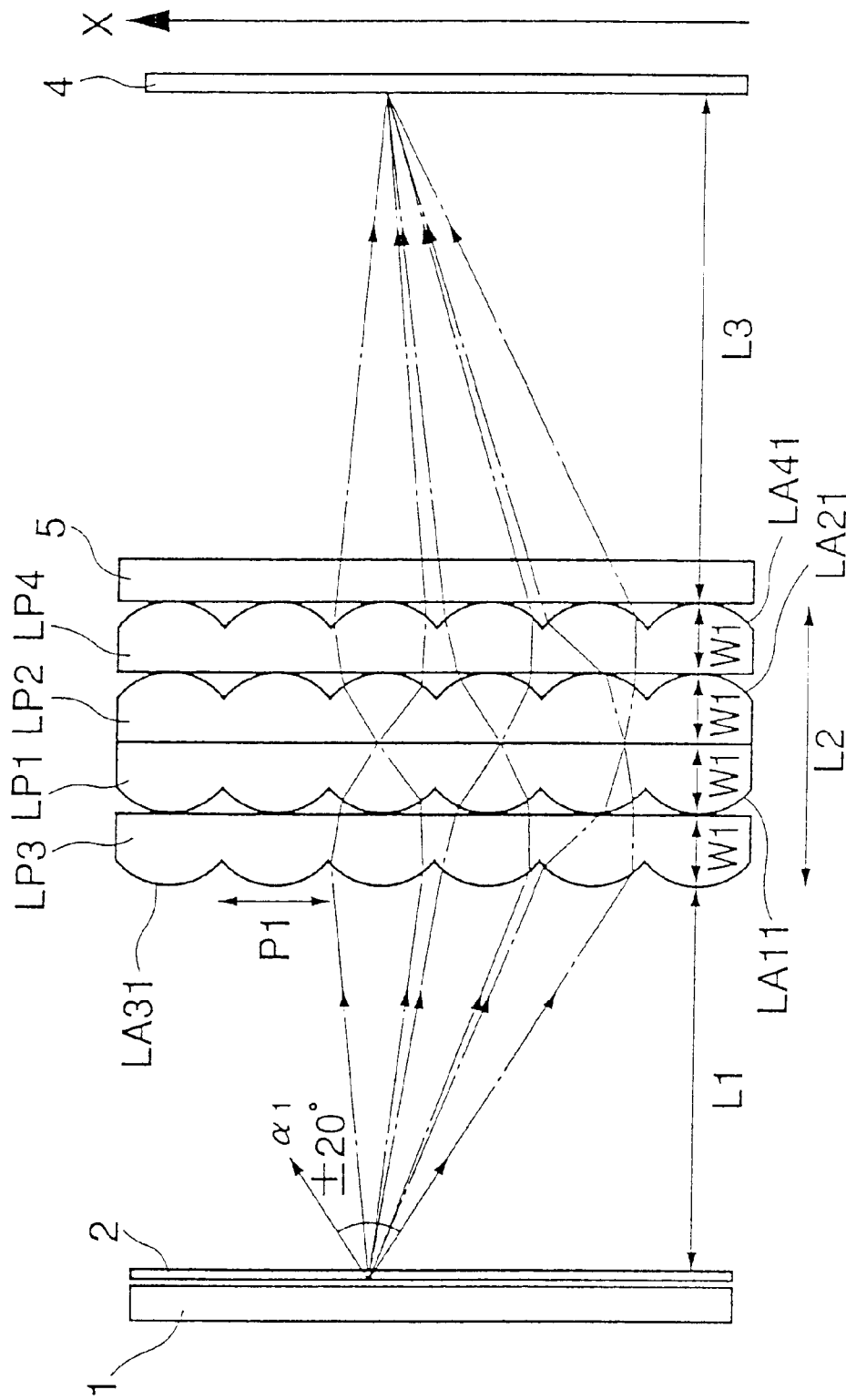
FIG. 15 is a sectional view of the optical device of FIG. 14 as seen in the Y-axis direction (vertical direction)

FIG. 15 is a sectional view of the optical device of FIG. 14 as seen in the Y-axis direction, that is, the vertical direction.

Figure 16:
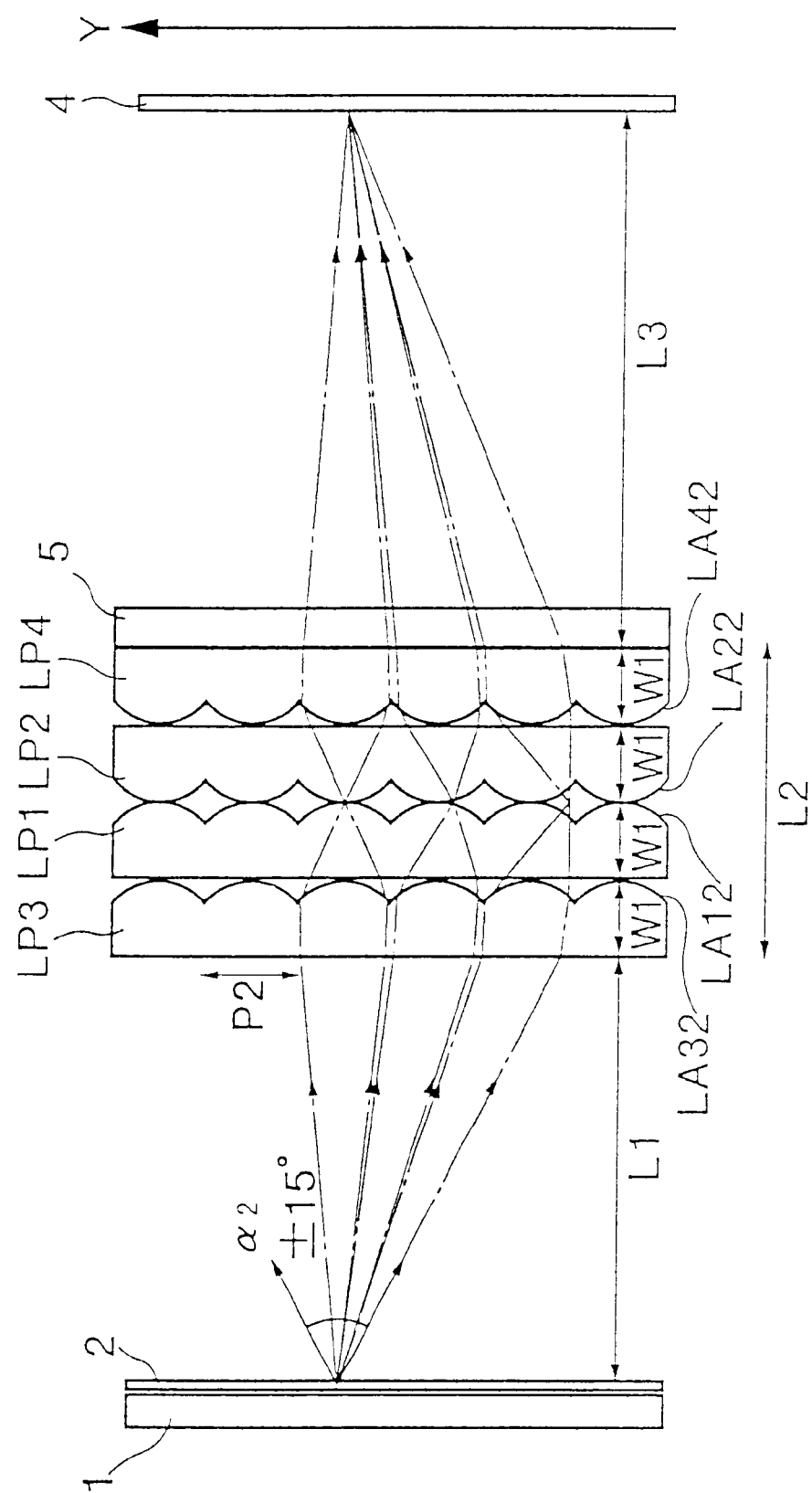
FIG. 16 is a sectional view of the optical device of FIG. 14 as seen in the X-axis direction (lateral direction)

FIG. 16 is a sectional view of the optical device of FIG. 14 as seen in the X-axis direction, that is, the lateral direction. Here, LP1 to LP4 are lens plates formed on their front and rear faces with cylindrical lens arrays whose generatrices are orthogonal to each other, and are arranged in close contact as shown in FIG. 14. The directions of the generatrices of the cylindrical lens arrays on each of the lens plates are the same as shown in FIG. 2.

The thickness W1 of each of the lens plates LP1 to LP4 is 1.0 mm, and the parameters of lenses of the cylindrical lens arrays are as follows:

TABLE 1

|  | Radius of Curvature | Conic Constant | 4th Constant $C_4$ | 6th Constant $C_6$ |
| --- | --- | --- | --- | --- |
| X direction (LCD panel side) on 3rd lens plate (LP3) | 0.921 | −0.56 | $-8.0 \times 10^{-4}$ | $-7.0 \times 10^{-5}$ |
| X direction (screen side) on 4th lens plate (LP4) | 0.921 | −0.56 | $-8.0 \times 10^{-4}$ | $-7.0 \times 10^{-5}$ |
| Y direction (screen side) on 3rd lens plate (LP3) | 0.88621 | −0.485 | $-5.7 \times 10^{-3}$ | $-2.1 \times 10^{-4}$ |
| Y direction (LCD panel side) on 4th lens plate (LP4) | 0.88621 | −0.485 | $-5.7 \times 10^{-3}$ | $-2.1 \times 10^{-4}$ |
| X direction (LCD panel side) on 1st lens plate (LP1) | 0.875 | −2.573 | $-5.5 \times 10^{-5}$ | |
| X direction (screen side) on 2nd lens plate (LP2) | 0.875 | −2.573 | $-5.5 \times 10^{-5}$ | |
| Y direction (screen side) on 1st lens plate (LP1) | 0.8674 | −2.21 | $-3.0 \times 10^{-3}$ | |
| Y direction (LCD panel side) on 2nd lens plate (LP2) | 0.8674 | −2.21 | $-3.0 \times 10^{-3}$ | |

Figure 17:
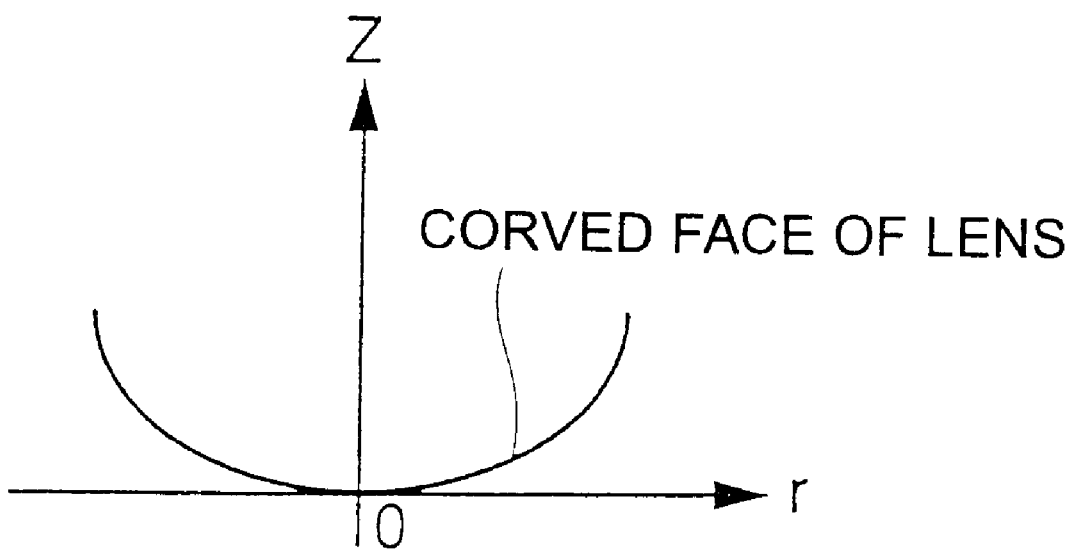
FIG. 17 is a graph representing a general definition formula of a surface configuration of an aspheric lens.

Here, the surface shape of an aspheric lens such as a cylindrical lens is generally defined by the following formula and FIG. 17.

$$Z = \frac{r^2}{R + \sqrt{R^2 - (1+k)r^2}} + \sum_{n=2} C_{2n} r^{2n}$$

wherein Z is sag depth of the lens, r is length from the middle point (length x or length y in the case of a cylindrical lens and r=$\sqrt{x^2+y}$ in the case of a two-dimensional lens), R is radius of curvature, k is conic constant, C2n is high-degree constant, C4 is 4th constant and C6 is 6th constant.

In FIG. 14 and FIG. 16, the lens plates LP1 and LP2 are so arranged that the generatrices of cylindrical lens arrays formed on their contact faces (LA12, LA22) of the lens plates LP1 and LP2 agree with each other.

Also the direction of the cylindrical lens arrays of the lens plates, i.e., X direction or Y direction, is so determined for arrangement of the lens plates that on contact faces of LP1 and LP3 and contact faces of LP2 and LP4, that is, surfaces LA32 and LA11 and surfaces LA21 and LA42, the generatrices of cylindrical lens arrays formed thereon are orthogonal to each other.

The directivity of a backlight 1 is so set that the angle of radiation of a major part of the light emitted from the LCD panel 2 in FIG. 14 becomes as small as possible. However, it is generally difficult to make equal the angles of radiation in the X direction and the Y direction. Though there are various cases depending upon the characteristics of a light source of the backlight 1, the angle of radiation in the X direction α1 is ±20 degrees while the angle of radiation in the Y direction α2 is ±15 degrees, for example. In this case, the image formation characteristics in the X direction in which the angle of radiation is larger are worse than the image formation characteristics in the Y direction in which the angle of radiation is smaller.

On the other hand, it is known that image formation using lens arrays (LA31 and LA41) on outside surfaces of the lens plates LP3 and LP4 has better focusing characteristics than image formation using lens arrays (LA32 and LA42) on inside surfaces of these lens plates because the lens arrays LA31 and LA41 have a longer optical path length.

In the construction of the lens plates shown in FIG. 15, image formation by the lens arrays LA31 and LA41 whose generatrices extend in the Y-axis direction has better focusing characteristics.

Accordingly, by performing image formation in the X direction, which has worse image formation characteristics owing to the larger angle of radiation, by the lens arrays (LA31, LA41) on the outside surfaces exhibiting better focusing characteristics, it is possible to uniform one-dimensional erect full-size image formation performance in the X direction and in the Y direction.

On the other hand, the image formation in the Y direction orthogonal to the X direction in which the angle of radiation is larger may be performed by the lens arrays (LA32, LA42) on the inside surfaces of the lens plate.

More particularly, as shown in FIG. 15, the image formation in the X direction in which the angle of radiation is larger ($\alpha 1 = \pm 20$ degrees) is performed by the lens arrays on the LCD panel side surface (LA31) of the lens plate LP3, on the LCD panel side surface (LA11) of the lens plate LP1, on the screen side surface (LA21) of the lens plate LP2 and on the screen side surface (LA41) of the lens plate LP4, which are of an image formation system having relatively good focusing characteristics. As shown in FIG. 16, the image formation in the Y direction in which the angle of radiation is smaller ($\alpha 2 = \pm 15$ degrees) is performed by the lens arrays on the screen side surface (LA32) of the lens plate LP3, on the screen side surface (LA12) of the lens plate LP1, on the LCD panel side surface (LA22) of the lens plate LP2 and on the LCD panel side surface (LA42) of the lens plate LP4, which are of an image formation system having relatively bad focusing characteristics.

Further, since the angle of radiation varies in the X direction and in the Y direction, ghosts may occur if the pitch is the same through all the lens arrays.

Therefore, in order to prevent the occurrence of ghosts, preferably, the pitch may be changed between the X direction and the Y direction.

For example, the array pitch P1 of the lens arrays on the surfaces LA31, LA11, LA21 and LA41 of the lens plates shown in FIG. 14 and FIG. 15 may be 1.5 mm while the array pitch P2 of the lens arrays on the surfaces LA32, LA12, LA22 and LA42 of the lens plates shown in FIG. 14 and FIG. 16 may be 1.2 mm.

Further, an adhesive having a light transmitting property may be used for contacting the four lens plates closely.

The image formation unit 3 thus constructed may be about 4 mm in total length (L2) and can be shorter by 1 mm or more than the construction with the intervening spacer plates (L2=5.62 mm in FIG. 1). In FIG. 14, distance L1 is 40 mm and L3 is 45 mm.

Furthermore, since the spacer plates are not used in the image formation unit shown in FIG. 14, not only the number of components but the number of production steps can be reduced.

The optical device shown in FIG. 14, FIG. 15 and FIG. 16 is an example in which the angle of radiation of light is larger ($\pm 20$ degrees) in the X direction. However, if the angle of light radiation is larger ($\pm 20$ degrees) in the Y direction, the direction of each lens plate of the image formation unit may be turned by 90 degrees.

Figure 18:
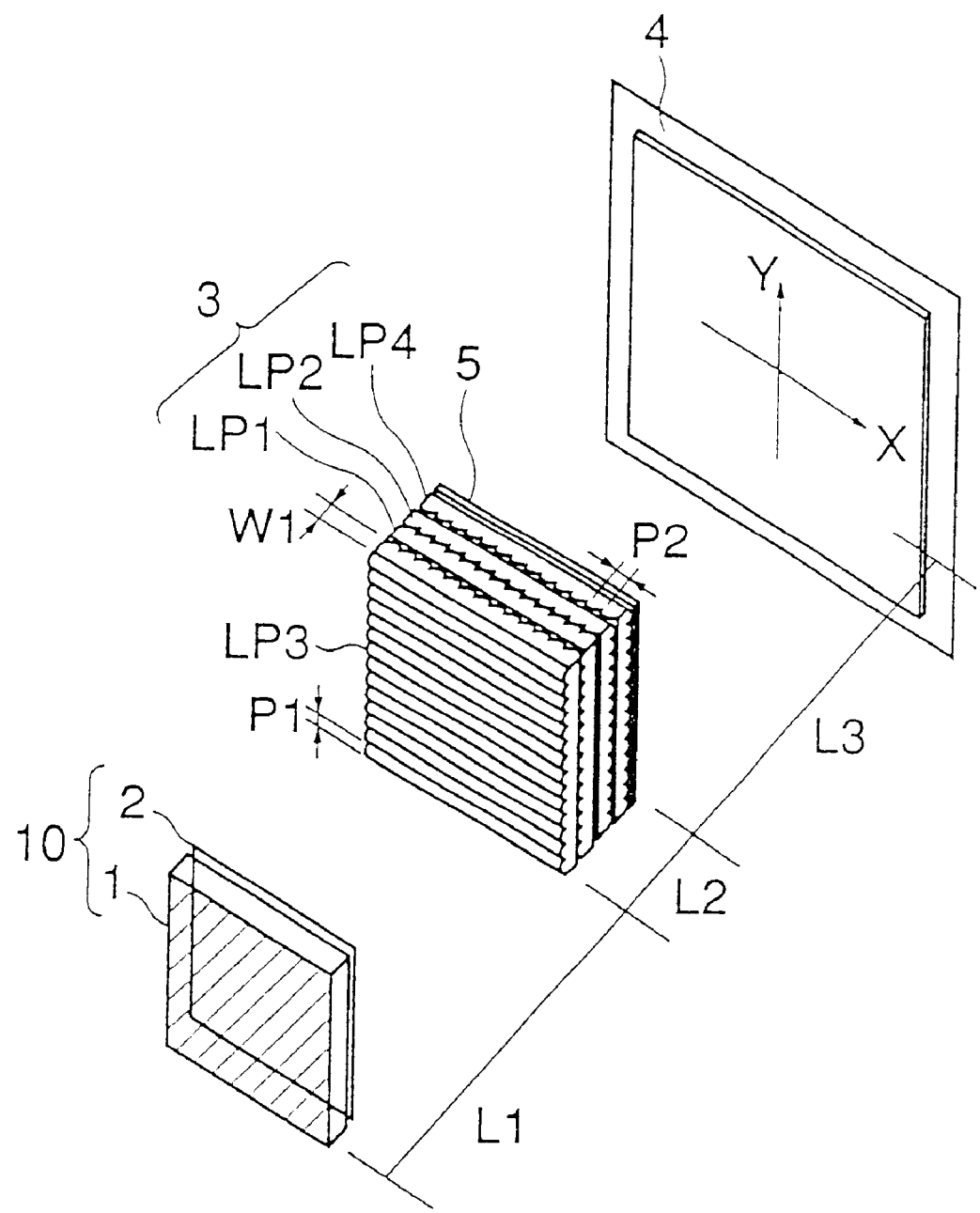
FIG. 18 is a schematic view illustrating the construction of an example of an optical device in accordance with the present invention in the case where an exit angle in the Y-axis direction is larger.

FIG. 18 shows a view illustrating the construction of an optical device in which an exit angle in the Y direction is larger.

The directions of lens plates (LP1 to LP4) of an image formation unit 3 are turned by 90 degrees as compared with the optical device of FIG. 14. Here, P1 is 1.5 mm, P2 is 1.2 mm and W1 is 1.0 mm.

The lens plates may be formed of quartz or a transparent fluorine plastic. However, for designing lenses of large curvature, a material having a large refractive index is used for a surface portion having a lens function and a material having a small refractive index is used for a base portion which is not the surface portion and does not have the lens function. Generally, the aberration of lenses can be decreased by increasing the curvature of the lenses.

Also, by using a material with a small refractive index for the base portion not having the lens function, optical distances between lenses can be prolonged and consequently the focal length of the lenses can be set longer. Thereby the aberration of lenses can also be decreased.

As examples of materials with a large refractive index, may be mentioned PET (polyethylene terephthalate: n=1.64), PC (polycarbonate: n=1.59) and the like.

As examples of materials with a small refractive index, may be mentioned transparent fluorine plastics (n=1.35), PMMS (acrylic resin: n=1.50), quartz (n=1.46) and the like.

For forming the cylindrical lens array on each lens plate, a mold is produced which has a concave shape reverse to the shape of the lens array, a lens material is put in the mold and any one of an injection molding method, a thermal press method and a 2P (photo-polymer) method may be used.

In the case where the surface portion forming the lens and the base portion are formed of different materials, the surface portion may be produced using the thermal press method or the 2P method and then may be bonded to the base portion produced of quartz or the like with a transparent adhesive.

The above-mentioned FIG. 14 and other figures show the constructions in which the cylindrical lens arrays are disposed on the surfaces of the lens plates. For reducing the occurrence of ghosts and for facilitating the assembly of the image formation unit 3, i.e., the alignment of the lens plates, protrusions may be provided at joints in the lens arrays.

Figure 19:
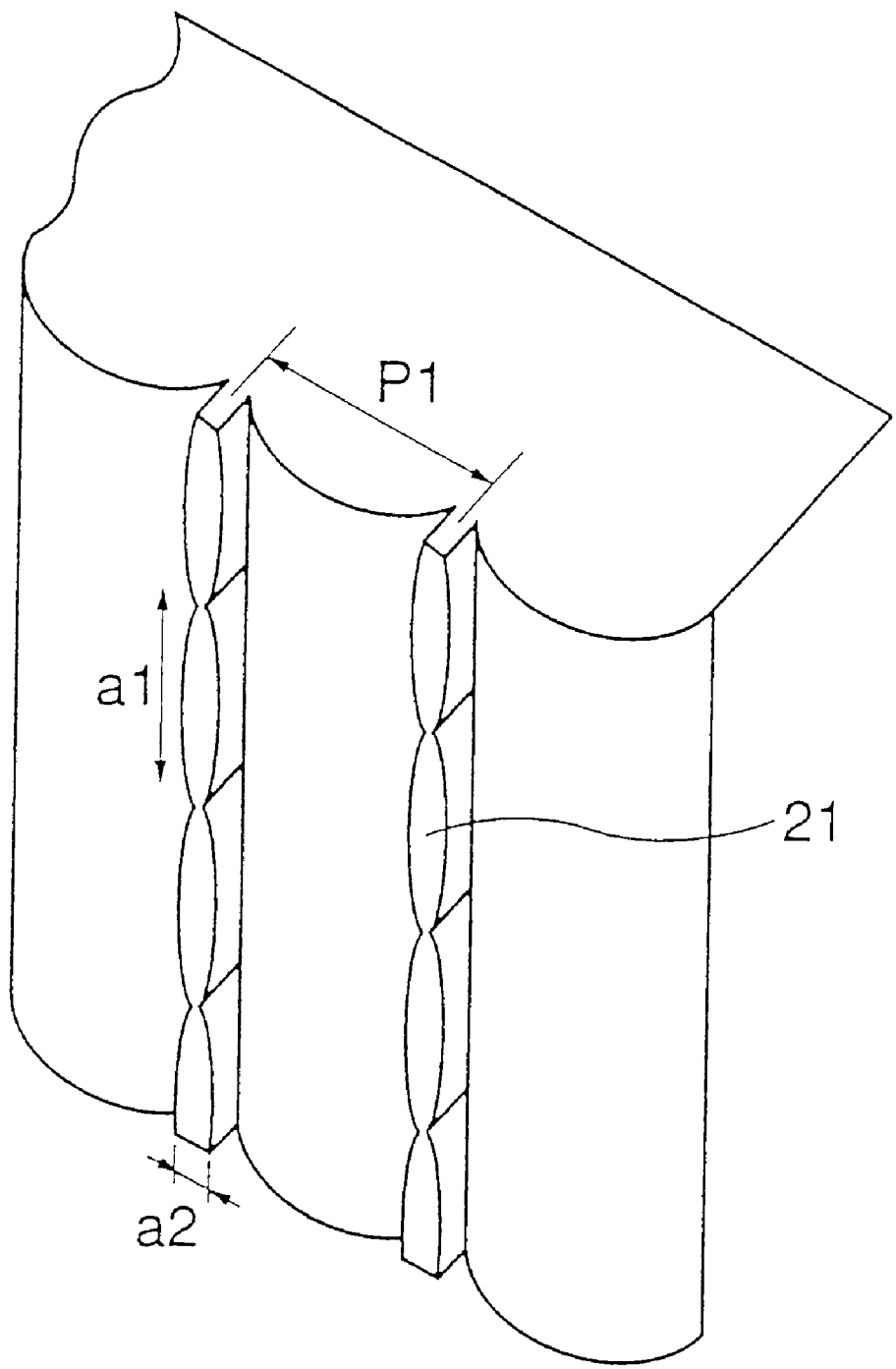
FIG. 19 is a partially enlarged view of a construction in which protrusions are provided on a surface of each lens plate of an image formation unit of an optical device in accordance with the present invention.

FIG. 19 shows a partially enlarged view of a construction in which protrusions 21 are provided on the surface of each lens plate in accordance with the present invention.

In FIG. 19, reference mark P1 denotes the pitch of the lens array. The size of each protrusion may be such that a1=1.0 mm, a2=0.1 mm or less and the height thereof is substantially the same level as the height of the lens. Here, the protrusions 21 are shown to have a pillar shape whose section is elliptical, but their shape is not limited thereto. However, the protrusions 21 are required to have scattering faces which do not affect the image formation adversely since they are formed at the joints between lenses.

If side faces of the projections are smooth, they may transmit or reflect light which is to contribute to the image formation, which may sometimes cause ghosts to appear. If the side faces of the protrusions are scattering faces, such light that may have adverse effect can be scattered in various directions and the appearance of ghosts can be prevented.

For example, if the protrusions 21 are formed in elliptical pillars as shown in FIG. 19, the side surfaces are not complete scattering faces but simple scattering faces which reflect light in different directions depending upon light incident sites on the protrusions 21. Therefore, ghosts can be prevented from occurring.

By providing such protrusions 21 on both the front and rear surfaces of the lens plates, it is possible to prevent deformation of lens faces because the lens plates are supported not only by the lens faces but also by other portions when they are brought in close contact.

Further, if the side faces of the protrusions 21 are formed in a form with a flecked effect having small depressions and projections, the scattering property can be improved and the occurrence of ghosts can be prevented better. Furthermore, if the side faces of the protrusions 21 are patterned with a black paint containing carbon, the side faces become low-reflective faces and therefore the occurrence of ghosts can be prevented further.

It is noted, however, that the protrusions are preferably as thin as possible so that they cut off only the light causing the occurrence of ghosts and do not cut off the light which should contribute to the image formation.

Figure 20:
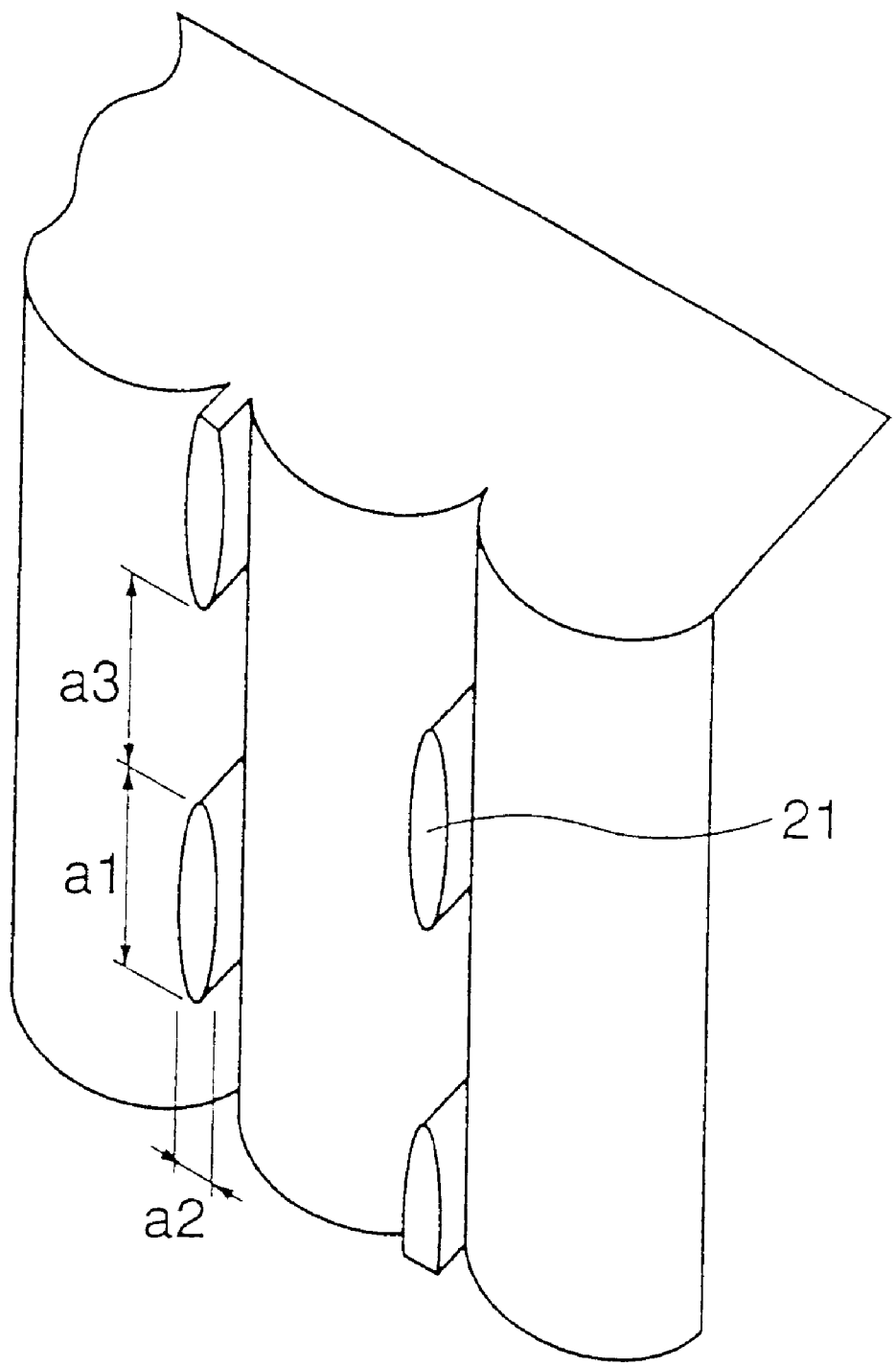
FIG. 20 is a partially enlarged view of a construction in which protrusions are provided spacedly on a surface of each lens plate of an image formation unit of an optical device in accordance with the present invention.

Further, in order to reduce the cutting-off of the light to contribute to the image formation, it is preferable that the protrusions 21 are formed spacedly as shown in FIG. 20.

In FIG. 20, preferably, a1 is 1.1 mm, a2 is 0.1 mm or less, the interval a3 between protrusions is about 1.1 mm.

Such spaced protrusions 21 can function as alignment markers when the lens plates are brought in close contact.

Figure 21:
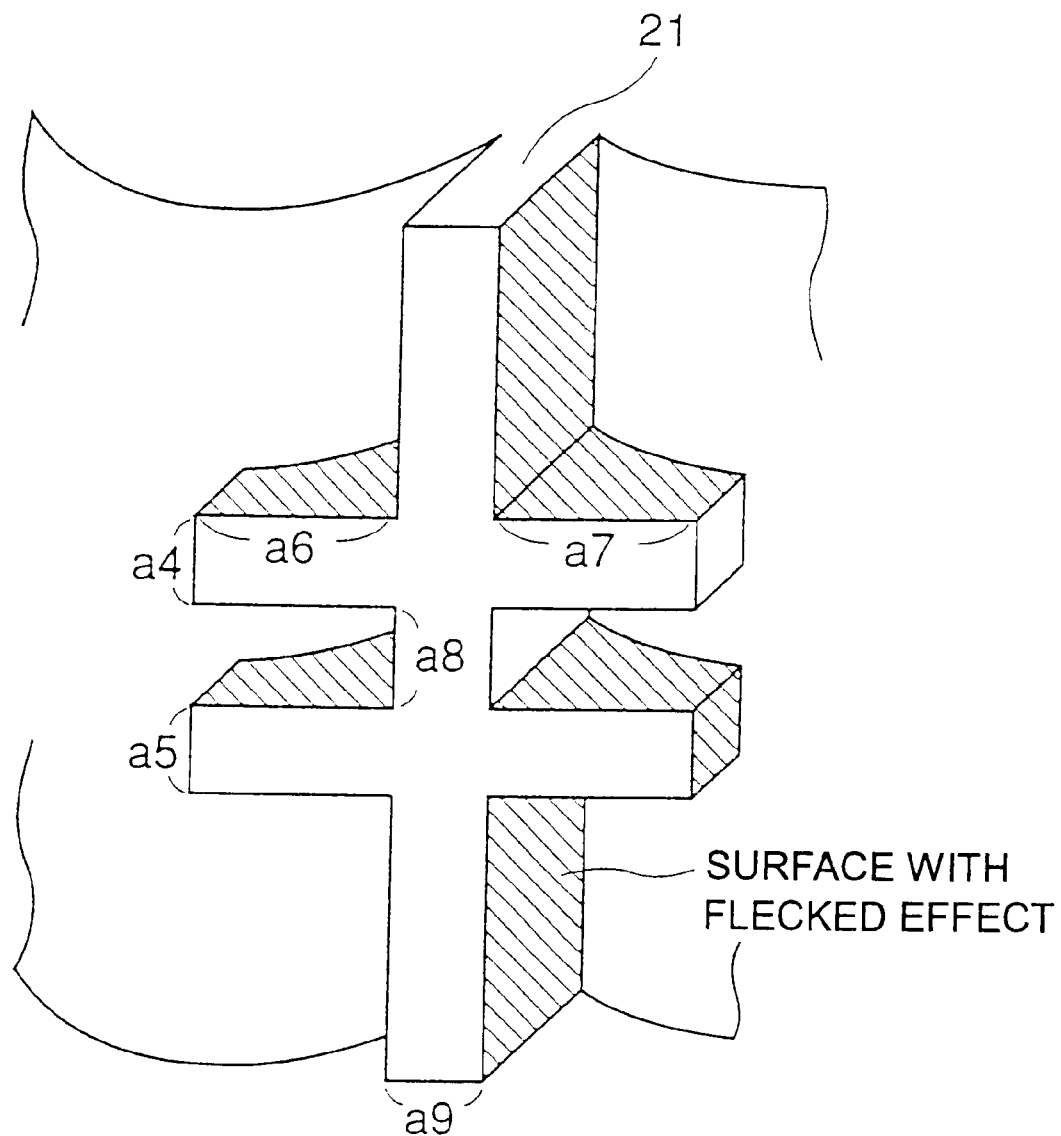
FIG. 21 is a partially enlarged view of a construction in which protrusions in a special shape are provided on a surface of each lens plate of an image formation unit of an optical device in accordance with the present invention.
Figure 22:
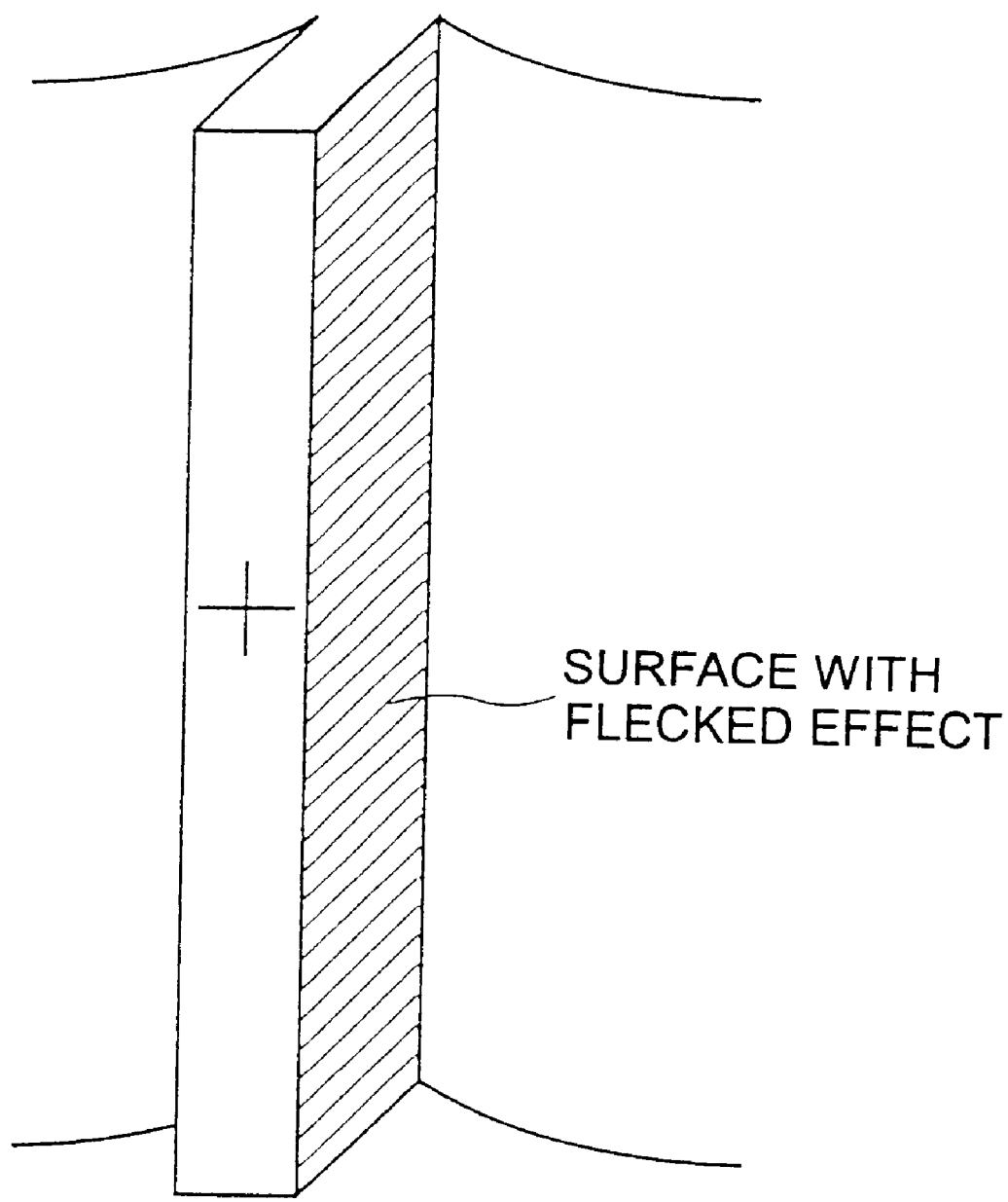
FIG. 22 is a partially enlarged view of a construction in which protrusions formed with a pattern for alignment are provided on a surface of each lens plate of an image formation unit of an optical device in accordance with the present invention.

Further, it is possible to facilitate the process of assembling the lens plates and improve accuracy in alignment by forming the protrusions partially in a specific shape as alignment markers as shown in FIG. 21 or by forming a pattern for alignment such as "cross mark" on top faces of the protrusions 21 as shown in FIG. 22.

FIG. 21 shows an example in which the protrusions 21 are formed in a specific shape and their side faces are in the form with flecked effect. In the figure, a4 is 0.1 mm, a5 is 0.1 mm, a6 is 0.2 mm, a7 is 0.2 mm, a8 is 0.1 and a9 is 0.1 mm.

FIG. 22 shows an example in which a cross mark of 0.08 mm×0.08 mm is formed as an alignment pattern on the top face of the protrusion 21.

Figure 23:
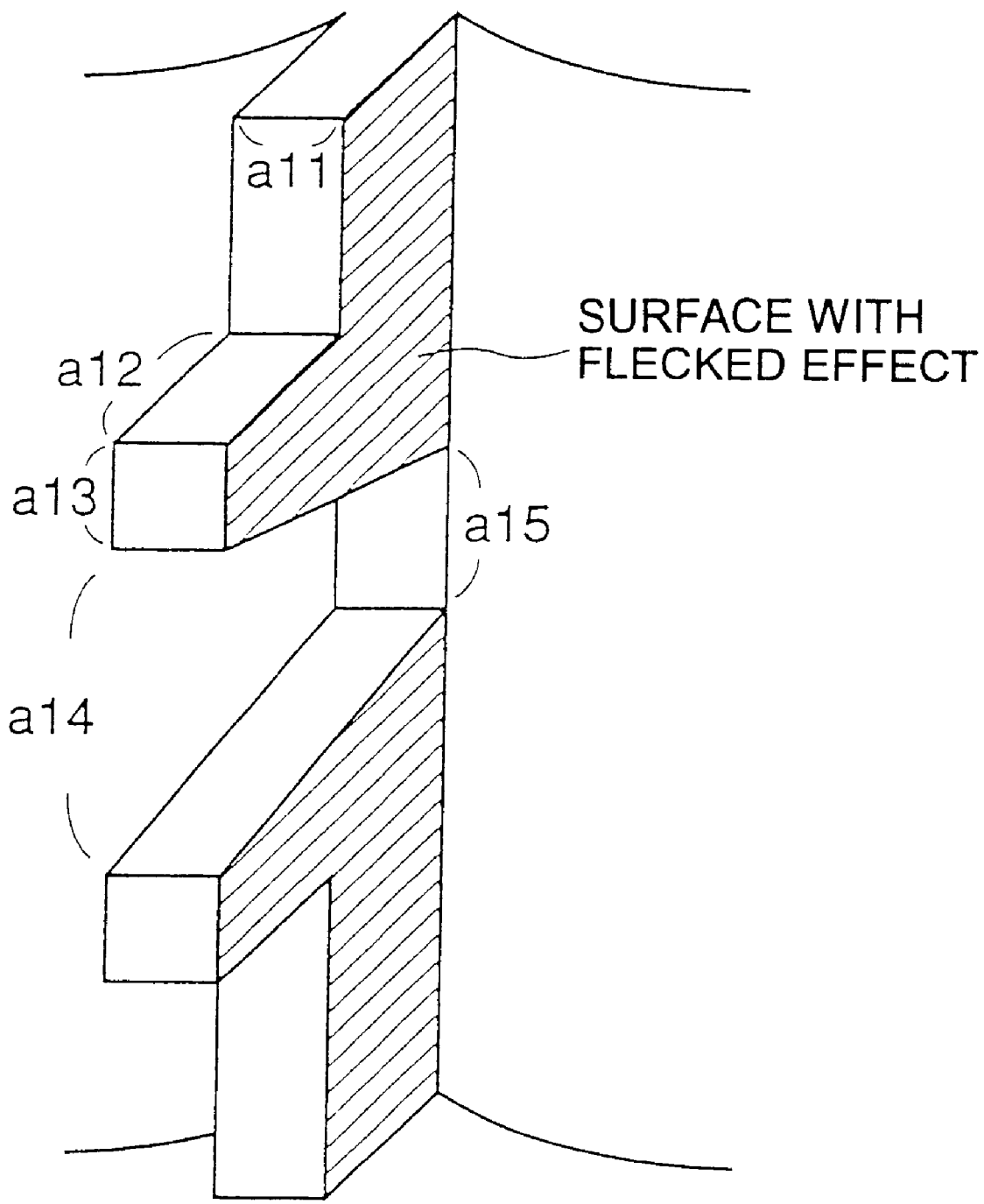
FIG. 23 is a partially enlarged view of a construction in which protrusions having projections and depressions with different heights are provided on a surface of each lens plate of an image formation unit of an optical device in accordance with the present invention.

Further, the protrusions 21 may be formed to have depressions and projections of different heights as shown in FIG. 23. If the protrusions 21 are formed to have projections higher than the lens surface and depressions lower than the lens surface, the two lens plates to be brought in close contact can be engaged to each other, which facilitates the assembly of the image formation unit more.

FIG. 23 shows an example in which protrusions having projections and depressions with different heights are provided. In the figure, a11 is 0.1 mm, a12 is 0.1 mm, a13 is 0.1 mm, a14 is 0.3 mm and a15 is 0.15 mm.

Further, protrusions having a specific shape for alignment as shown in FIG. 21, FIG. 22 or FIG. 23 may be provided in a large number within the lens arrays, but they may be provided in a portion which does not contribute to the image formation, for example, in a peripheral part of each lens plate. By providing the projections only in the peripheral part, adverse effects such as the cutting-off of the light to contribute to the image formation are avoided.

Next, explanation is given of a process for producing the protrusions 21.

As shown in FIG. 19 and FIG. 20, in the case where the lenses and the protrusions are formed of the same material, a mold for forming the lenses may be provided beforehand with a pattern to form the protrusions when transferred, and the lenses and the protrusions may be produced at the same time using this mold.

In the case where the side faces of the projections are formed as scattering faces of low reflectance and low transmissivity or colored with a black paint, a pattern of black resist is formed only on the side faces of the protrusions 21 by a photolithography technique. As the black resist, may be used a resist containing a black pigment such as carbon particles or the like.

Alternatively, the lens plate may be formed without protrusions 21, and then the protrusions 21 may be formed by the photolithography technique using a thick resist film containing a light-shielding material such as carbon particles or the like.

Alternatively, lens plates without protrusions 2 are contacted closely, and then the protrusions 21 are formed by inserting a fine resin fiber or glass fiber colored with a black paint into the joints of the lenses in such a manner that the protrusions are sandwiched between the lenses.

Next, explanation is given to a construction of an optical device of the erect full-size image formation system in which two lens plates are placed in close contact and two-dimensional lens arrays whose optical axes agree to each other on the front and back faces of the lens plates.

In this construction, since the image formation unit 3 is composed of two lens plates, the number of components decreases and the assembly is easier.

Figure 24:
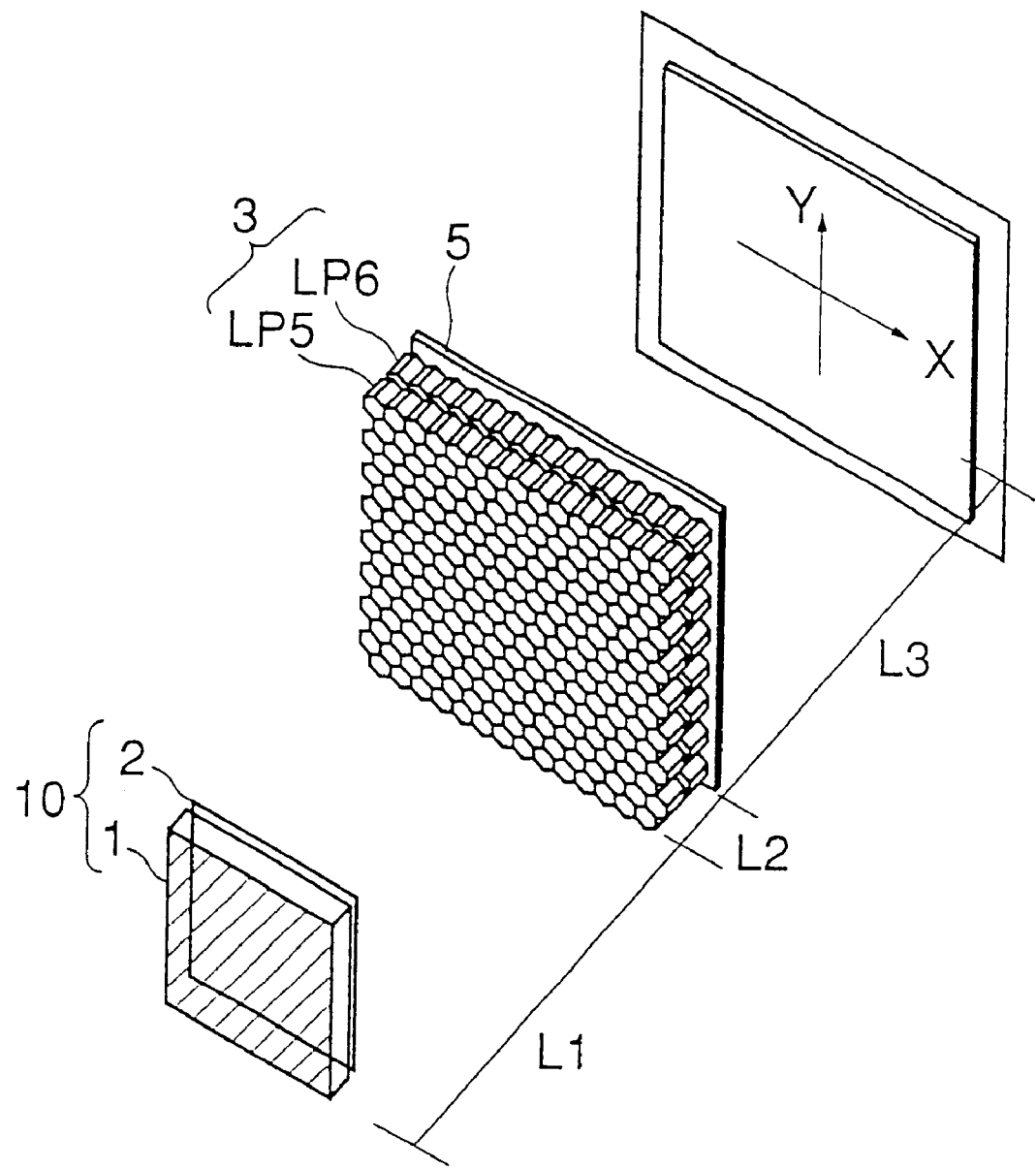
FIG. 24 is a schematic view illustrating the construction of an example of an optical device of the full-size image formation system in accordance with the present invention.
Figure 25:
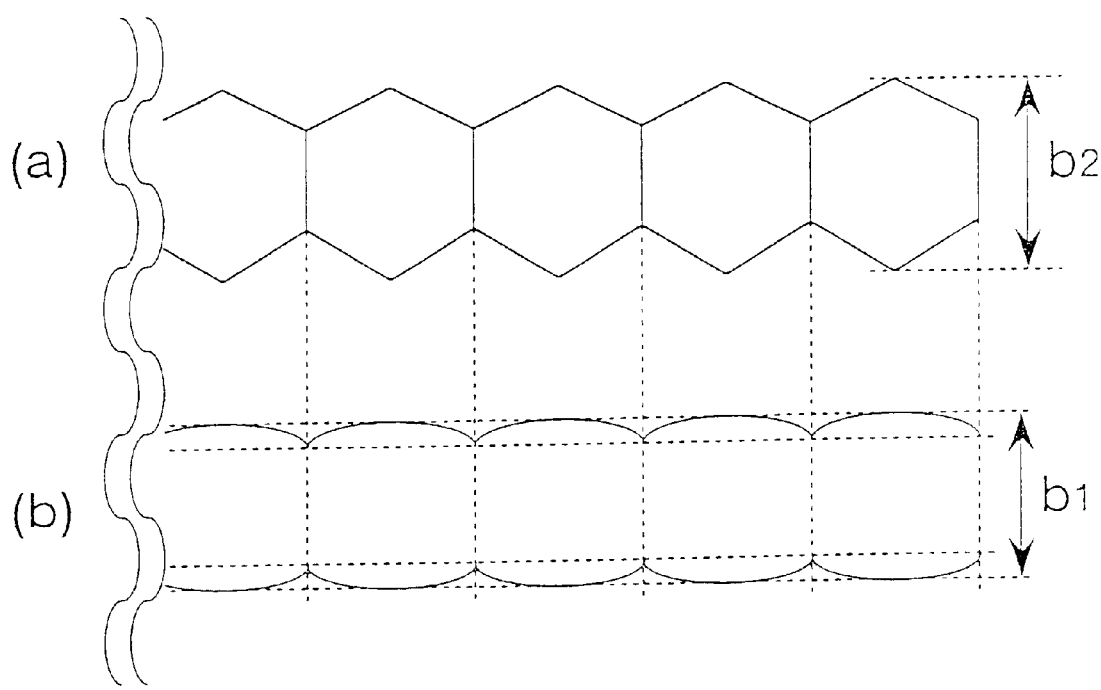
FIGS. 25(a) and 25(b) are sectional views of an example of a two-dimensional lens array plate in accordance with the present invention.

FIG. 24 shows a schematic view illustrating the construction of an optical device of the full-size image formation system of the invention.

Figure 26:
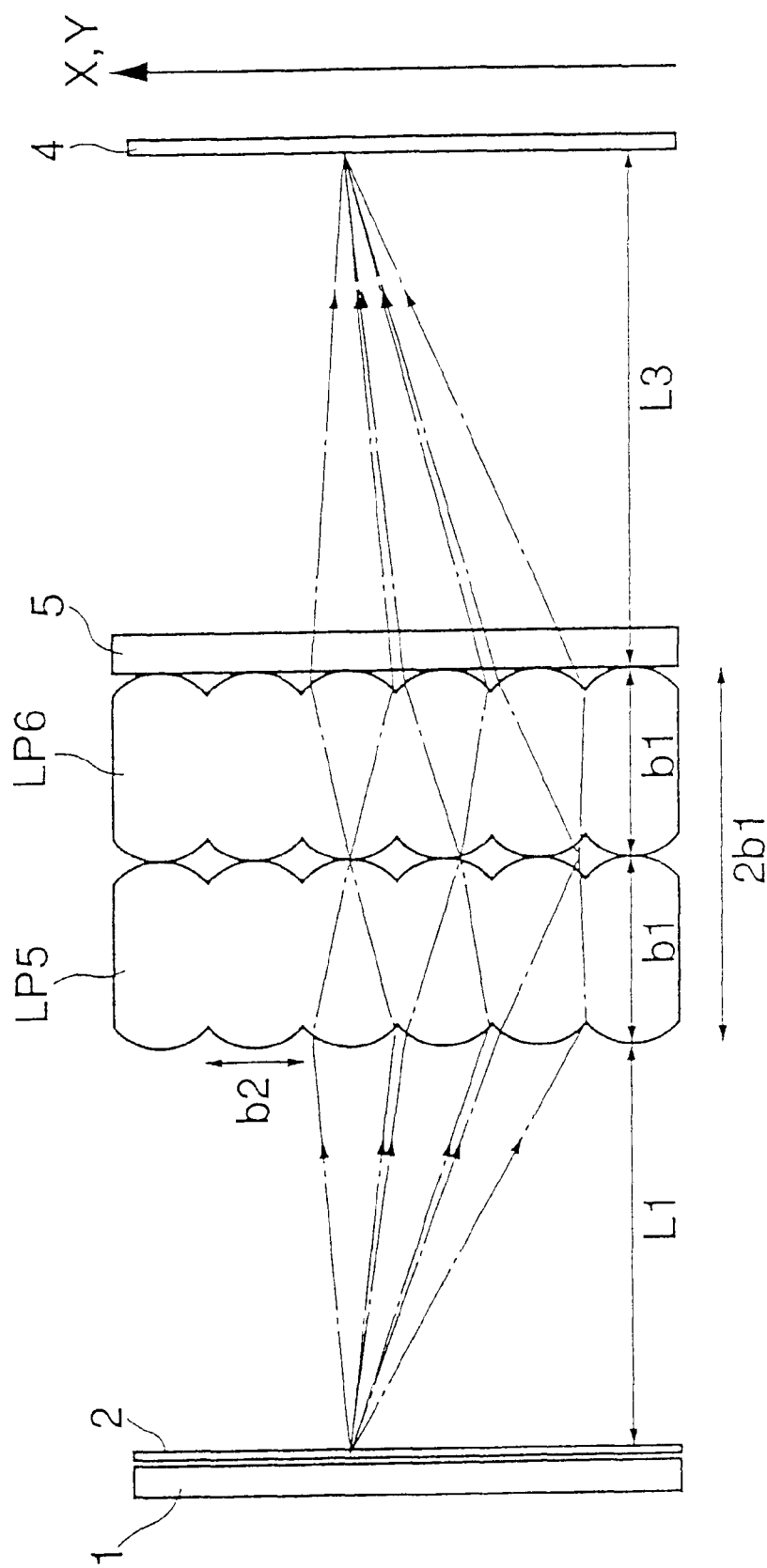
FIG. 26 is a sectional view of the optical device of FIG. 24 as seen in the direction of X- or Y-axis.

FIG. 26 shows a sectional view of the optical device of FIG. 24 as seen in the X- or Y-axis direction.

Here, this optical device is different from the optical device of FIG. 14 in that the image formation unit 3 is composed of a couple of two-dimensional lens array plates (LP5, LP6) The two-dimensional lens array plates are brought in close contact with each other.

On the front and rear faces of the two-dimensional lens array plates LP5 and LP6, a large number of lenses are two-dimensionally formed.

FIGS. 25(a) and 25(b) show sectional views of an example of a two-dimensional lens array plate in accordance with the present invention.

FIG. 25(a) is a view of a part of the surface of the two-dimensional lens array plate as seen from above, and FIG. 25(b) is a side view of the two-dimensional lens array plate.

In FIG. 25(a), the cross section of each of the lenses is a regular hexagon.

However, the cross section of the lenses is not particularly limited thereto and may be in various shapes such as a circle, hexagon, rectangle, square, octagon and the like.

In the case where the cross section of the lenses is circular, gaps are formed between the lenses. If the lenses are arranged most densely, gaps are not formed and therefore variations in the lens characteristics in an X-Y plane direction can be suppressed low. Accordingly, the cross sectional shape of the lenses formed on the front and back faces of this two-dimensional lens array is preferably such that the lenses can be arranged most densely without gaps.

If the cross section is a regular hexagon or a square, the lenses can be arranged most densely without gaps when they are placed two-dimensionally.

Further, as shown in FIG. 25(b), the lenses are two-dimensionally arranged on both the front and rear faces of the two-dimensional lens array plate so that the optical axes of a pair of lenses formed on the front and rear faces agree with each other.

In FIGS. 25(a) and 25(b), the length b1 between the front and back lenses (thickness of the lens plate) is 2.81 mm, and the length b2 of a diagonal line of each lens in the form of a regular hexagon is 2.0 mm.

Parameters of the lens plates LP5 and LP6 are as follows:

TABLE 2

|  | Radius of Curvature | Conic Constant | 4th Constant | 6th Constant | 8th Constant |
| --- | --- | --- | --- | --- | --- |
| LCD panel side face of lens plate LP5 | 0.9986 mm | −0.442 | $7.0 \times 10^{-5}$ | $4.8 \times 10^{-4}$ | $2.8 \times 10^{-4}$ |
| Screen side face of lens plate LP6 | 0.9986 mm | −0.442 | $7.0 \times 10^{-5}$ | $4.8 \times 10^{-4}$ | $2.8 \times 10^{-4}$ |
| Screen side face of lens plate LP5 | 1.042 mm | −0.292 | $-1.36 \times 10^{-2}$ | $-1.01 \times 10^{-2}$ |  |
| LCD panel side face of lens plate LP6 | 1.042 mm | −0.292 | $-1.36 \times 10^{-2}$ | $-1.01 \times 10^{-2}$ |  |

Since the lens plates LP5 and LP6 are placed in close contact as shown in FIG. 26, the width 2b1 of the image formation unit 3 is 5.62 mm. In addition, a distance L1 is 40 mm and L3 is 45 mm.

A Fresnel concave lens 5 is placed in close contact with the lens plate LP6. In FIG. 26, arrows show routes of the light emitted from an LCD panel 2 and incident on a screen.

In the case where the light emitted from the LCD panel 2 has a distribution of the angle of radiation of ±20 degrees in the X direction and ±15 degrees in the Y direction, as described above, the focusing characteristics are improved if the shape of the lenses is a horizontally long hexagon of FIG. 24.

For example, regarding the lenses formed on the front and rear faces of the lens plates LP5 and LP6, the lens pitch in the X direction may be 2.0 mm and the lens pitch in the Y direction may be 1.5 mm.

Further, the image formation characteristics can be further improved by varying the above-mentioned parameters such as the radius of curvature, etc., between the X direction and the Y direction according to radiation characteristics in X direction and the Y direction.

Next, explanation is given of a construction of an optical device of the magnified image formation system in which the image formation characteristics can be further improved.

Here, the optical device is composed of four cylindrical lens plates similarly to the optical device shown in FIG. 1, but characteristically the lenses on the cylindrical lens plates are so formed that the optical axes of the lenses on the cylindrical lens plates are substantially the same as the traveling directions of light passing at the apexes of the lenses.

Figure 27:
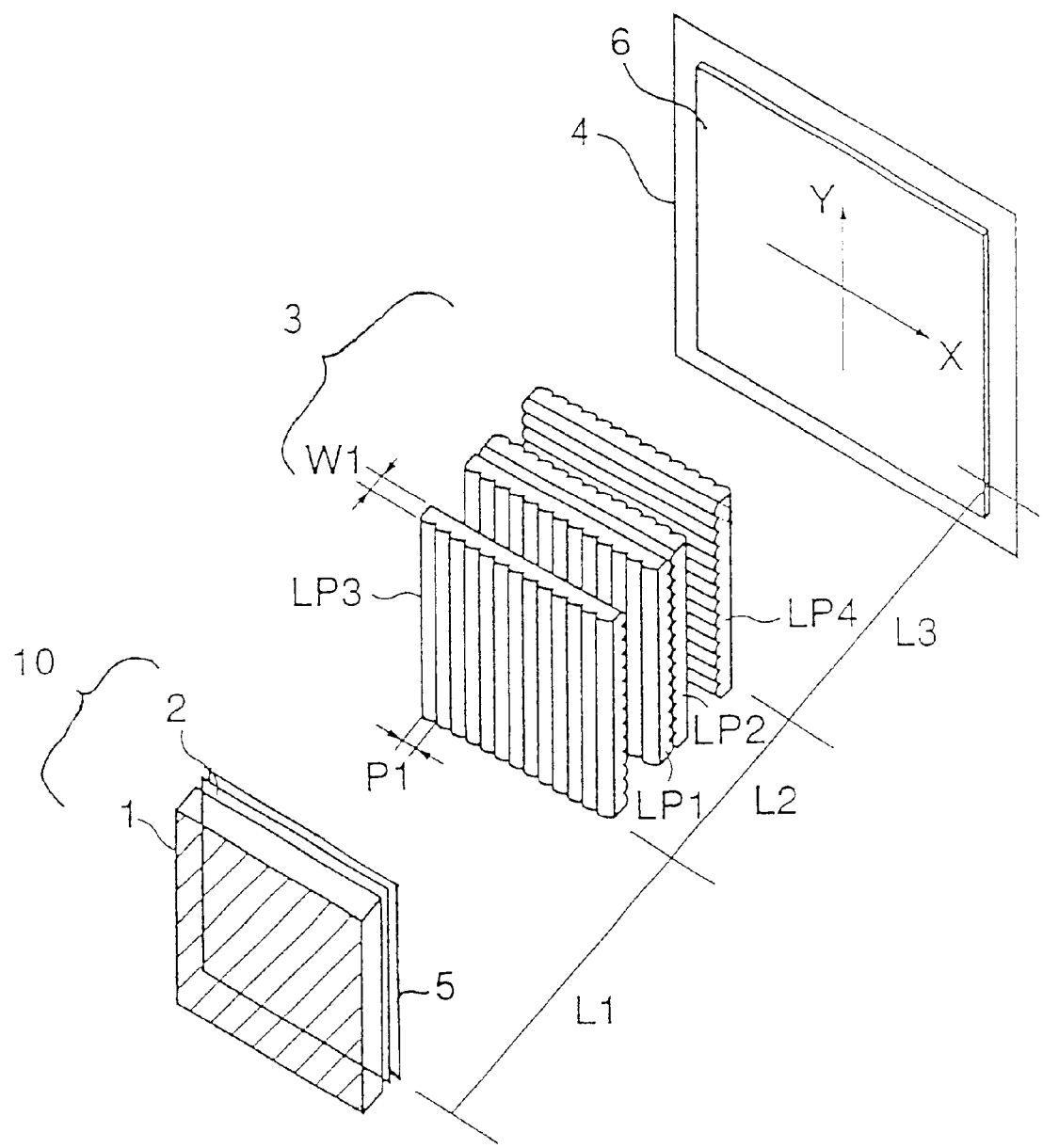
FIG. 27 is a schematic view illustrating the construction of an example of an optical device of the magnified image formation system in accordance with the present invention.

FIG. 27 is a schematic view illustrating the construction of this optical device of the magnified image formation system of the invention.

In FIG. 27, the optical device is composed of a display unit 10 for producing an image having a backlight 1 and an LCD panel 2, four cylindrical lens plates (LP1, LP2, LP3, LP4) constituting an image formation unit 3, a screen 4 for forming a projected image with light passing through the image formation unit 3, a Fresnel concave lens 5 placed in the vicinity of a surface of the LCD panel 2 and a Fresnel convex lens 6 placed in the vicinity of a surface of the screen 4.

The Fresnel concave lens 5 placed in the vicinity of the surface of the LCD panel 2 is for changing the traveling direction of the light emitted from the LCD panel 2 into spreading directions for forming a magnified image, and the Fresnel convex lens 6 placed in the vicinity of the surface of the screen 4 is for changing the travel direction of the light incident from the image formation unit 3 which light has a certain inclination, into a direction orthogonal to the screen 4.

In the optical device of FIG. 27, the distance L1 from the surface of the LCD panel 2 to the surface of the lens plate LP3 of the image formation unit 3 which plate is the nearest to the LCD panel is 40 mm, the width L2 of the four lens plates of the image formation unit 3 is 11.207 mm, and the distance L3 from the surface of the screen 4 to the lens plate LP4 of the image formation unit 3 which plate is the nearest to the screen 4 is 45 mm.

With this arrangement of the components, an object displayed on the LCD panel 2 is magnified 1.15 times on the screen. Additionally, the thickness W1 of each of the lens plates LP1 to LP4 constituting the image formation unit 3 is 2.1 mm. Parameters of the lenses of the cylindrical lens arrays are as follows:

TABLE 3

|  | Radius of Curvature | Conic Constant | 4th Constant | 6th Constant | 8th Constant |
| --- | --- | --- | --- | --- | --- |
| X direction (LCD panel side face) of 3rd lens plate (LP3) | 2.7838 | −0.68 | $+4.1 \times 10^{-3}$ | $-3.6 \times 10^{-4}$ | $-1.0 \times 10^{-7}$ |

TABLE 3-continued

| | Radius of Curvature | Conic Constant | 4th Constant | 6th Constant | 8th Constant |
|---|---|---|---|---|---|
| Y direction (screen side face) of 3rd lens plate (LP3) | 1.52725 | −2.26 | $+4.0 \times 10^{-4}$ | $-1.1 \times 10^{-4}$ | |
| X direction (LCD panel side face) of 1st lens plate (LP1) | 1.6374 | −2.8 | $+6.7 \times 10^{-4}$ | $-1.1 \times 10^{-4}$ | |
| Y direction (screen side face) of 1st lens plate (LP1) | 1.6283 | −0.74 | $-9.0 \times 10^{-4}$ | | |
| Y direction (LCD panel side face) of 2nd lens plate (LP2) | 1.6086 | −0.74 | $-1.0 \times 10^{-3}$ | | |
| X direction (screen side face) of 2nd lens plate (LP2) | 1.6373 | −2.82 | $+1.1 \times 10^{-3}$ | $-2.0 \times 10^{-4}$ | |
| Y direction (LCD panel side face) of 4th lens plate (LP4) | 1.5212 | −2.29 | $+6.2 \times 10^{-4}$ | $-2.2 \times 10^{-4}$ | |
| X direction (screen side face) of 4th lens plate (LP4) | 2.8085 | −0.49 | $+3.3 \times 10^{-3}$ | $-4.9 \times 10^{-4}$ | $-1.0 \times 10^{-7}$ |

The first lens plate LP1 and the second lens plate LP2 are in close contact, while the first lens plate LP1 and the third lens plate LP3 as well as the second lens plate LP2 and the fourth lens plate LP4 are placed at spaced intervals.

The direction of the lens plates LP1 to LP4 in the X or Y direction is so determined that the directions of the generatrices of the cylindrical lens arrays formed on the front and rear faces of the lens plates are the same as shown in FIG. 2.

Further, concerning the light emitted from the LCD panel 2, the angle α1 of radiation in the X direction is ±20 degrees and the angle α2 of radiation in the Y direction is ±15 degrees owing to the directivity of the backlight 1 as described above. Accordingly, the pitches of the lens arrays are preferably different between the X direction and the Y direction for preventing the occurrence of ghosts. Therefore, as regards the third lens plate LP3, the array pitch P1 of the lens array in the X direction is 3.2 mm and the array pitch of the lens array in the Y direction is 2.1 mm. The array pitch of the lens array of other lens plates is determined according to the proportion of optical distance of the lens plate from the LCD panel 2 with reference to these array pitches.

The array pitches of the lens arrays in the X direction and in the Y direction of the lens plates LP1, LP2 and LP4 are shown as follows:

TABLE 4

| | |
|---|---|
| X direction (LCD panel side face) of 1st lens plate (LP1) | P2 = 3.2132 mm |
| Y direction (screen side face) of 1st lens plate (LP1) | 2.1086 mm |
| Y direction (LCD panel side face) of 2nd lens plate (LP2) | 2.1086 mm |
| X direction (screen side face) of 2nd lens plate (LP2) | P3 = 3.2259 mm |
| Y direction (LCD panel side face) of 4th lens plate (LP4) | 2.1172 mm |
| X direction (screen side face) of 4th lens plate (LP4) | P4 = 3.2389 mm |

Further, since the image formation characteristics in the X direction in which the angle of radiation is larger are worse than the image formation characteristics in the Y direction in which the angle of radiation is smaller, the image formation in the X direction is performed by the lens arrays on the outside surfaces which show good focusing characteristics for uniforming the image forming performance in the X direction and in the Y direction as discussed above.

More particularly, the image formation in the X direction in which the angle of radiation is larger is performed by the lens array on the LCD panel side face of the third lens plate LP3, the lens array on the LCD panel side face of the first lens plate LP1, the lens array on the screen side face of the second lens plate LP2 and the lens array on the screen side face of the fourth lens plate LP4, while the image formation in the Y direction orthogonal thereto is performed by the lens arrays on the screen side face of the third lens plate, on the screen side face of the first lens plate, on the LCD panel side face of the second lens plate and on the LCD panel side face of the fourth lens plate which have relatively bad focusing characteristics.

Figure 28:
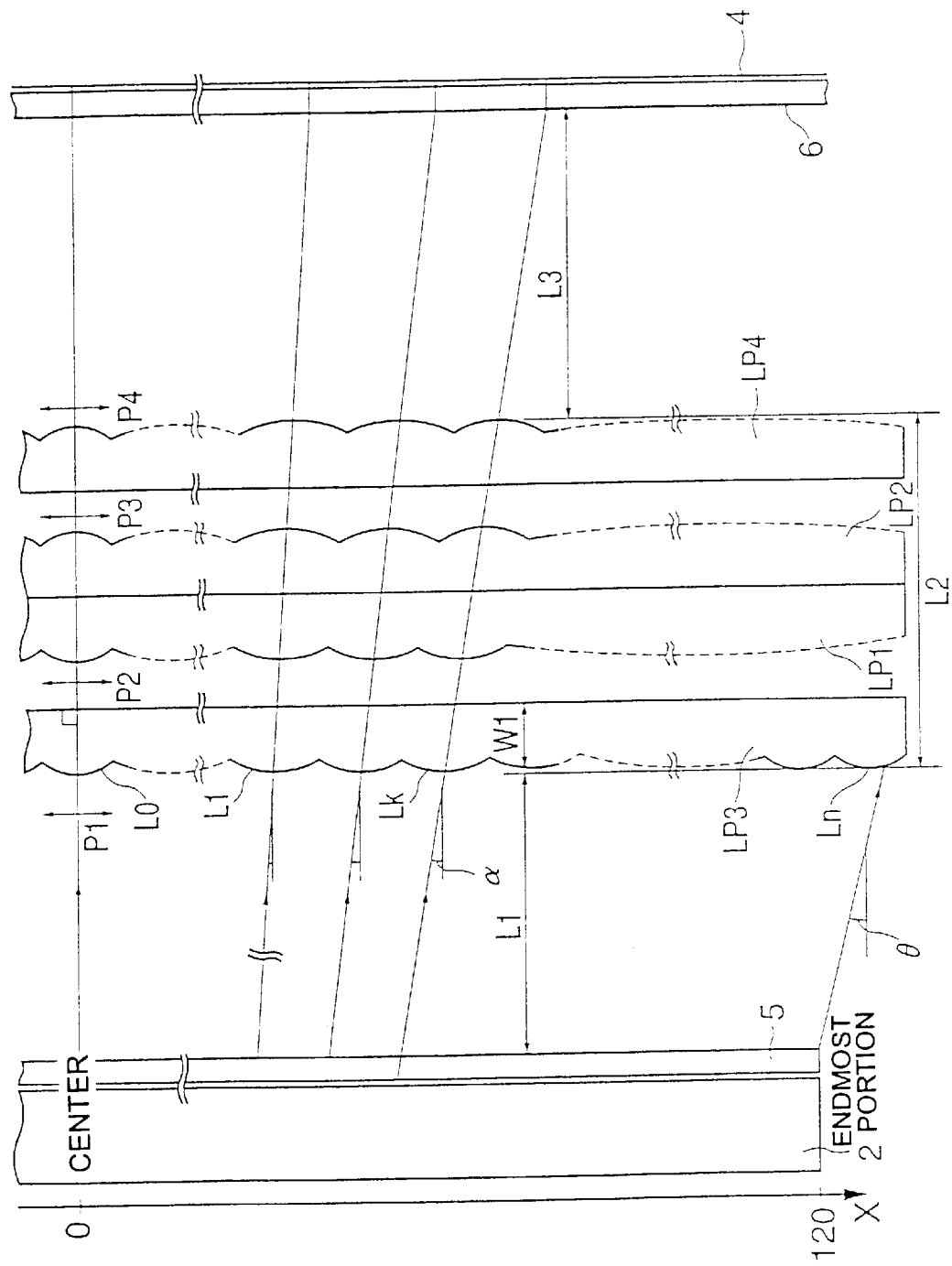
FIG. 28 is a sectional view of cylindrical lens arrays in an X direction in FIG. 27 in accordance with the present invention.

FIG. 28 shows a sectional view of cylindrical lens arrays in the X direction of FIG. 27 in accordance with the present invention. This is a sectional view of the whole device as seen from above in the Y-axis direction in FIG. 27. Here, the light emitted from the center of the LCD panel 2 and passing near the center (a so-called origin of X-Y coordinates) of the image formation unit 3 constituted of the four lens plates travels substantially straight through the four lens plates and forms an image on the screen.

The light emitted from the LCD panel 2, trough the Fresnel concave lens 5, travels with an inclination angle gradually increasing from the center of the LCD panel to the endmost portion in the X direction, in directions of magnifying the image.

For example, if the length L1 shown in FIG. 1 is 40 mm, L2 shown in FIG. 1 is 11.207 mm, L3 shown in FIG. 1 is 45 mm, the magnifying ratio of the image on the screen is 1.15, the length of the LCD panel 2 in the X direction is 240 mm and the length thereof in the Y direction is 180 mm, the light emitted from the endmost portion in the X direction of the LCD panel 2 becomes incident on the lens plate of the image formation unit 3 at a downward inclination angle θ of about 10.8 degrees with respect to the horizontal direction.

In the case where light is incident on the lenses of the image formation unit 3 at such inclination angles, the image formation unit 3 with the lenses whose optical axes all agree with the traveling direction of the light emitted from the center of the LCD panel 2 as shown in FIG. 2 sometimes has disadvantage in brightness and clearness of images because there is a large difference in inclination between the traveling direction of light incident on lenses in the peripheral part of the image formation unit 3 and the optical axes of the lenses in the peripheral part, and consequently the aberration becomes large.

Therefore, if the traveling direction of light incident at a certain inclination angle on each lens is made to agree almost with the optical axis of the lens as shown in FIG. 28, the aberration reduces and the image formation characteristics can be improved with regard to the brightness and clearness of images.

Taking for example the lenses of the cylindrical lens array on the LCD panel side face of the third lens plate LP3 in FIG. 28, the optical axis of a lens L0 has no inclination with respect to the horizontal direction in FIG. 28 so that it agrees with the traveling direction (having no inclination with respect to the horizontal direction in the figure) of the light emitted from the center of the LCD panel 2. On the other hand, the optical axis of a lens Ln on which the light emitted from the endmost portion of the LDC panel 2 is incident is set to have a downward inclination of 10.8 degrees with respect to the horizontal direction in FIG. 28 so that it agrees with the traveling direction (a direction inclined downward by 10.8 degrees with respect to the horizontal direction in the figure) of light passing the apex of the lens Ln.

Likewise, as regards the optical axis of a lens Lk existing between the lenses L0 and Ln of the third lens plate LP3, it is inclined downward by α degrees (0<α<10.8) with respect to the horizontal direction in FIG. 28 so that it agrees with the traveling direction (a direction inclined downward by a degrees with respect to the horizontal direction in the figure) of light passing the apex of the lens Lk.

Also, as regards the lenses of the cylindrical lens arrays on the other lens plates LP1, LP2 and LP4, their optical axes are similarly inclined with respect to the horizontal direction in the figure.

By thus inclining the optical axes of the lenses gradually toward the peripheral parts of the lens plates, at least light passing the apex of each lens travels in a direction which agrees with the optical axis of the lens and the traveling direction of light passing near the apex has a reduced difference with respect to the optical axis of the lens. Consequently, the aberration reduces, and therefore, it is possible to improve the image formation characteristics regarding the brightness and clearness of images.

Referring to FIG. 28, explanation has been given of the lens arrays in the X direction. However, also as regards the lens arrays in the Y direction, the brightness and clearness of images can be improved similarly by inclining the optical axes of the lenses gradually toward the peripheral parts of the lens plates.

Also the parameters of the lenses have been set on the basis of a lens array in the X or Y direction of each lens plate on the assumption that all lenses of a certain lens array have the same parameters. However, although the distance from the LDC panel 2 to the screen 4 is constant, a conjugate length of the light emitted from the LCD panel 2 varies depending upon its traveling route. The conjugate length of the light emitted from the peripheral part of the LCD panel 2 is longer and the aberration is larger. Accordingly, the lenses of one lens array may have different parameters with regard to the traveling direction of light incident on the lenses so that each lens has better image formation characteristics.

If it is difficult to set parameters separately for each lens of the lens array, the image formation characteristics can also be improved by grouping the lenses by about three to five adjacent lenses, to which the same parameters are set, and thus providing different parameters group by group.

Further, with the optical device of the magnified image formation system, since light in the peripheral part of the LDC panel 2 has a larger incident angle to the lens plates, cross talk to adjacent lenses is liable to take place. This cross talk causes ghosts to appear on the screen. Therefore, it is necessary to suppress the cross talk as much as possible. Various means are thought of for suppressing the cross talk, and for example, the lens pitch in the peripheral part of each lens plate may be enlarged as compared with the lens pitch in the central part of the lens plate within such a degree that an enlarged aberration of lenses does not affect the image formation.

Figure 29:
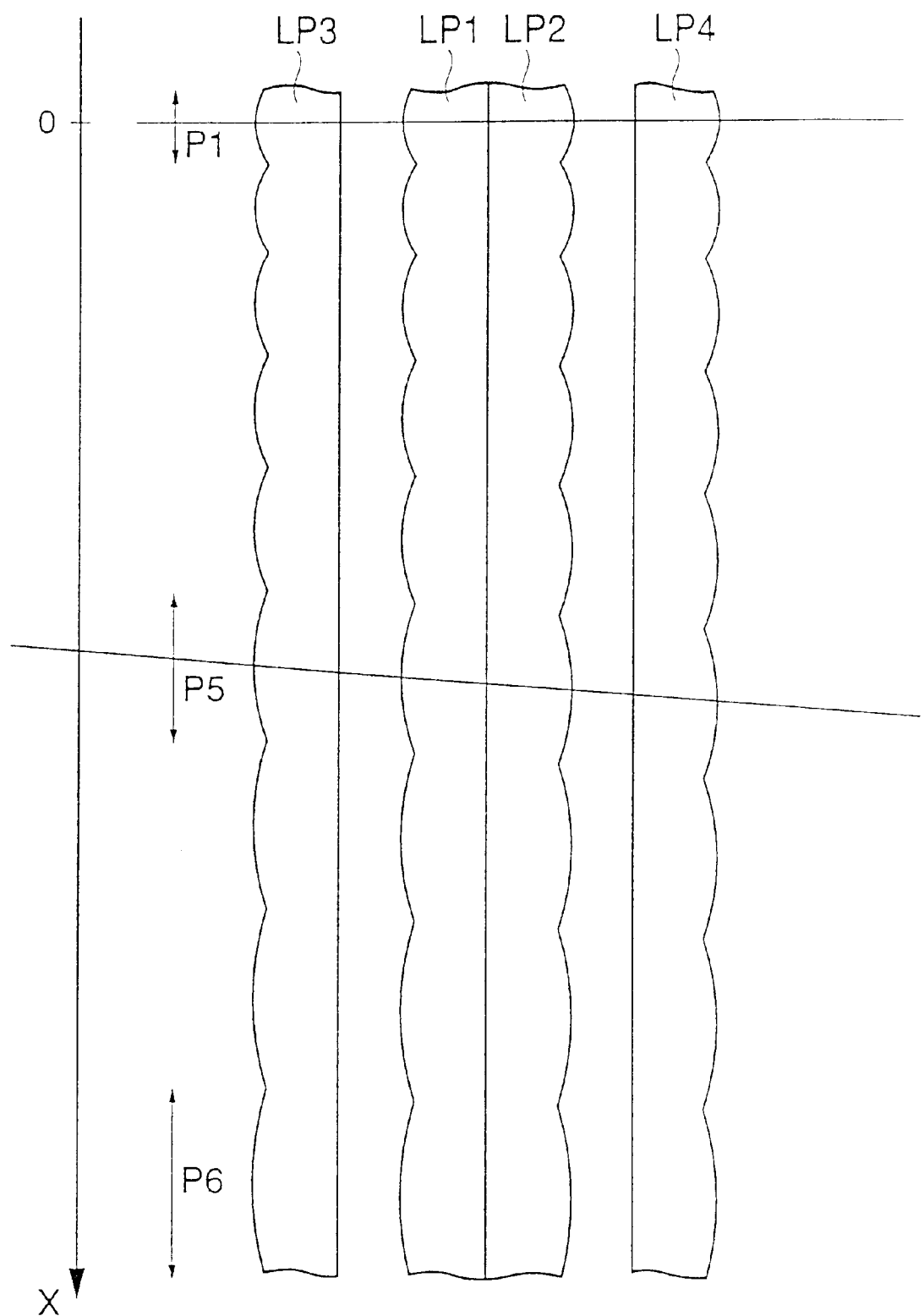
FIG. 29 is a sectional view of lens plates in an example in which an array pitch is increased at a peripheral part of each lens plate.

FIG. 29 shows a sectional view of lens plates in an example in which the array pitch is enlarged at the peripheral part of each lens plate. This is a sectional view of the lenses of the lens arrays in the X direction. For example, the array pitch P1 of lenses in the central part of each lens plate is 3.2 mm, the array pitch P6 of lenses in the peripheral part of each lens plate is 3.6 mm, and the array pitch P5 of lenses between the central part and the peripheral part is about 3.4 mm.

The cross talk can be suppressed effectively by thus setting a larger array pitch for the lenses in the peripheral part of the lens plate than for the lenses in the central part of the lens plate and increasing the array pitch of the lenses between the peripheral part and the central part toward the peripheral part.

Also, for preventing the cross talk to adjacent lenses which causes the occurrence of ghosts, the protrusions 21 as shown in FIG. 19 may be provided at the joints of the lens array. The protrusions 21 may be colored with a black resist and may further have scattering side faces.

Figure 30:
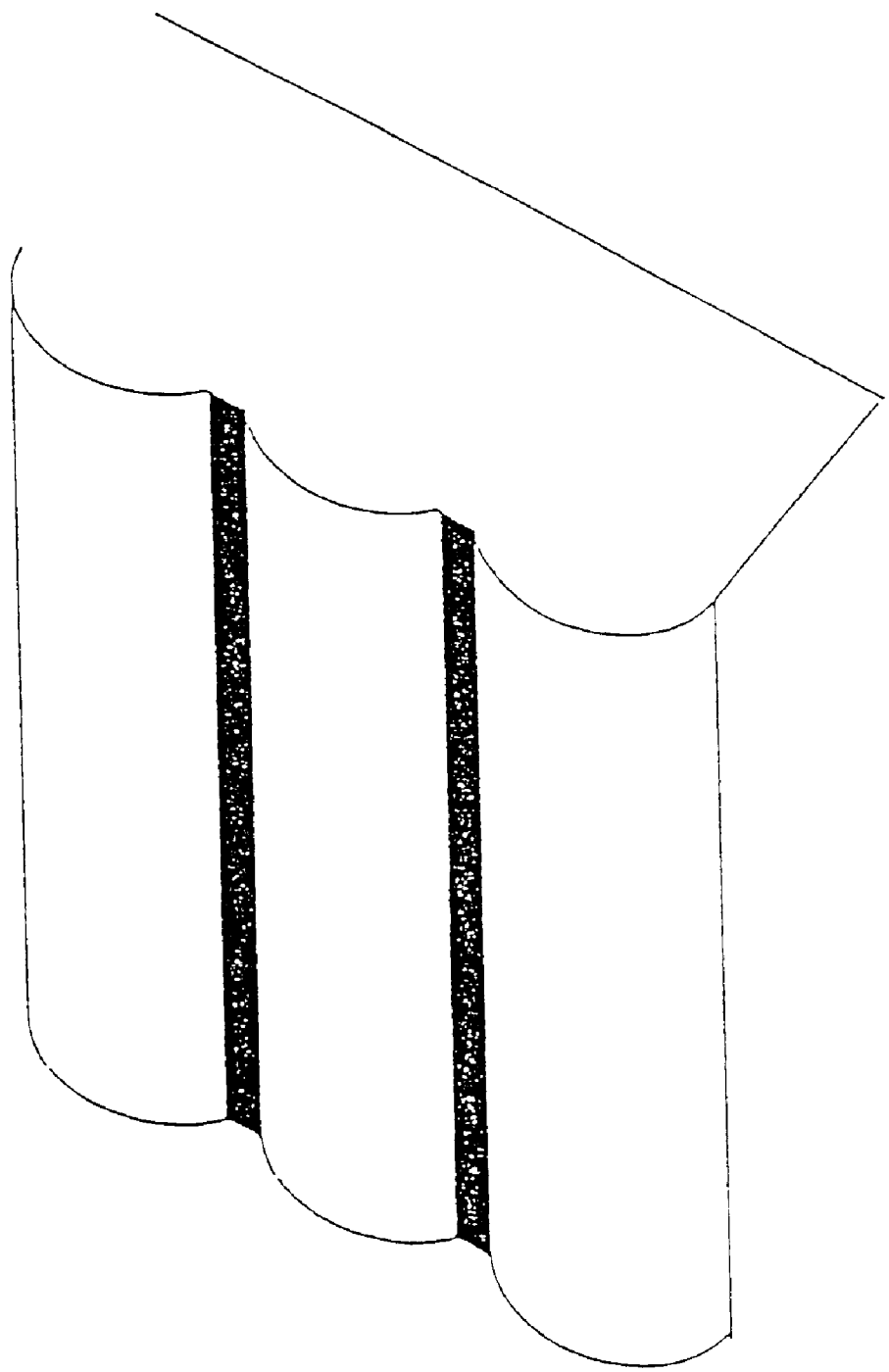
FIG. 30 is a partially enlarged view of an image formation unit of an optical device in accordance with the present invention, in which joints in each lens array of the image formation unit are patterned.

If it is difficult to provide the protrusions 21 as shown in FIG. 19, simply, a pattern of scattering material or light-shielding material (black resist, etc.) may be formed to cover the joints of the lens array as shown in FIG. 30.

Also, in the case where the optical device of the magnified image formation system is constructed using lens plates with two-dimensional lens arrays formed on the front and rear faces as shown in FIG. 24, the constructions of FIG. 27, FIG. 28 and FIG. 29, which show the examples of optical devices using cylindrical lens arrays, and the contents described about these constructions can apply almost as they are to the optical devices as shown FIG. 24.

Figure 31:
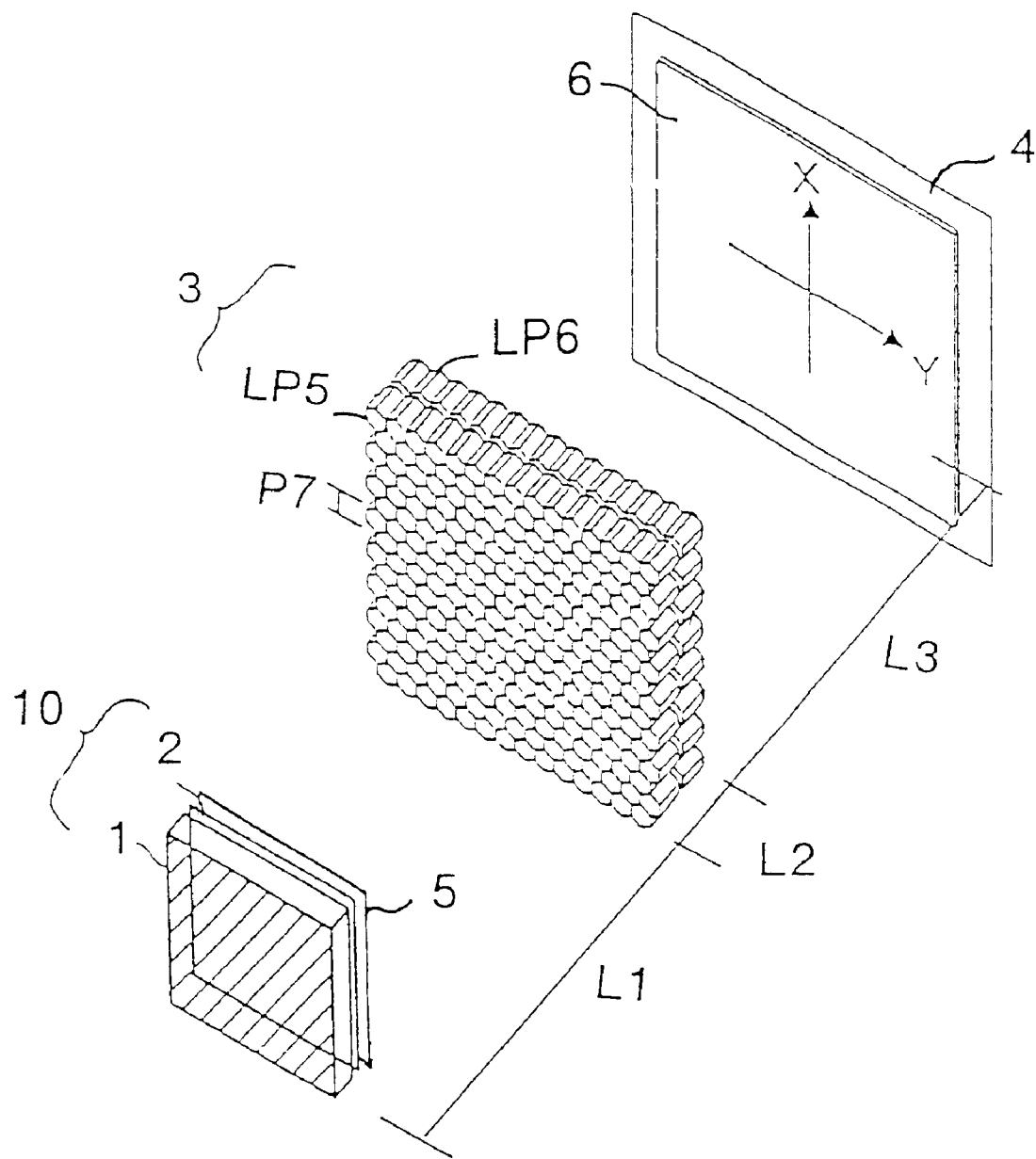
FIG. 31 is a schematic view illustrating the construction of an optical device of the magnified image formation system using two-dimensional lens plates in accordance with the present invention.

FIG. 31 shows a schematic view illustrating the construction of an optical device of the magnified image formation system using two-dimensional lens plates in accordance with the present invention.

The optical device of FIG. 31 is different from hat of FIG. 27 in that the image formation unit 3 is composed of a couple of two-dimensional lens arrays LP5 and LP6. Here, if the thickness of each of LP5 and LP6 is 3.0 mm, lenses on the LCD panel side of the lens plate LP5 which is nearer to the LCD panel 2 are each in the shape of a regular hexagon whose diagonal P7 is 3.2 mm, lenses thereof on the screen side are each of a regular hexagon whose diagonal is 3.351 mm, lenses on the LCD panel side of the lens plate LP6 which is nearer to the screen 4 are each of a regular hexagon whose diagonal is 3.351 mm, and lenses thereof on the screen side are each of a regular hexagon whose diagonal is 3.502 mm.

Further, the sectional view of the two-dimensional lens plates LP5 and LP6 is almost the same as that shown in FIG. 26. However, if this device is used as one of the magnified image formation system, the optical axes of the lenses are varied between the central part and the peripheral part. More particularly, as shown in FIG. 28, the optical axis of each of the lenses on the front and rear faces of the two-dimensional lens plate is set to agree substantially to the traveling direction of light passing the apex of the lens. Thereby the brightness and clearness of images can be improved with cases where the two-dimensional lean array plates are used.

Further, the image formation characteristics can be improved by setting different parameters for the lenses of the two dimensional lens plate, by setting larger array pitches for lenses in the peripheral part of the two-dimensional lens plate than for lenses in the central part thereof or by patterning a light-shielding material to cover the joints of lenses.

Furthermore, in FIG. 31, the directions of the X axis and Y axis are turned by 90 degrees with respect to those in the case of the cylindrical lens arrays of FIG. 27. That is for using diagonals of regular hexagons for the image formation in the X direction in which the directivity is wider and thereby preventing the occurrence of ghosts effectively with the possibly smallest regular hexagon lenses.

Further, with the construction using two-dimensional lens plates as in FIG. 31, the number of lens faces through which light passes is half the number in the case of cylindrical lens arrays, and therefore Fresnel loss reduces. This construction is preferable in the light utilization efficiency, that is, the brightness of images. There is also an advantage in that its assembly process is easier since the number of lens plates constituting the image formation unit 3 is smaller.

As regard the formation of the lens plates (LP1 to LP6) shown in FIG. 27 and FIG. 31, it is possible to mass-produce the lens plates easily and reduce production costs by preparing a concave mold having a shape reverse to the shape of the lens array and then using any one of the injection-molding method, the thermal press method and the 2P method, as described above.

Next explanation is given of an example of the present invention in which the cross talk to adjacent lenses is prevented in an optical device of the magnified image formation system using four cylindrical lens plates. The cross talk to adjacent lenses, as discussed above, causes the occurrence of ghosts on the screen and deteriorates the quality of formed images.

For preventing the cross talk, the present invention provides an optical device characterized by comprising an image formation unit having a plurality of lens substrates each formed with cylindrical lens arrays on both a front face and a rear face thereof; a display unit disposed on an object side with respect to the image formation unit for displaying an image to be projected by the image formation unit, and a light-shielding member between opposing lens substrates, the light-shielding member being arranged at joints of lenses of the cylindrical lens arrays of opposing lens substrates. Here, the light-shielding member, between the opposing lens substrates, may be composed of a support portion disposed at an end portion of the lens substrates and a light-shielding wall supported by the support portion and formed in a lattice form along the joints of lenses of the opposing lens substrates.

The support portion may have a groove with a width such that the light-shielding wall can be received and fixed in the groove.

Figure 32:
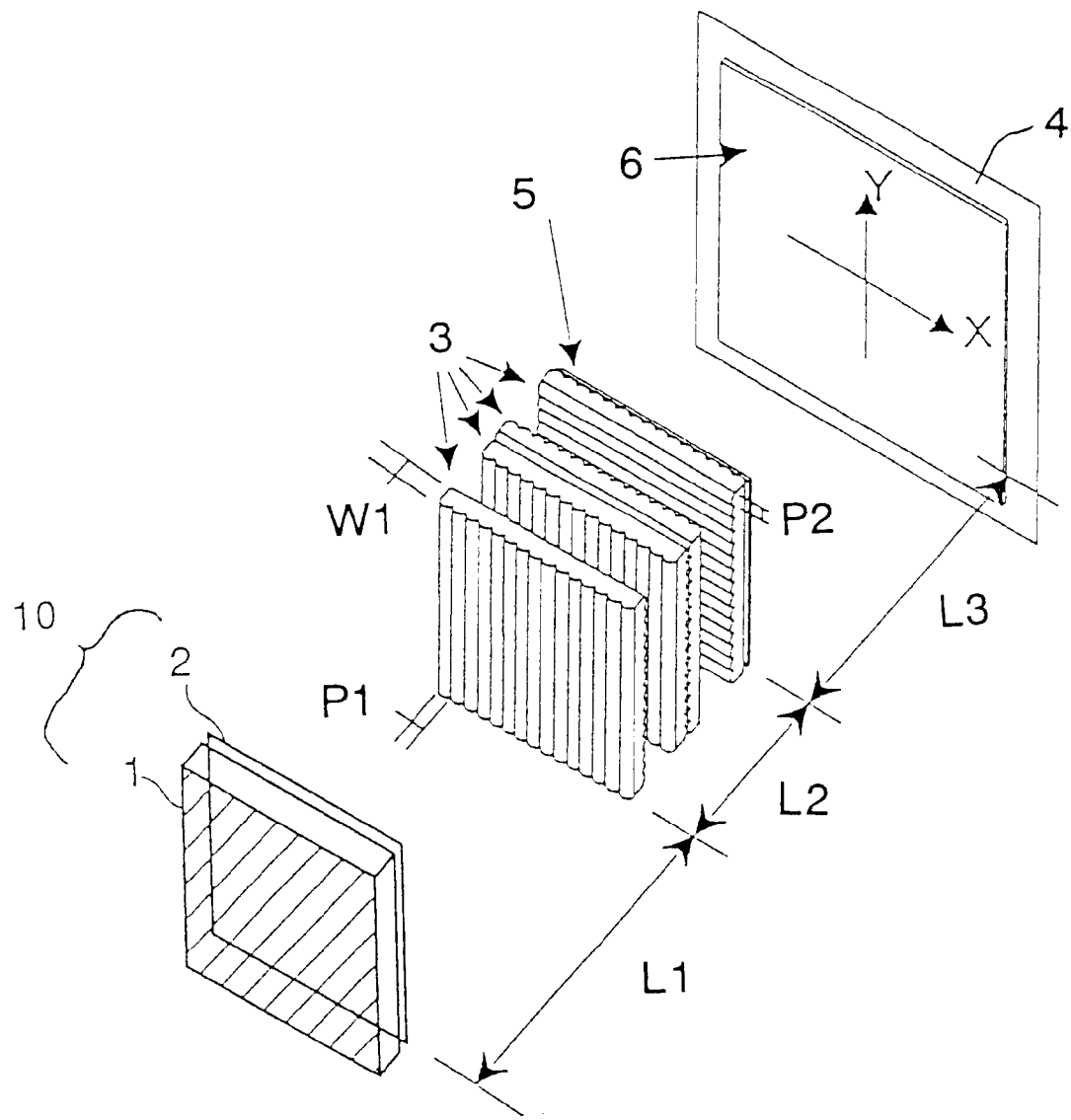
FIG. 32 is a schematic view illustrating the construction of another example for forming a magnified image by use of an optical device of the full-size image formation system in accordance with the present invention.

FIG. 32 shows a schematic view illustrating the construction of another example for forming a magnified image by use of an optical device of the full-size image formation system in accordance with the present invention. This construction is almost the same as that of FIG. 10. Also in this case, a Fresnel concave lens 5 is placed immediately in front of the surface on the screen side of cylindrical lens plate LP4, and a Fresnel convex lens 6 is placed in the vicinity of the surface of a screen 4. As regards distances between components shown in FIG. 32, L1 is 40 mm, L2 is 11.04 mm and L3 is 45 mm.

If the focal length of the Fresnel concave lens 5 is 300 mm, a 1.15-fold image can be obtained on the screen 4.

Figure 33:
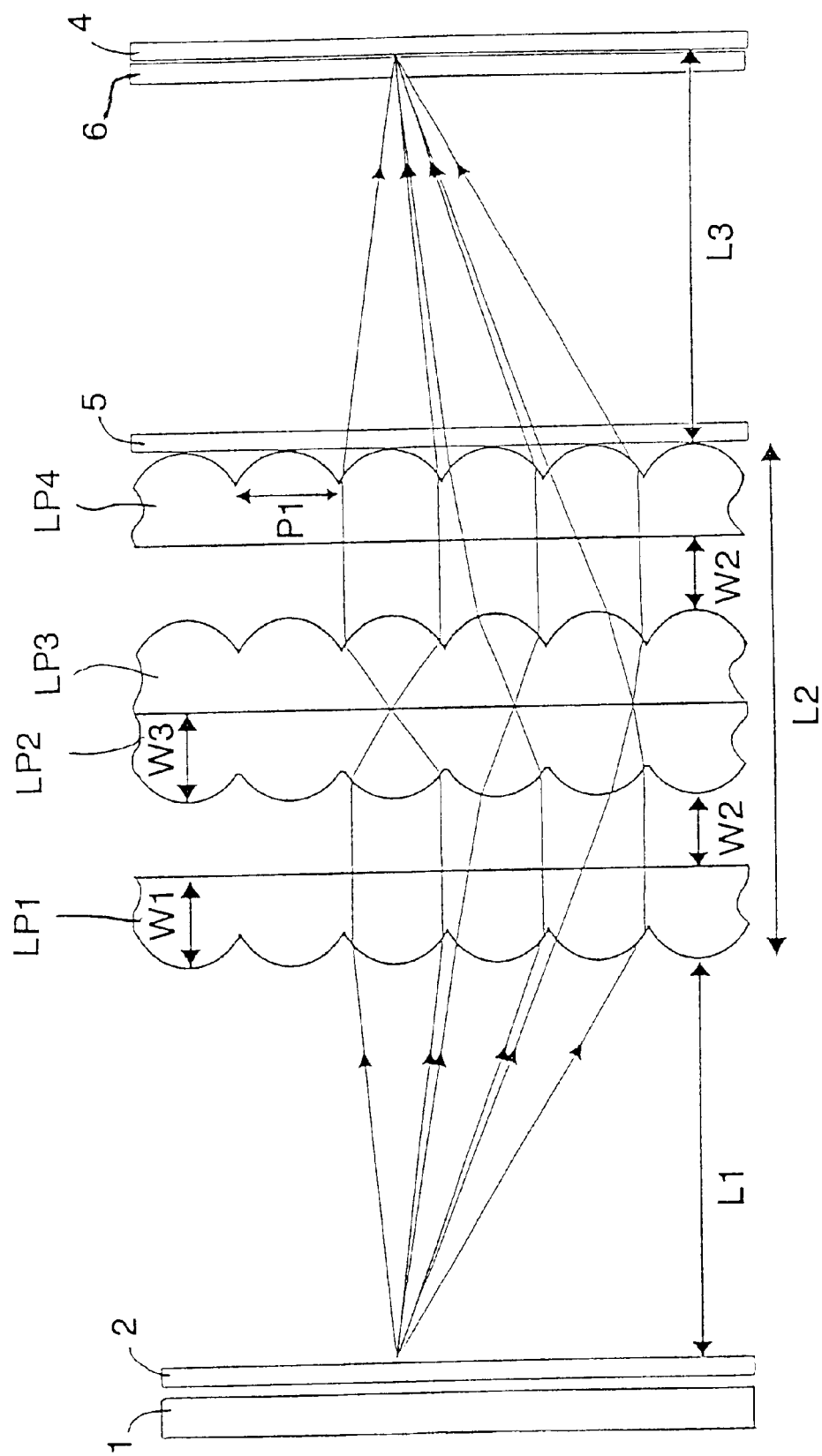
FIG. 33 is a sectional view of the optical device of FIG. 32 as seen in the Y-axis direction.
Figure 34:
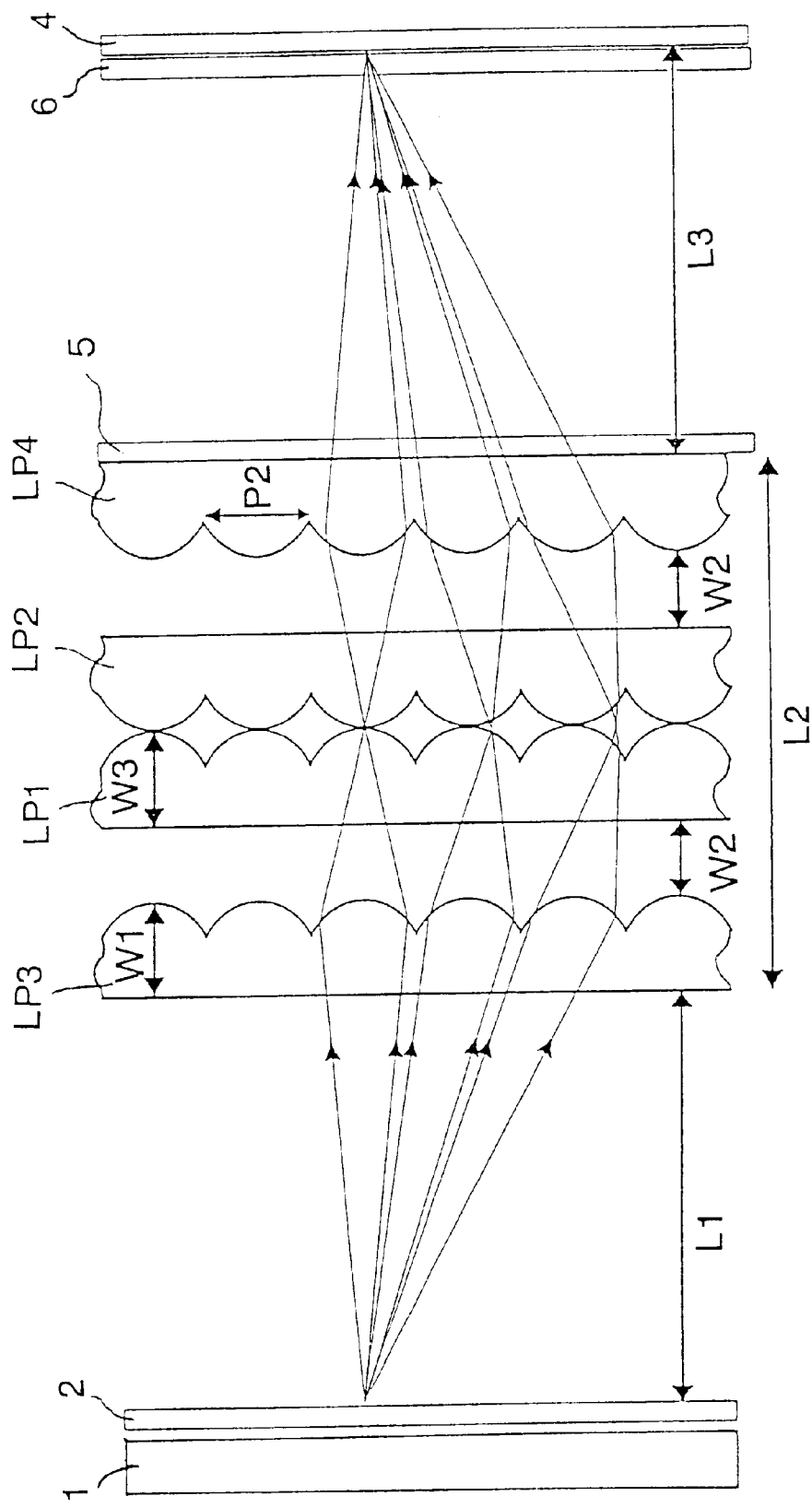
FIG. 34 is a sectional view of the optical device of FIG. 32 as seen in the X-axis direction.

FIG. 33 shows a sectional view of the optical device of FIG. 32 as seen in the Y-axis direction, that is, the vertical direction. FIG. 34 is a sectional view of the optical device of FIG. 32 as seen in the X-axis direction, that is, the lateral direction.

Here, the thickness w1 of outside cylindrical lens plates LP3 and LP4 is 1.80 mm, the thickness w3 of inside cylindrical lens plates LP1 and LP2 is 1.83 mm, the distance w2 between the lens plates LP3 and LP1 is 1.89 mm, and the distance w2 between the lens plates LP2 and LP4 is 1.89 mm.

Further, the array pitch of the lenses of each cylindrical lens plate is so determined that the cross talk to adjacent lenses does not occur. For example, the array pitch P1 in the X-axis direction may be 3.0 mm, and the array pitch P2 in the Y-axis direction may be 2.6 mm.

However, in the case where a large-screen multi-panel display is constructed by arranging a large number of such LCD panels, in addition to the cross talk owing to the aberration of lenses, the cross talk may be caused by light transmitted or scattered at the joins of lenses or by misalignment of the four lens plates. The cross talk cannot be prevented completely. Particularly, it is impossible to avoid the cross talk mainly caused by errors in assembling operation of the optical device.

Figure 35:
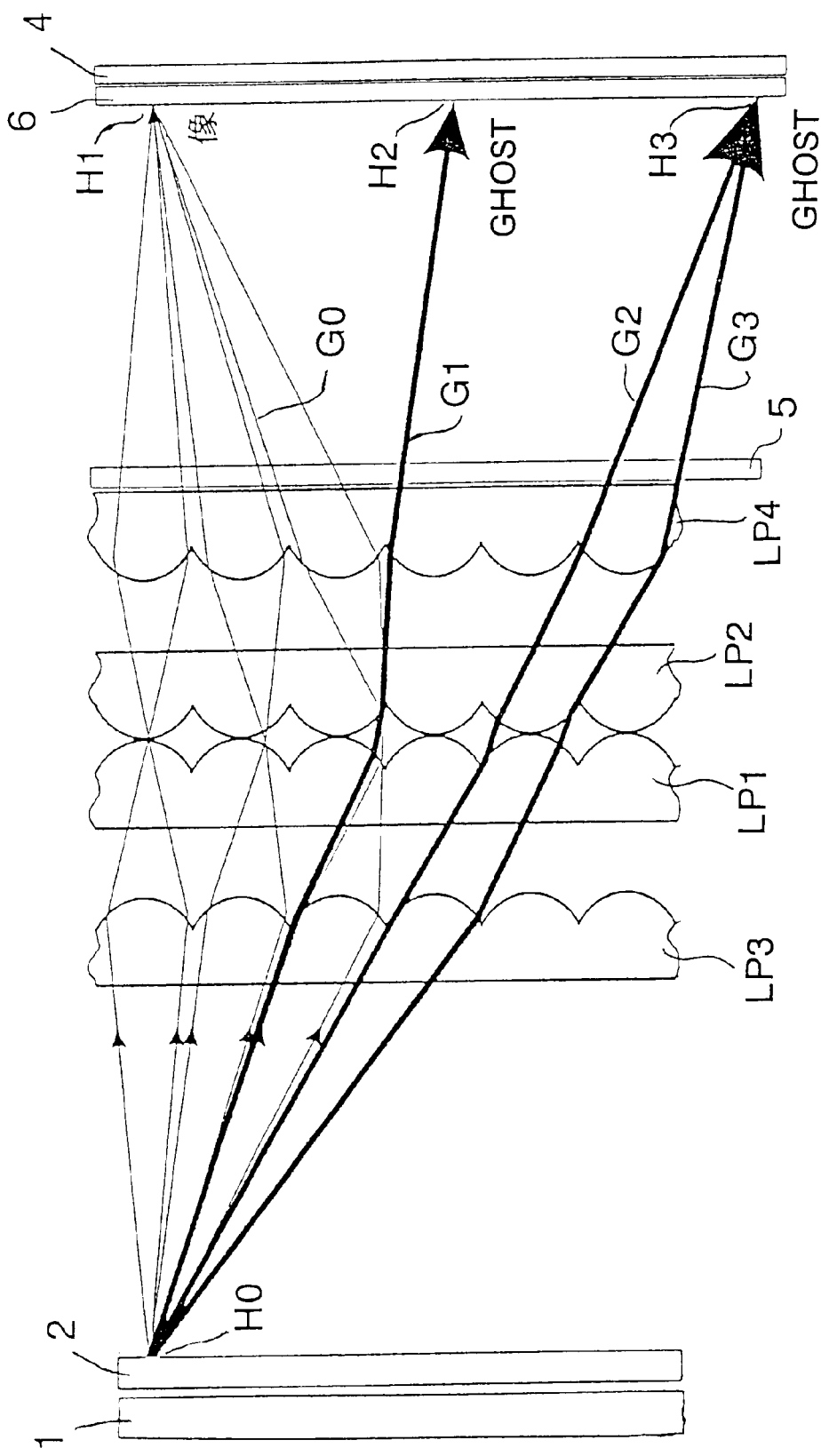
FIG. 35 illustrates the generation of ghosts by cross talk to adjacent lenses in FIG. 34.

FIG. 35 illustrates the generation of ghosts by the cross talk to adjacent lenses concerning FIG. 34. Light emitted from a point H0 on the LCD panel 2 forms an image on a point H1 on the screen 4 in a normal state.

However, if there is an aberration of the lenses or misalignment of the lens plates, the light which should travel as a light beam G0 travels as a light beam G1 and forms a ghost at a point H2 on the screen 4. Similarly, light traveling as a light beam G2 or G3 forms a ghost at a point H3.

For preventing the above-mentioned cross talk to adjacent lenses mainly caused by errors in the assembling operation, it is preferable to dispose a light-shielding wall at the joints of the lenses of the cylindrical lenses.

Now explanation is given of an example of the light-shielding wall.

Figure 36:
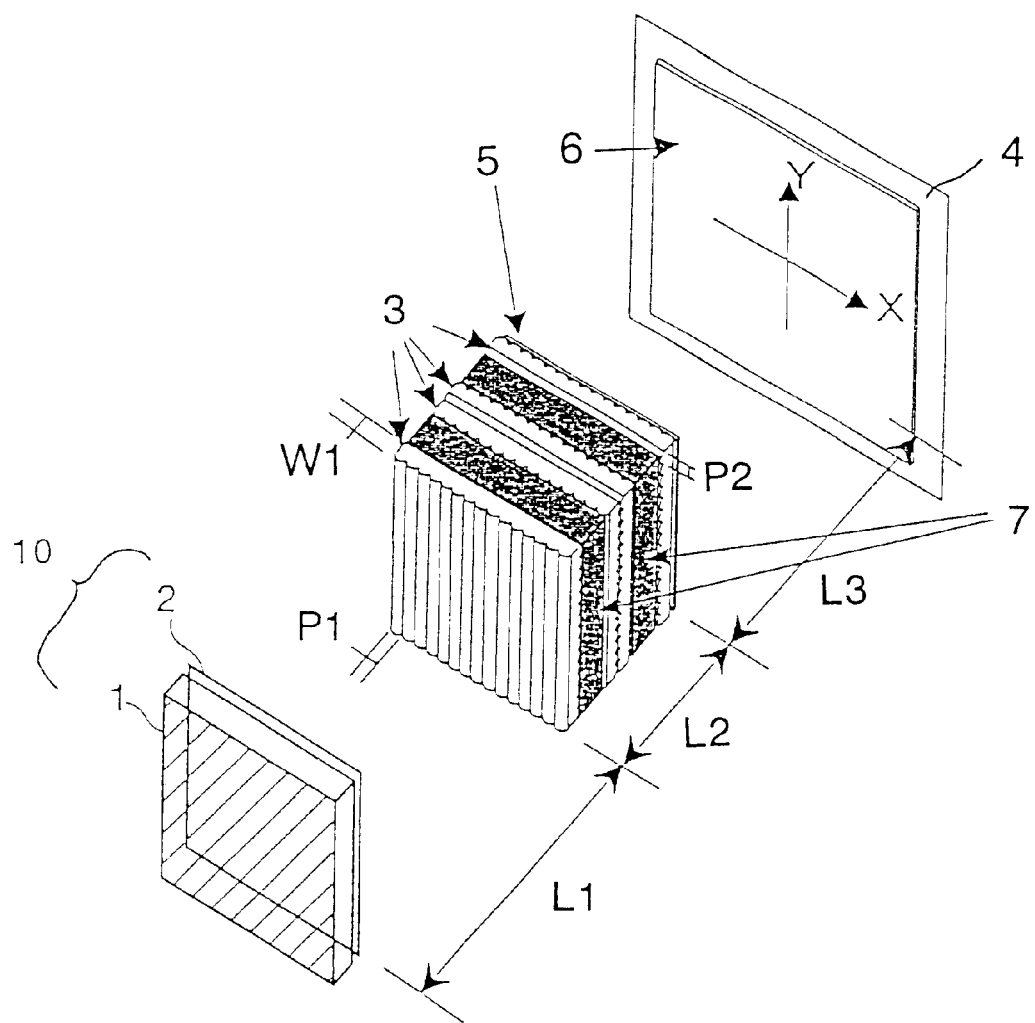
FIG. 36 is a schematic view illustrating the construction of another example for forming a magnified image by use of an optical device provided with a light-shielding member in accordance with the present invention.

FIG. 36 shows a schematic view illustrating the construction of an example for forming a magnified image using an optical device provided with light-shielding members between cylindrical lens plates. In this construction, light-shielding members 7 are inserted between the cylindrical lens plates LP1 and LP3 and between LP2 and LP4 in the construction shown in FIG. 32.

Figure 37:
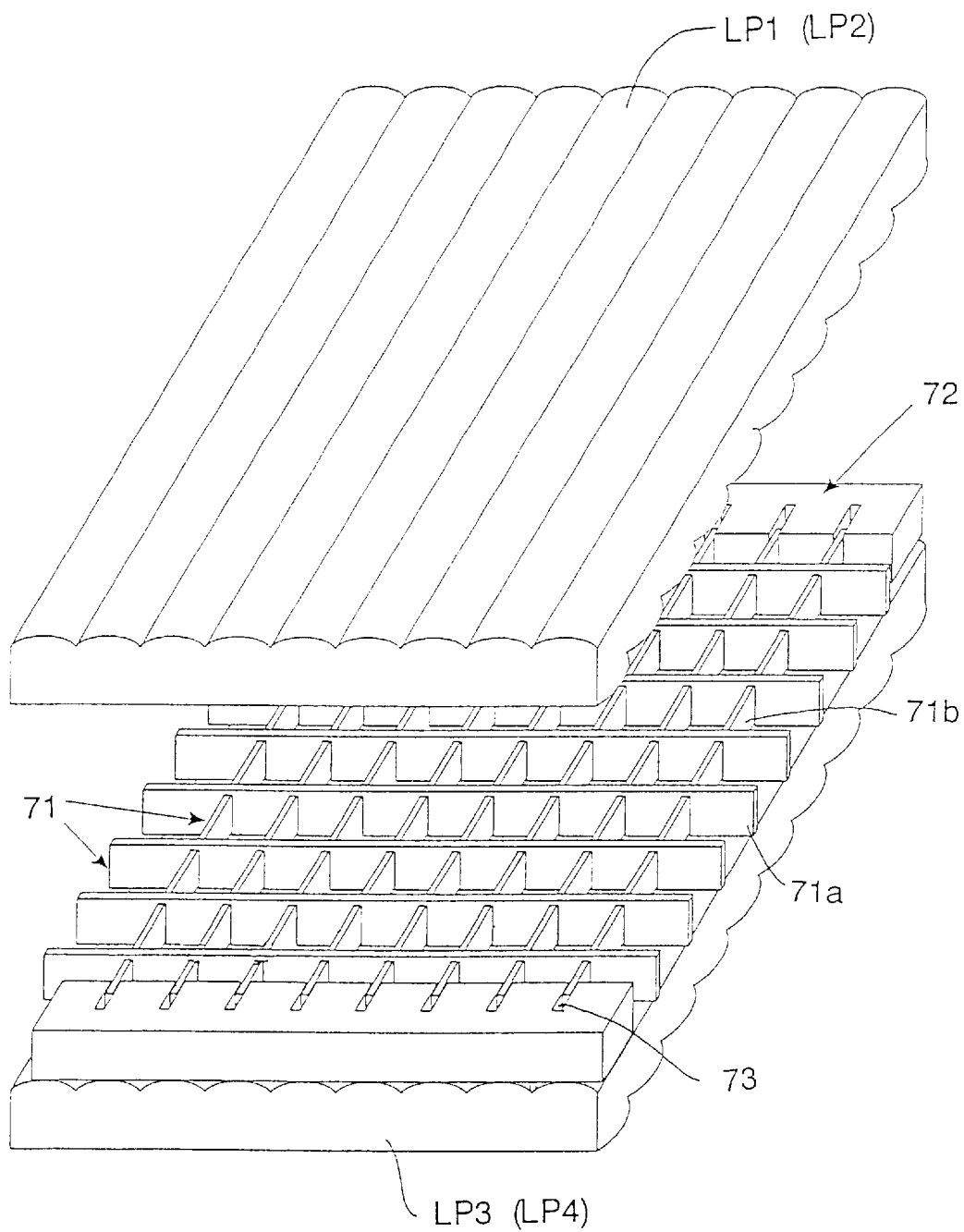
FIG. 37 is a schematic perspective view of a case where a light-shielding member in accordance with the present invention is inserted between cylindrical lens plates.
Figure 38:
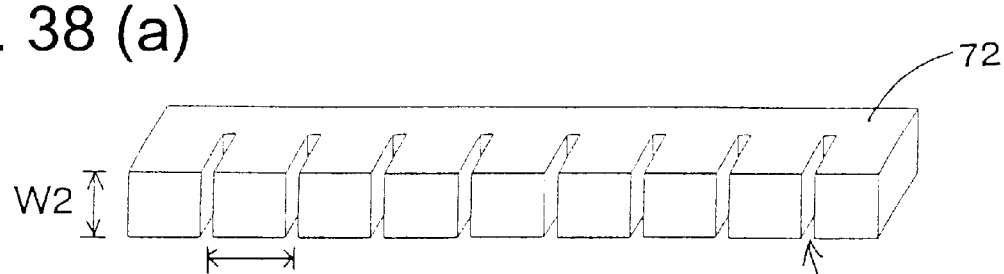
FIGS. 38(a) and 38(b) are perspective views of examples of jigs for guiding a light-shielding wall in accordance with the present invention.
Figure 38:
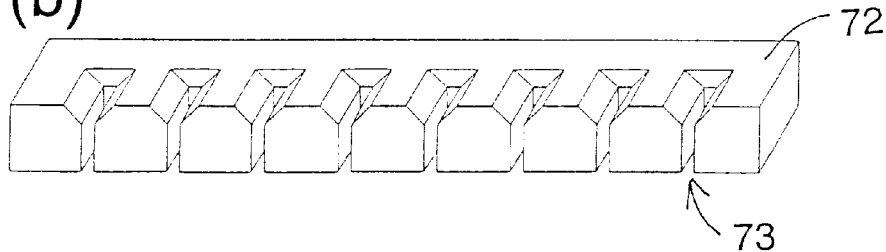

FIG. 37 shows a schematic perspective view in the case where the light-shielding member 7 of the present invention is inserted between cylindrical lens plates.

In FIG. 37, the light-shielding member 7 is composed of a light-shielding wall 71 and light-shielding wall guide jigs 72. The light-shielding wall guide jigs 72 are for supporting the light-shielding wall 71 and placed at end portions along four sides of the cylindrical lens plate. The light-shielding wall guide jig 72 is provided with slits 73 at the same intervals as the pitch of the lens array of the cylindrical lens plate. Into each slit 73, an end portion of the light-shielding wall 71 is inserted.

FIGS. 38(a) and 38(b) are perspective views of examples of light-shielding wall guide jigs 72 in accordance with the present invention. The jig of FIG. 38(a) has a height equal to the distance w2 (=1.89 mm) between the cylindrical lens plates in FIG. 33, a slit width (about 0.3 mm) such that the light-shielding wall 71 can be inserted therein and a slit pitch equal to the lens pitch P2 (=2.6 mm) in the Y-axis direction.

FIG. 38(b) shows a jig having the same height w2 but has slits whose width is widened by being provided with Y-shaped cuts to upper end portions of the slits. The thus widened end portions of the slits facilitate a process for assembling the light-shielding member since the light-shielding wall can be inserted easily.

The light-shielding wall 71 is formed of plate-formed members assembled in a matrix (a lattice form) extending in the X-axis direction and in the Y-axis direction as shown in FIG. 37.

FIGS. 39(a) and 39(b) are views illustrating the construction of an example of the light-shielding wall 71 of the present invention. The light-shielding wall 71 is formed of plate-form members 71a and 71b shown in FIG. 39(a) and FIG. 39(b) which are combined in a configuration shown in FIG. 37.

The plate-form member 71a of FIG. 39(a) has a height (S2) of 2.30 mm, a thickness of 0.2 mm, a slit width (S1) of 0.3 mm for inserting the member of FIG. 39(b), a slit length of 1.89 mm which is equal to the distance (w2) between cylindrical lens arrays, and a slit pitch of 2.6 mm which is equal to the lens pitch (P2) in the Y-axis direction. The plate-form members 71a are placed at the same intervals as the lens pitch P1 (=3.0 mm) in the X-axis direction at the joints (depressions) between the lenses The plate-form 71b of FIG. 39(b) has a height (S3) of 2.23 mm.

Figure 40:
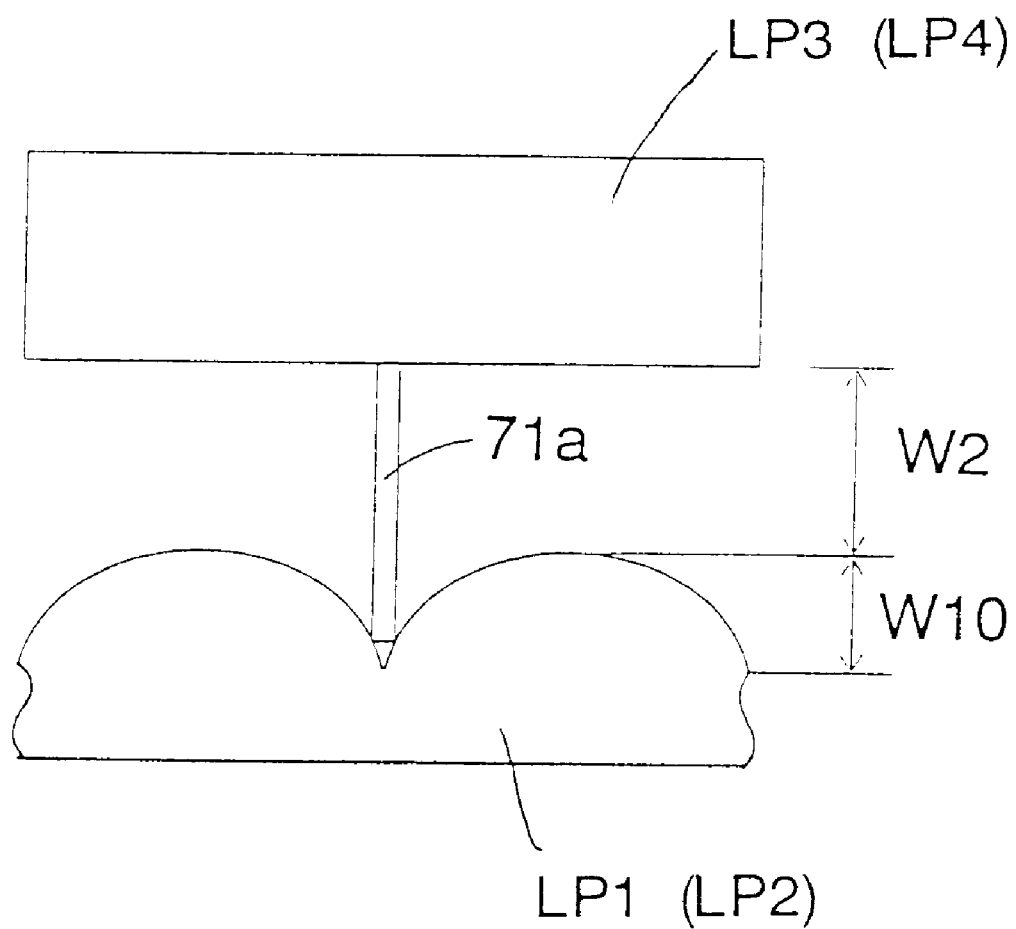
FIG. 40 is a sectional view showing a positional relationship between cylindrical lens array plates and a plate-form member of a light-shielding wall in accordance with the present invention.

FIG. 40 shows a sectional view illustrating a positional relationship between the cylindrical lens array plate and the plate-form member 71a of the light-shielding wall. Here, w2 denotes the distance between two cylindrical lens plates (=1.89 mm) and w10 denotes a sag depth of each lens. For example, the sag depth w10 of the lenses arranged in the Y-axis direction on the outside lens plate (LP3 or LP4) is 0.492 mm and the sag depth w10 of the lenses arranged in the X-axis direction on the inside lens plate (LP1 or LP2) is 0.426 mm.

Figure 41:
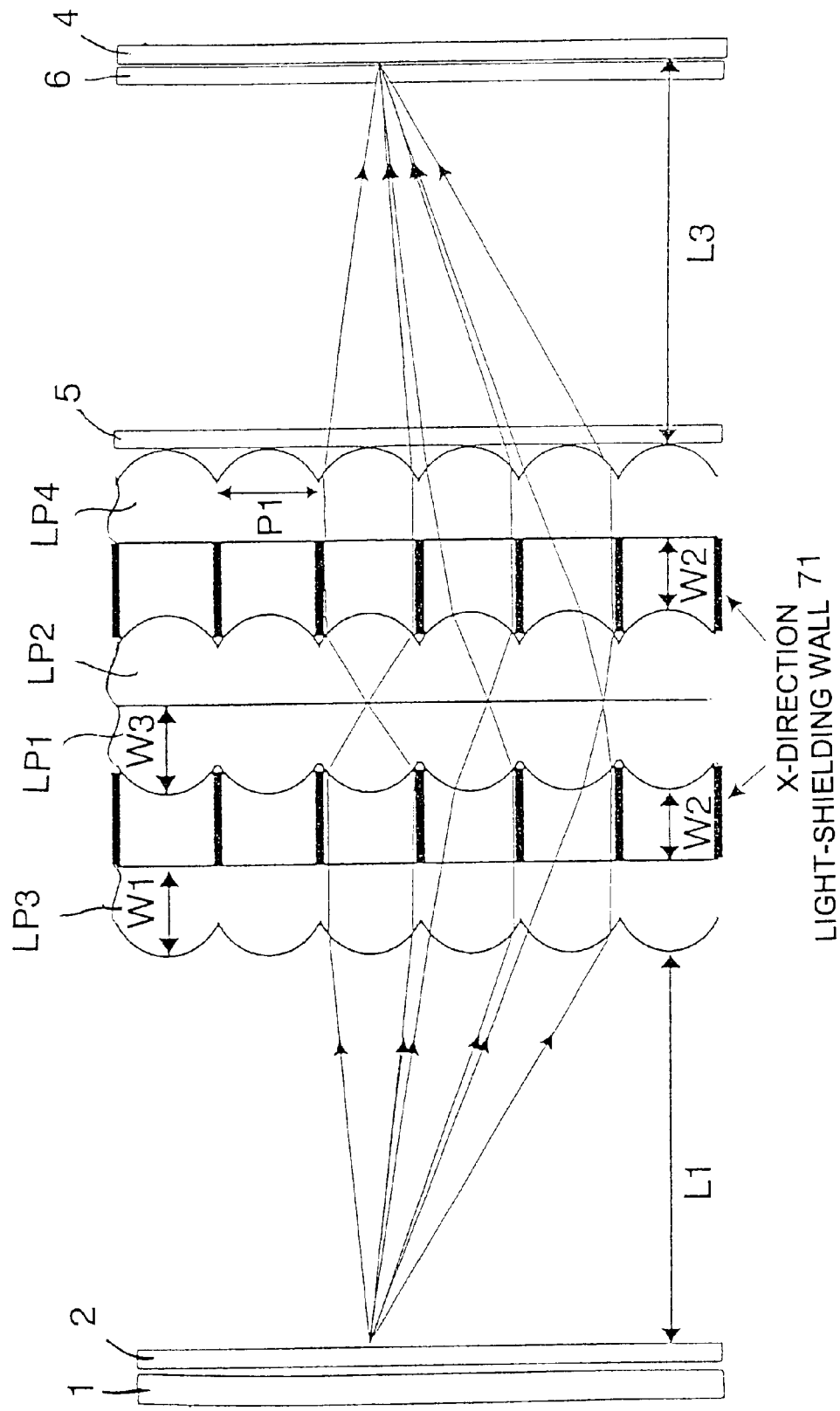
FIG. 41 is a sectional view of an optical device with inserted light-shielding walls in accordance with the present invention as seen in the Y-axis direction.
Figure 42:
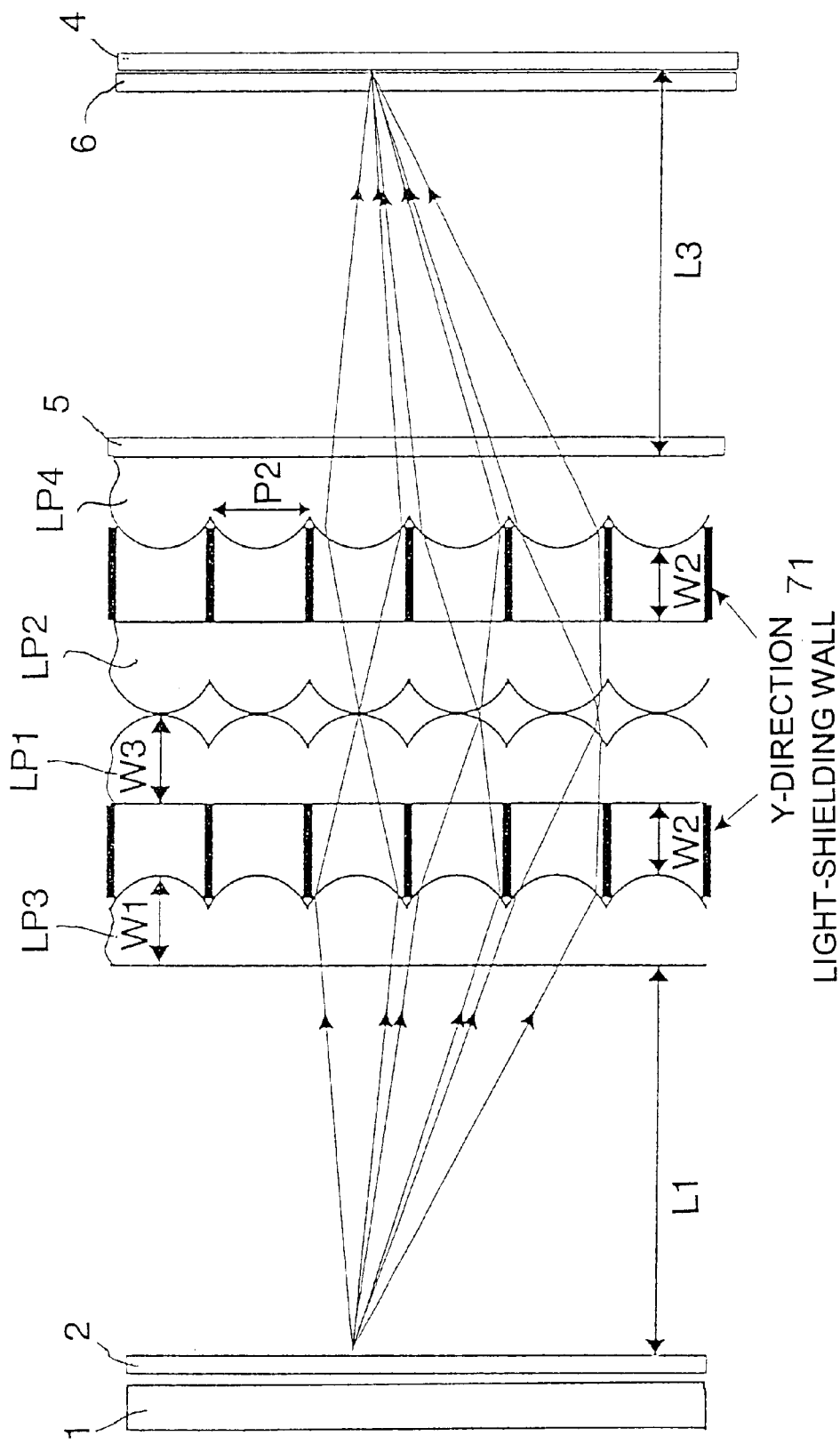
FIG. 42 is a sectional view of an optical device with inserted light-shielding walls in accordance with the present invention as seen in the X-axis direction.
Figure 43:
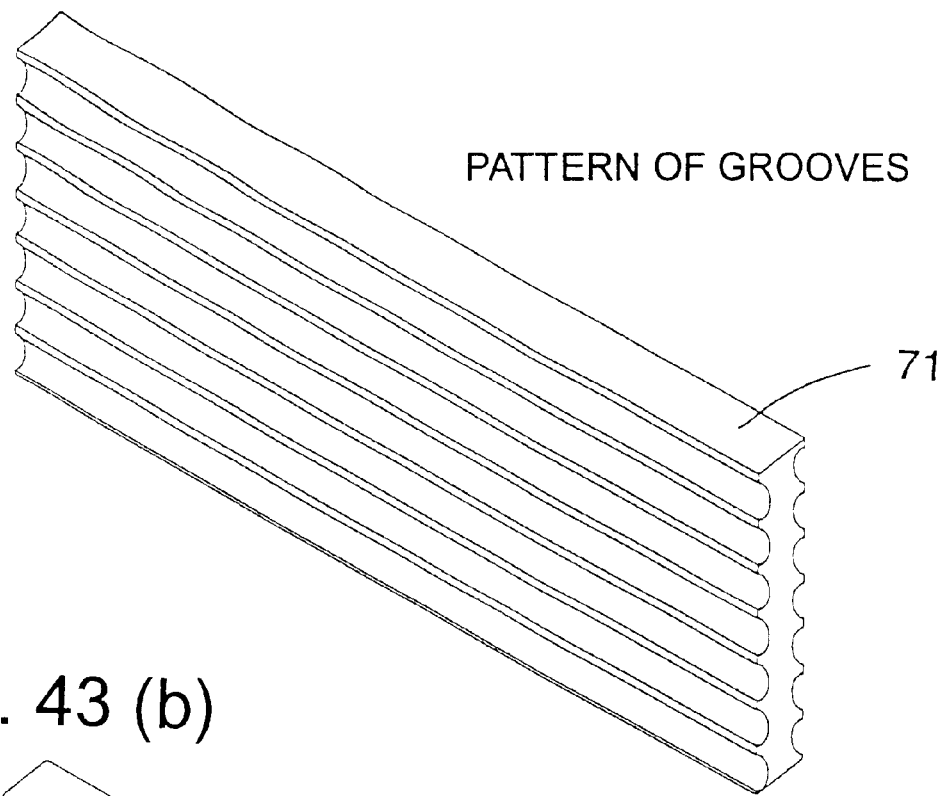
FIGS. 43(a) and 43(b) are perspective views of examples in which a plate-form member of a light-shielding wall has a light-scattering wall face in accordance with the present invention.
Figure 43:
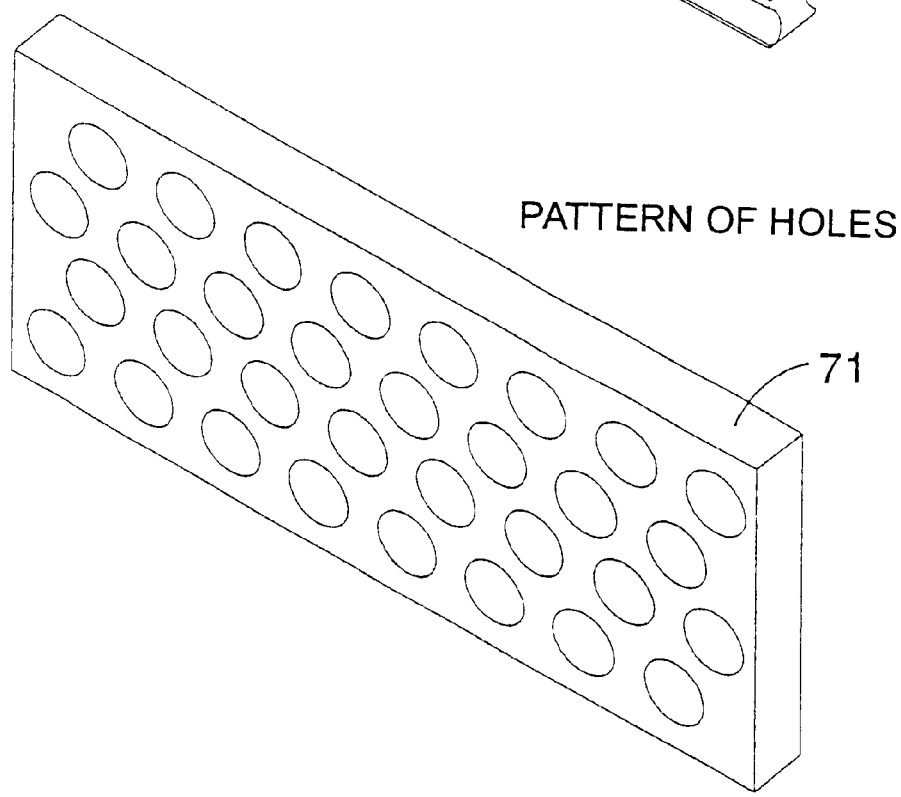

FIG. 41 shows a sectional view of an optical device with light-shielding walls inserted therein as in FIG. 37 as seen in the Y-axis direction (from above). FIG. 42 shows a sectional view of the optical device with the light-shielding walls inserted therein as seen in the X-axis direction (in the lateral direction).

The light-shielding walls 71 can prevent the cross talk to adjacent lenses effectively since they have a height almost equal to the distance between the cylindrical lenses+the sag depth of the lenses. Also since the light-shielding members 71a and 71b are placed at the joints of the lenses as shown in FIG. 37 and FIG. 40, the joints of the lenses can also be shielded from light. Further the light-shielding member can be easily placed between the cylindrical lens arrays only by positioning and bonding the light-shielding wall guide jigs 72 to the end portions of one cylindrical lens plate (e.g., LP3) so that the slits 73 are positioned at the joints of the lenses, as shown in FIG. 37, and inserting into the slits 73 the members 71b of the light-shielding wall 71 assembled in the matrix form.

The above-described light-shielding wall guide jig 72 and plate-form members 71a and 71b may be fabricated using a stainless thin plate. For example, the stainless thin plate is etched to form the shapes of the plate-form members 71a and 71b, and then electroplating is carried out with black chromium or black nickel. This electroplating of the entire surface of the light-shielding wall 71 with a black material renders the surface low-reflective.

Also, for rendering the surface low-reflective, various means can be used such as black non-electrolytic nickel plating, coloring with a black paint and the like in addition to the above-mentioned electroplating. Further, as methods for producing the plate-form members 71a and 71b of the light-shielding wall, can be used a method of punching a black acrylic plate or the like in a desired configuration with a press mold, a method of cutting a black acrylic plate or the like with a laser and the like.

Further, by rendering low-reflective the wall aces of the plate-form members 71a and 71b of the light-shielding wall, it is possible to suppress the generation of ghosts by light reflected by the wall faces. For making low-reflective faces, for example, a black paint may be applied to the wall faces of the plate-form members 71a and 71b or the wall faces may be formed into scattering faces by providing a pattern of a great number of depressions and projections.

FIGS. 43(a) and 43(b) are perspective views of examples of making the wall faces of the plate-form member of the light-shielding wall into scattering faces in accordance with the present invention. FIG. 43(a) shows an example in which a groove pattern is formed on the surface of the wall face, and FIG. 43(b) shows an example in which a depression pattern is formed on the surface of the wall face. In addition to these, the wall face may be made into a rough face provided with a pattern of a large number of fine depressions and projections.

Figure 44:
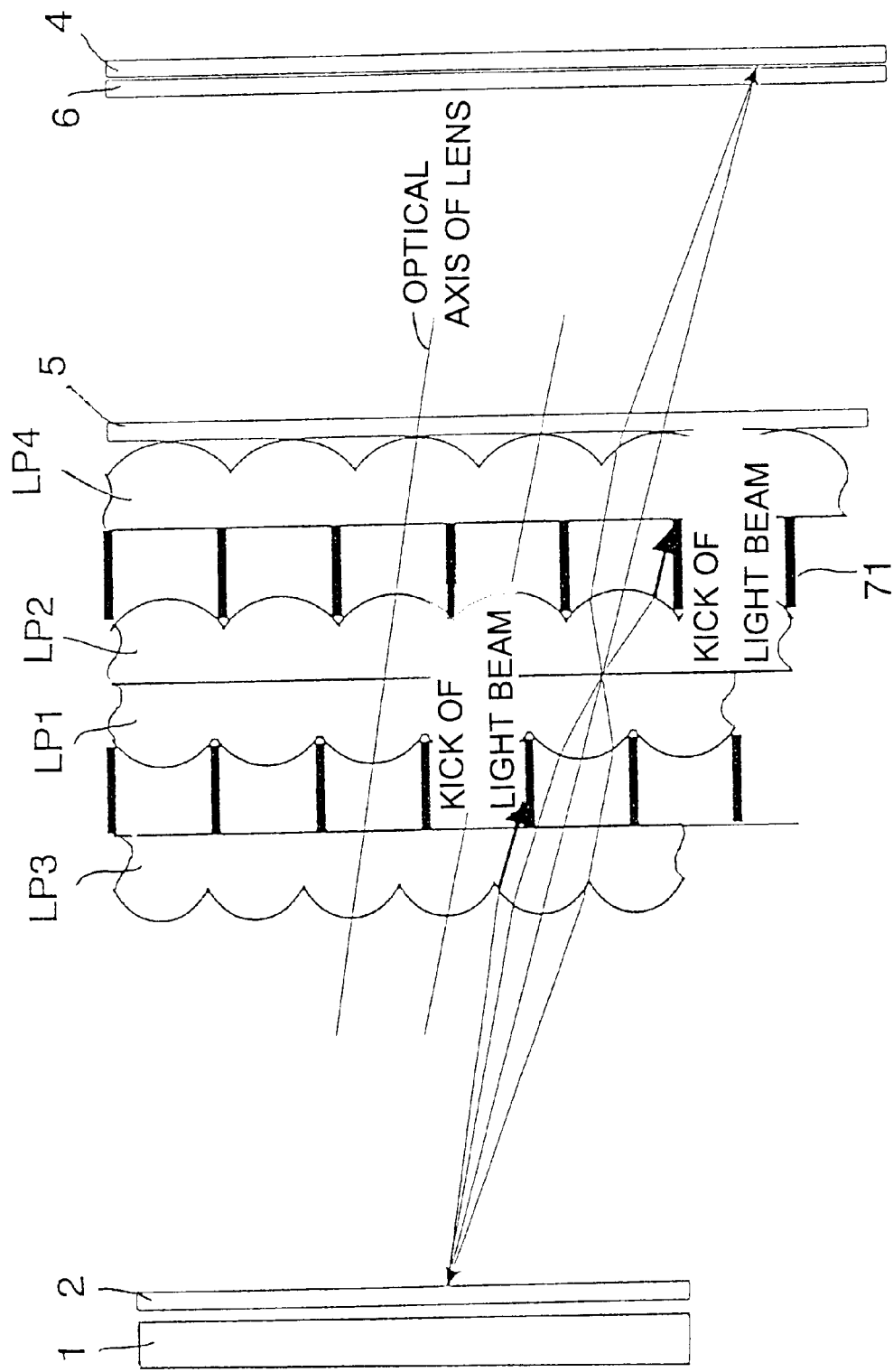
FIG. 44 is a view illustrating a kick of a light beam.

In the optical device shown in FIG. 37, FIG. 41 and FIG. 42, the optical axes of all the lenses of the four cylindrical lens plates are in parallel. However, in the case of the magnifying optical system in which the optical axes of the lenses of the cylindrical lens array are inclined in the peripheral part as shown in FIG. 28, if a light-shielding wall as shown in FIG. 37 is used, a kick is generated by the light-shielding wall in light beams which should contribute to the image formation. FIG. 44 shows a view illustrating "the kick of light beams." If such a kick takes place, the image on the screen darkens and in particular the image darkens remarkably in the peripheral part of the cylindrical lens plate where the optical axes are greatly inclined.

Therefore, in the case where the optical axes of lenses are inclined, the plate-form members 71a and 71b are preferably inclined so that they substantially agree with the inclination of the optical axes of the lenses in the vicinity of a place where the members are placed, for preventing the kick of light beams.

Figure 45:
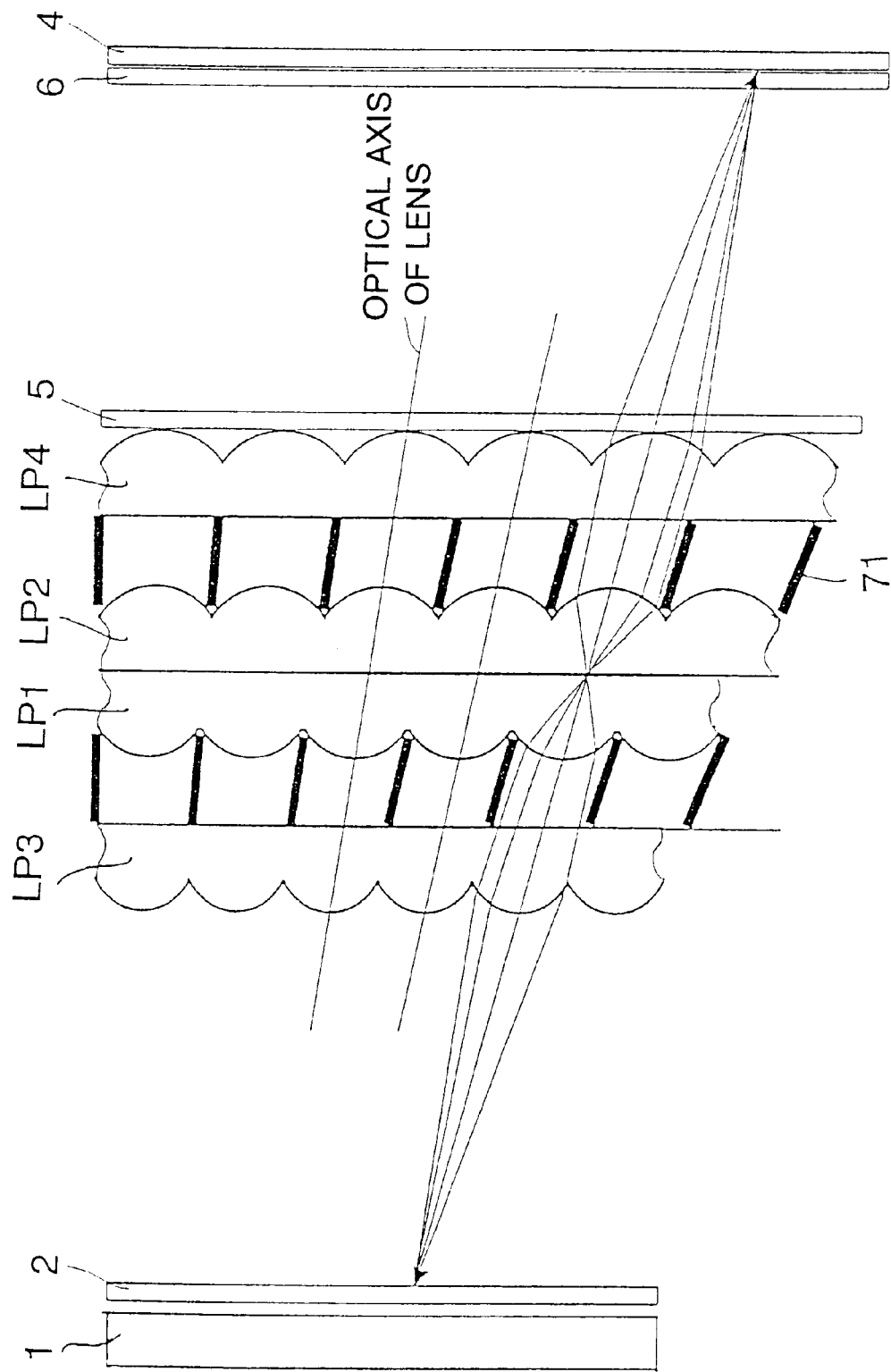
FIG. 45 is a sectional view of an example of an optical device in accordance with the present invention in which plate-form members of light-shielding walls are inclined according to optical axes.

FIG. 45 is a sectional view of an example of an optical device in accordance with the present invention in which the plate-form members of the light-shielding wall are inclined in accordance with the optical axes. With this construction, the image does not darken because the kick of light beams does not occur.

Figure 46:
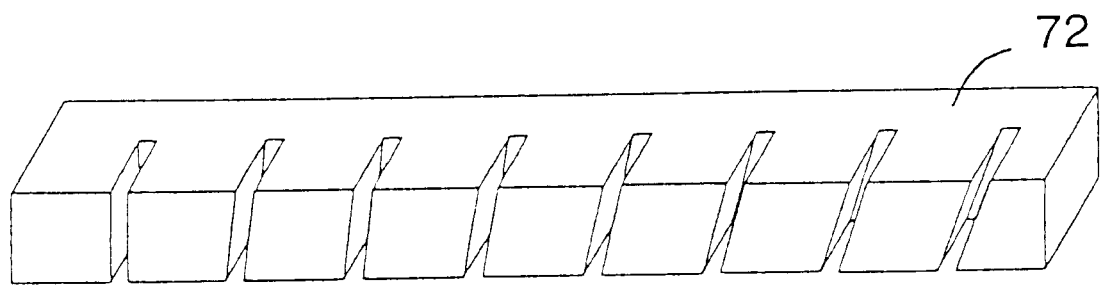
FIG. 46 is a perspective view of an example of a jig for guiding a light-shielding wall whose slits are inclined.

FIG. 46 shows a perspective view of an example of a light-shielding wall guide jig with inclined slits in the present invention. Here the inclination of each slit may be set substantially equal to the optical axis of a lens near the slit. With use of this jig, the plate-form members of the light-shielding wall can be easily arranged inclinedly.

The light-shielding members shown in FIG. 36 to FIG. 46 are introduced between the outside cylindrical lens plate and the inside cylindrical lens plate (between LP3 and LP1 and between LP4 and LP2). However, a like light-shielding member may be introduced between the inside cylindrical lens plates LP1 and LP2 for preventing the cross talk at the joint between the inside cylindrical lens plates.

Figure 47:
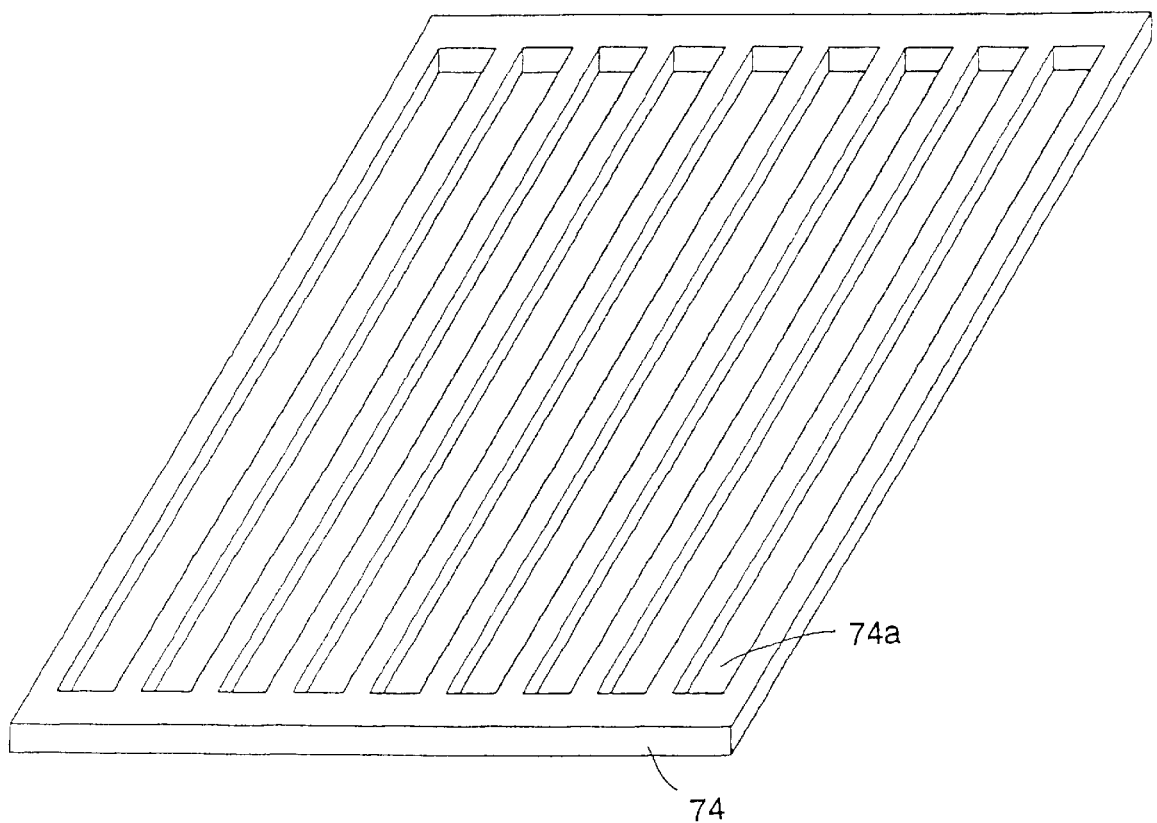
FIG. 47 is a perspective view of a light-shielding member with slits in accordance with the present invention.

Since the generatrices of the lenses on the opposing faces of the inside cylindrical lens plates LP1 and LP2 agree with each other in direction, a slit-form light-shielding member 74 as shown in FIG. 47 may be used, for example. This light-shielding member 74 may be placed between the lens plates LP1 and LP2 so that the longitudinal direction of slits agrees with the direction of the generatrices of the lenses as shown in FIG. 48.

Figure 48:
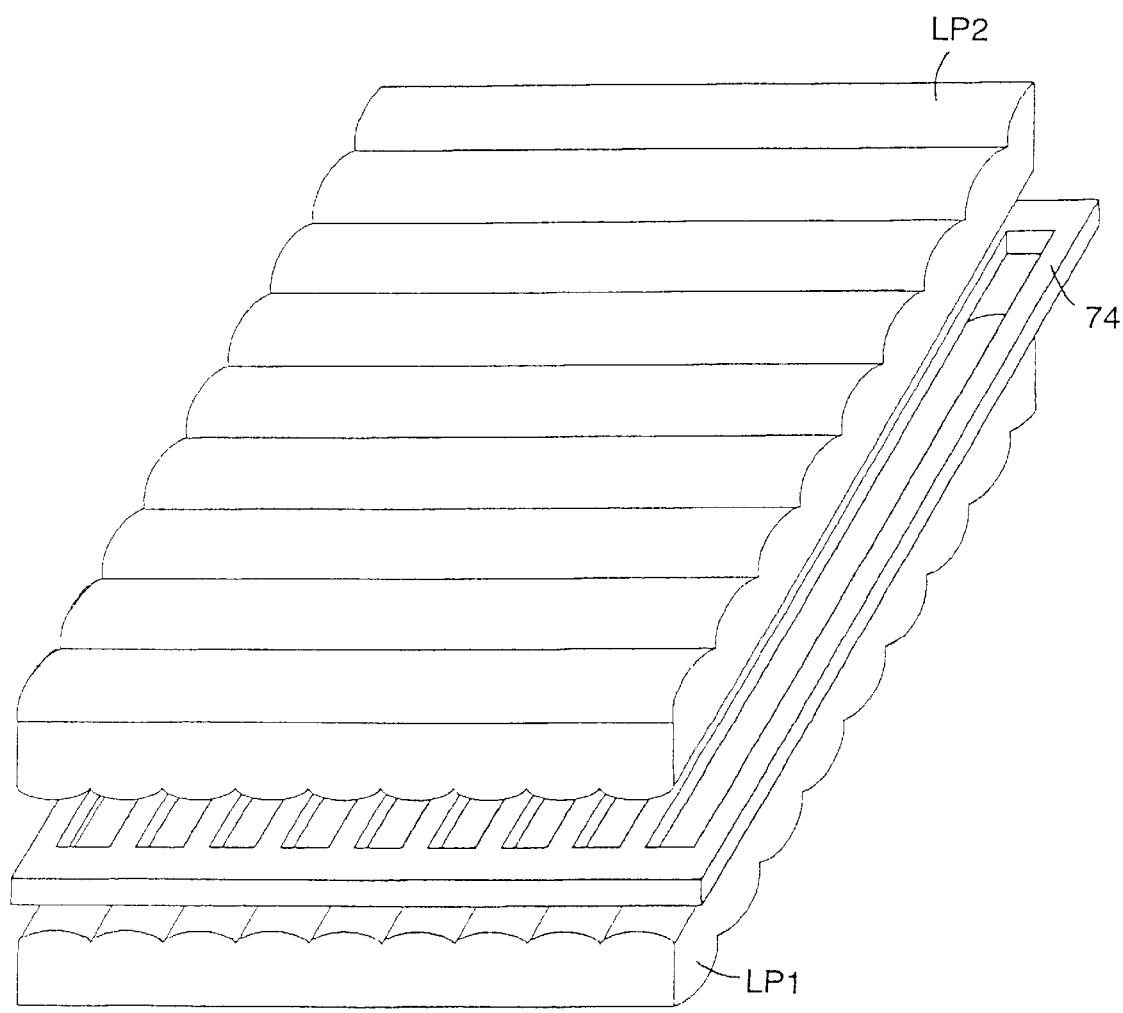
FIG. 48 is a perspective view of a construction in which a light-shielding member with slits is inserted between lens plates in accordance with the present invention.

In FIG. 48, the light-shielding member 74 is shown as being shifted in the direction of the generatrices of the lenses in order to be seen easily. However, actually, the light-shielding members 74 and the lens plates are put together in such a manner that each lens is received exactly in a slit 74a and an outside frame in the longitudinal direction of the slit 74a sticks out of the lens plates. Here, in the case of the optical system of FIG. 32 in which the pitch of the lenses of the lens plates LP1 and LP2 is set to 2.6 mm, the slit width of the light-shielding member 74 may be about 2.4 mm.

Figure 49:
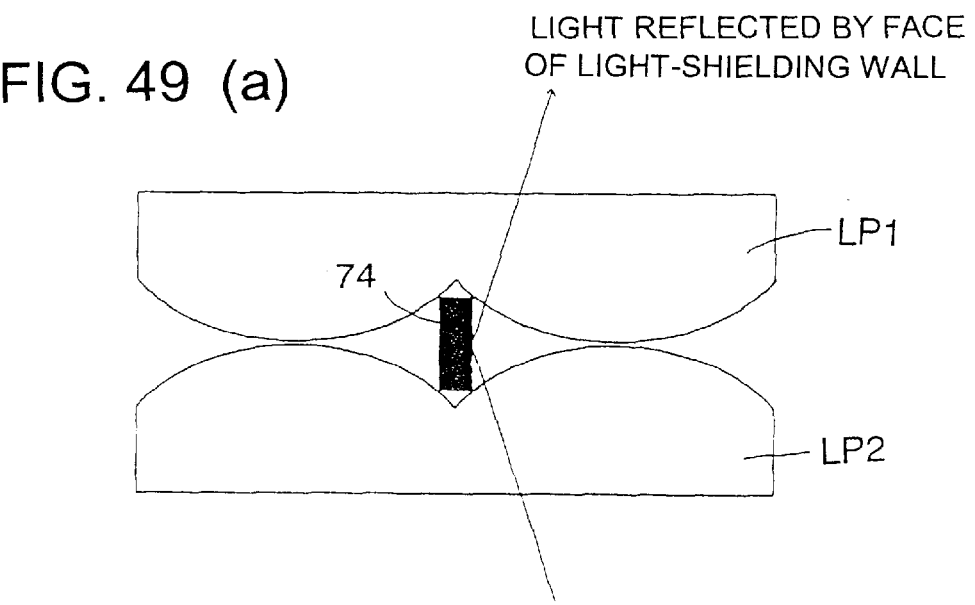
FIGS. 49(*a*) to 49(*c*) are sectional views illustrating constructions of two lens plates and a light-shielding member as shown in FIG. 48.
Figure 49:
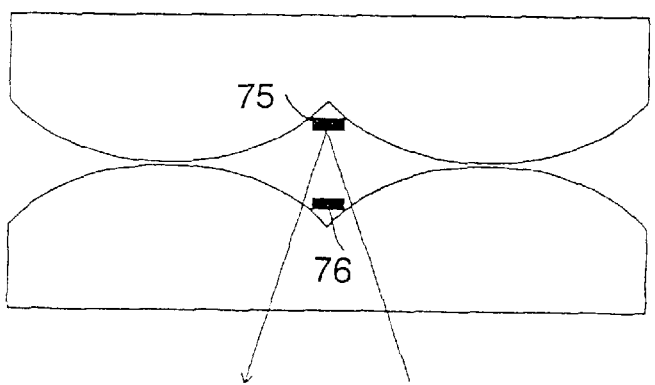
Figure 49:
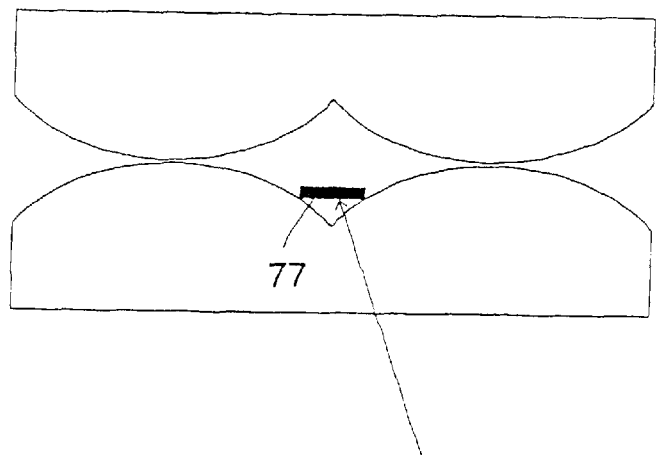

FIG. 49(a) shows a sectional view of the construction of the two lens plates and the light-shielding member shown in FIG. 48. By thus providing the light-shielding member 74 between the inside lens plates LP1 and LP2, it is possible to prevent the cross talk from adjacent lenses. However, if the cross talk by light reflected by the wall faces of the light-shielding member 74 is a problem as shown in FIG. 49(a), the wall faces are preferably provided with a pattern as in FIG. 43. Alternatively, belt-form light-shielding members (light-shielding belts) 75 and 76 may be disposed at the joints of the lenses, as shown in FIG. 49(b), or belt-form light-shielding members 77 may be disposed at the joints of lenses only on one of the lens plates.

The light-shielding belts of FIGS. 49(b) and 49(c) cannot prevent the cross talk completely as that of FIG. 49(a). However, in the case where the wall faces of the light-shielding member 74 shown in FIG. 49(a) produce non-negligible ghosts by their reflection, the light-shielding belts of FIGS. 49(b) and 49(c) are effective for suppressing the ghosts, if a ghost intensity is within an acceptable range.

Further, as shown in FIG. 49(a), since the light-shielding member 74 is supported by curved faces of the lenses at the joints of the lenses, its support position is unstable and the image formation is sometimes affected adversely. In such cases, protrusions 78 may be formed at the joints of the lenses of both the lens plates LP1 and LP2 to stabilize the position of the light-shielding member 74, as shown in FIG. 50(a). The protrusions 78 can be formed integrally with the lenses, by providing the mold for forming the lenses with shapes reverse to the protrusions.

Figure 50:
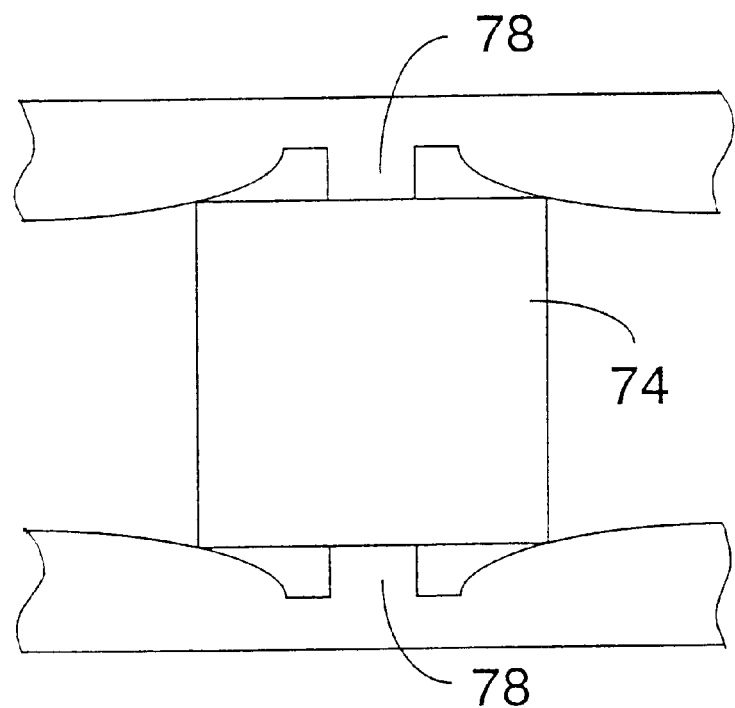
FIGS. 50(*a*) and 50(*b*) are sectional views of examples of constructions for securing a light-shielding member at a joint between lenses of lens plates.
Figure 50:
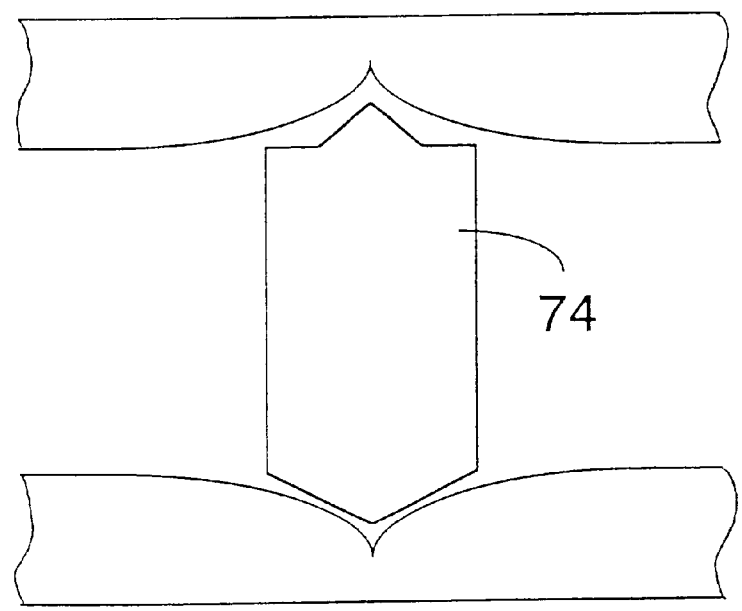

Alternatively, the upper and lower faces of the light-shielding member 74 may be formed with projections capable of engaging with the joints of the lenses to stabilize the position of the light-shielding member 74, as shown in FIG. 50(b). By thus providing the protrusions or the projections as shown in FIGS. 50(a) or 50(b), it is possible to position the slit-form light-shielding member 74 exactly at the joints of the lenses. The light-shielding members and belts shown in FIG. 47 to FIG. 50 may be produced of stainless steel treated by black chromium plating or the like.

In the above examples, explanation has been given mainly of the cases where the light-shielding wall 71 is arranged using the light-shielding wall guide jig 72, but a light-shielding member in the form of a two-dimensional lattice may be used instead of the light-shielding wall 71 and the jig 72 of FIG. 37.

Figure 51:
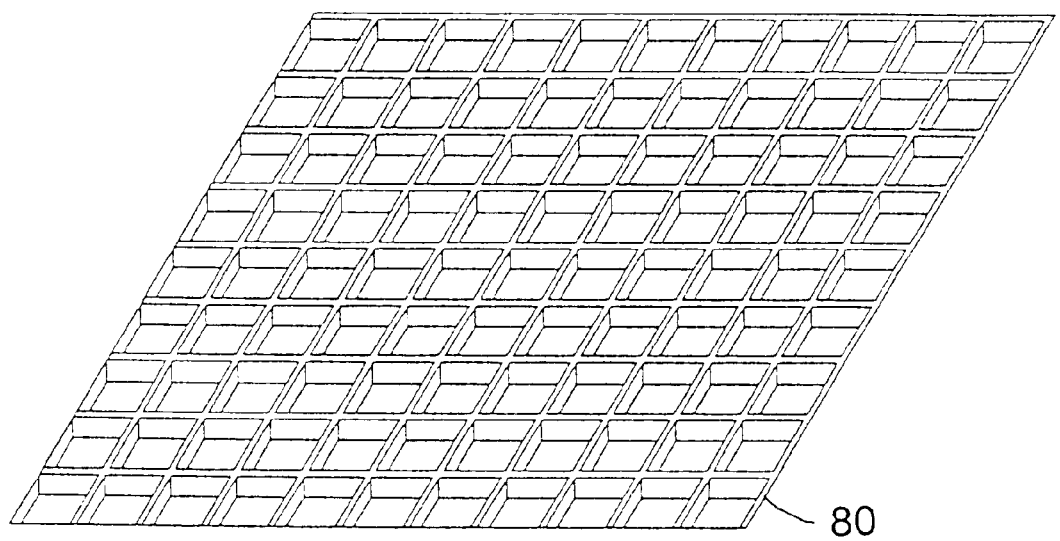
FIG. 51 is a perspective view of an example of a light-shielding member in a two-dimensional lattice form in accordance with the present invention.

FIG. 51 shows a perspective view of an example of a two-dimensional lattice-form light-shielding member 80. Wall intervals of the lattice in the vertical and lateral directions may be set to agree with the lens pitches in those directions. With regard to this two-dimensional lattice-form light-shielding member 80, light-shielding walls of the two-dimensional lattice can be formed in one piece by photolithography using an ultraviolet-setting resin as a material. Therefore, the assembly process is easier as compared with the light-shielding member of FIG. 37.

Figure 52:
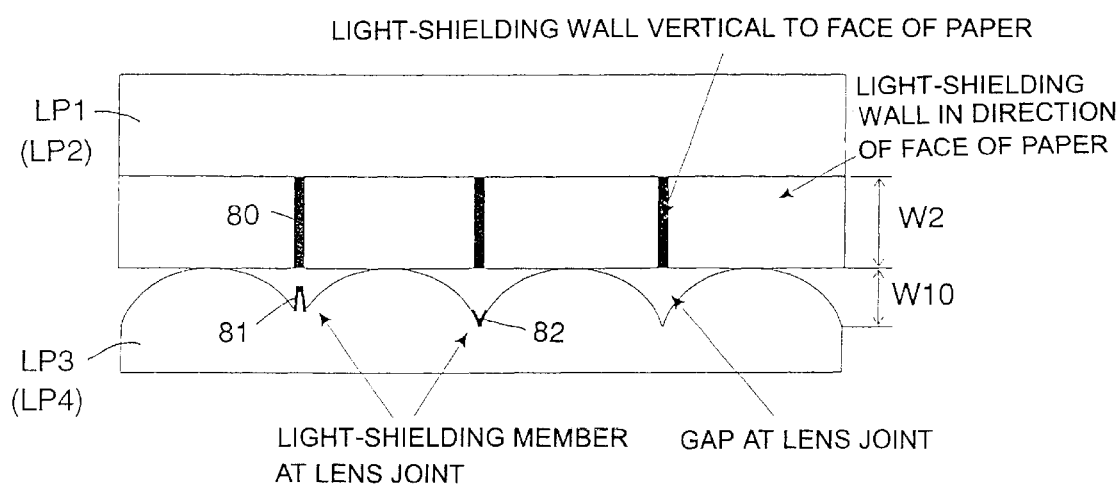
FIG. 52 is a sectional view of a light-shielding member in a two-dimensional lattice form which is inserted between lenses in accordance with the present invention.

FIG. 52 is a sectional view of the two-dimensional lattice-form light-shielding member 80 which is inserted between lenses. The thickness of this light-shielding member 80 is equal to the distance (w2) between the lens plates. Accordingly, since the light-shielding member does not exist at portions corresponding to the sag depth of the lenses below the light-shielding member 80, the cross talk to adjacent lenses may take place from gaps at those portions. In the case where influence of this cross talk is a problem, light-shielding members 81 or 82 as shown in FIG. 52 may be provided at the joints of the lenses separately from the light-shielding member 80.

The two-dimensional lattice-form light-shielding member 80 may also be produced with a mold of a resin material. As resin materials, may be used acrylic resin, polycarbonate, ABS resin, liquid crystal polymer with good fluidity and the like. These resin materials are preferably black ones. However, they may be blackened by plating, painting, dyeing or the like after being formed. The production of two-dimensional lattice-form light-shielding member with the mold can also facilitate the assembly process. Furthermore, in the case where the ultraviolet-setting resin is used, the light-shielding members projecting to the lens sag-corresponding portions as shown in FIG. 52 cannot be integrally formed, but in the case where the mold is used, it is possible to produce a two-dimensional lattice-form light-shielding member integrally with projections at the lens sag-corresponding portions by previously forming grooves corresponding to the lens sag-corresponding portions. Thereby, the assembly process is further facilitated and the accuracy in the assembly can be improved. Therefore, the use of the mole is extremely preferred as a process for producing the light-shielding member.

As discussed with reference to FIG. 32 to FIG. 52, it is possible to prevent the cross talk from adjacent lenses and form a clear image on the screen, by placing light-shielding members of various forms at the joints of the lenses.

With the above-described optical devices of FIG. 14, FIG. 15 and FIG. 16, examples have been shown which have different pitches for the lens arrays between the X and Y directions according to the properties of the light source of the backlight 1 for the purpose of preventing the occurrence of ghosts. However, the use of the above-described light-shielding member 7 eliminates the need to design such complicated lenses having different lens pitches. It is also possible to realize an optical device of smaller pitch and to obtain good image formation characteristics (clearness).

According to the present invention, since the optical device is provided with the image formation unit including lens substrates formed with cylindrical lens arrays on their front and rear faces, the production of the optical device is easier than that of the conventional one, the production costs can be reduced and the optical device can be reduced in size and weight.

Also, with regard to the optical device of the magnified image formation system of the present invention, since the Fresnel concave lens is placed adjacently to the display face of the display unit, the utilization efficiency of light around the Fresnel concave lens can be improved and the optical device can be reduced in size.

According to the present invention, since lens plates constituting the image formation unit are arranged in close contact to each other without intervention of spacer plates, the reduction in size and weight can further be promoted as compared with the case where spacer plate are used, and the assembly process can be facilitated.

Also according to the present invention, in the optical device of the magnified image formation system, since the optical axes of the lenses formed on the surface of the lens substrates constituting the image formation unit of the optical device are set to agree with the traveling direction of light passing near the apexes of the lenses, the brightness and clearness of images can be improved.

What is claimed is:

1. An optical device characterized by comprising:
   an image formation unit having a plurality of lens substrates each formed with lens arrays on both a front face and a rear face thereof; and
   a display unit disposed on an object side with respect to the image formation unit for displaying an image to be projected by the image formation unit,
   wherein, on each of said plurality of lens substrates, the lens array on both the front and rear faces are cylindrical lens arrays, and the generatrix of the cylindrical array formed on the front face and the generatrix of the cylindrical array formed on the rear face are orthogonal to each other.

2. An optical device as set forth in claim 1 characterized in that said plurality of lens substrates are constructed of:
   a first lens substrate;
   a second lens substrate having the same lens shape as that of the lens array on the first lens substrate and disposed adjacently to the first lens substrate so that the generatrix of the lens array on a face opposing to the first lens substrate is parallel to the generatrix of the lens array on an opposing face of the first lens substrate;
   a third lens substrate disposed adjacently to the first lens substrate on a different side from a second lens substrate side with respect to the first lens substrate so that the generatrix of the lens array on a face opposing to the first lens substrate is orthogonal to the generatrix of the lens array on an opposing face of the first lens substrate; and
   a fourth lens substrate having the same lens shape as that of the lens array on the third lens substrate and disposed adjacently to the second lens substrate on a different side from a first lens substrate side with respect to the second lens substrate so that the generatrix of the lens array on a face opposing to the second lens substrate is orthogonal to the generatrix of the lens array on an opposing face of the second lens substrate.

3. An optical device as set forth in claim 2 characterized by further comprising a Fresnel concave lens in the vicinity of a surface of the image formation unit opposite to a surface thereof opposing to the display unit.

4. An optical device as set forth in claim 1 characterized by further comprising a Fresnel concave lens disposed between the image formation unit and the display unit adjacently to a display face of the display unit.

5. An optical device as set forth in claim 4 characterized in that said plurality of lens substrates are constructed of:
   a first lens substrate;
   a second lens substrate disposed adjacently to the first lens substrate so that the generatrix of the lens array on a face opposing to the first lens substrate is parallel to the generatrix of the lens array on an opposing face of the first lens substrate;
   a third lens substrate disposed adjacently to the first lens substrate on a different side from a second lens substrate side with respect to the first lens substrate so that the generatrix of the lens array on a face opposing to the first lens substrate is orthogonal to the generatrix of the lens array on an opposing face of the first lens substrate; and
   a fourth lens substrate disposed adjacently to the second lens substrate on a different side from a first lens substrate side with respect to the second lens substrate so that the generatrix of the lens array on a face opposing to the second lens substrate is orthogonal to the generatrix of the lens array on an opposing face of the second lens substrate, and
   the pitch of the lens array on lens substrate disposed the nearest to the display unit is the smallest and the pitches of the lens arrays on the lens substrates are set such that they are gradually larger as the lens substrates are farther from the display unit.

6. An optical device as set forth in claim 2 or 5 characterized in that the first lens substrate and the second lens substrate are in close contact.

7. An optical device as set forth in claim 1 or 4 characterized in that the display unit emits light in a direction toward the image formation unit, a major part of the light is included within angles of radiation of ±20 degrees or less with respect to the direction toward the image formation unit, and each of the lens arrays formed on the four lens substrates has a lens aperture width and a lens pitch such that cross talk between adjacent lenses of the lens array is capable of being prevented.

8. An optical device as set forth in claim 2 or 5 characterized in that spacer plates are disposed between the first lens substrate and the third lens substrate and between the second lens substrate and the fourth lens substrate.

9. An optical device as set forth in claim 8 characterized in that the spacer plates have a number of openings in a lattice form.

10. A display device formed of a plurality of optical devices as recited in claim 1 in combination, characterized in that each of the optical devices is an optical device in which said plurality of lens substrates are constructed of a first lens substrate; a second lens substrate having the same lens shape as that of the lens array on the first lens substrate and disposed adjacently to the first lens substrate so that the generatrix of the lens array on a face opposing to the first lens substrate is parallel to the generatrix of the lens array on an opposing face of the first lens substrate; a third lens substrate disposed adjacently to the first lens substrate on a different side from a second lens substrate side with respect to the first lens substrate so that the generatrix of the lens array on a face opposing to the first lens substrate is orthogonal to the generatrix of the lens array on an opposing face of the first lens substrate; and a fourth lens substrate having the same lens shape as that of the lens array on the third lens substrate and disposed adjacently to the second lens substrate on a different side from a first lens substrate side with respect to the second lens substrate so that the generatrix of the lens array on a face opposing to the second lens substrate is orthogonal to the generatrix of the lens array on an opposing face of the second lens substrate, and which optical device further comprises a Fresnel concave lens in the vicinity of a surface of the image formation unit opposite to a surface thereof opposing to the display unit.

11. A display device formed of a plurality of optical devices as recited in claim 1 in combination, characterized in that each of the optical devices further comprises a Fresnel concave lens between the image formation unit and the display unit adjacently to a display face of the display unit.

12. A display device formed of a plurality of optical devices as recited in claim 1 in combination, characterized in that each of the optical devices is either an optical device in which said plurality of lens substrates are constructed of a first lens substrate; a second lens substrate having the same lens shape as that of the lens array on the first lens substrate and disposed adjacently to the first lens substrate so that the generatrix of the lens array on a face opposing to the first lens substrate is parallel to the generatrix of the lens array on an opposing face of the first lens substrate; a third lens substrate disposed adjacently to the first lens substrate on a different side from a second lens substrate side with respect to the first lens substrate so that the generatrix of the lens array on a face opposing to the first lens substrate is orthogonal to the generatrix of the lens array on an opposing face of the first lens substrate; and a fourth lens substrate having the same lens shape as that of the lens array on the third lens substrate and disposed adjacently to the second lens substrate on a different side from a first lens substrate with respect to the second lens substrate so that the generatrix of the lens array on a face opposing to the second lens substrate is orthogonal to the generatrix of the lens array on an opposing face of the second lens substrate, and which optical device further comprises a Fresnel concave lens in the vicinity of a surface of the image formation unit opposite to a surface thereof opposing to the display unit, or an optical device in which said plurality of lens substrates are constructed of a fifth lens substrate; a sixth lens substrate disposed adjacently to the fifth lens substrate so that the generatrix of the lens array on a face opposing to the fifth lens substrate is parallel to the generatrix of the lens array on an opposing face of the fifth lens substrate; a seventh lens substrate disposed adjacently to the fifth lens substrate on a different side from a sixth lens substrate side with respect to the fifth lens substrate so that the generatrix of the lens array on a face opposing to the fifth lens substrate is orthogonal to the generatrix of the lens array on an opposing face of the fifth lens substrate; and an eighth lens substrate disposed adjacently to the sixth lens substrate on a different side from a fifth lens substrate with respect to the sixth lens substrate so that the generatrix of the lens array on a face opposing to the sixth lens substrate is orthogonal to the generatrix of the lens array on an opposing face of the sixth lens substrate, the pitch of the lens array on the lens substrate disposed the nearest to the display unit is the smallest, and the pitches of the lens arrays on the fifth to eight lens substrates are set such that they are gradually larger as the lens substrates are farther from the display unit, and which display device further comprises a Fresnel concave lens disposed between the image formation unit and the display unit adjacently to a display surface of the display unit.

13. An optical device as set forth in claim 2 or 5 characterized in that the first lens substrate and the third lens substrate, the first lens substrate and the second lens substrate, and the second lens substrate and the fourth lens substrate are in close contact, respectively.

14. An optical device as set forth in claim 13 characterized in that the display unit emits light in a direction toward the image formation unit, a major part of the light is included within angles of radiation of ±20 degrees or less with respect to the direction toward the image formation unit, and each of the lens arrays formed on the four lens substrates has a lens aperture width and a lens pitch such that cross talk between adjacent lenses of the lens array is capable of being prevented.

15. An optical device as set forth in claim 14 characterized in that, in the case where the angle of radiation of the light emitted by the display unit varies in two predetermined directions, image formation regarding a direction in which the angle of radiation is larger is effected by a lens on a surface on a display unit side of the third lens substrate which is the nearest to the display unit, a lens on a surface on a display unit side of the first lens substrate, a lens on a surface on a projection face side of the second lens substrate and a lens on a surface on a projection face side of the fourth lens substrate, and image formation regarding a direction orthogonal to the direction in which the angle of radiation is larger is effected by a lens on a surface on a projection face side of the third lens substrate which is the nearest to the display unit, a lens on a surface on a projection face side of the first lens substrate, a lens on a surface on a display unit side of the second lens substrate and a lens on a surface on a display unit side of the fourth lens substrate.

16. An optical device as set forth in claim 13 characterized in that protrusions are formed at joints of lenses of the lens array on opposing surfaces of two lens substrates in close contact.

17. An optical device as set forth in claim 16 characterized in that the protrusions are provided at least with a region whose height is different from the height of the lenses in a part thereof.

18. An optical device as set forth in claim 16 characterized in that the protrusions have not flat but scattering side faces.

19. An optical device as set forth in claim 16 characterized in that the protrusions are formed of a material having a low light reflectance.

20. An optical device as set forth in claim 16 characterized in that the protrusions are arranged at proper intervals such that, when the two lens substrates are brought in close contact, the two lens substrates engage with each other by the protrusions.

21. An optical device as set forth in claim 16 characterized in that a pattern for alignment is formed at certain locations in the protrusions.

22. An optical device characterized by comprising:

an image formation unit having two lens substrates with a plurality of lenses formed on both a front face and a rear face thereof; and a display unit disposed on an object side with respect of the image formation unit for displaying an image to be projected by the image formation unit, wherein, on each of the lens substrates, the lenses are so arranged two-dimensionally on the front and rear faces that optical axes of a pair of opposing lenses on the front and rear faces agree with each other.

23. An optical device as set forth in claim 22 characterized in that the plurality of lenses formed on the front and rear faces of the lens substrates are arranged at the highest density.

24. An optical device as set forth in claim 22 characterized in that an arrangement pitch of the plurality of lenses is varied in every direction of two-dimensional arrangement in correspondence with an angle of radiation of light emitted by the display unit.

25. An optical device as set forth in claim 1 or 22 characterized in that each of the lens substrates has a lens section which is a surface layer of the lens substrate and has a lens function and a base section not having the lens function, and the lens section has a larger refractive index than the base material section.

26. An optical device characterized by comprising:
an image formation unit having a plurality of lens substrates each formed with lens arrays on both a front face and a rear face thereof;
a display unit disposed on an object side with respect to the image formation unit for displaying an image to be projected by the image formation unit;
a Fresnel concave lens between the image formation unit and the display unit adjacently to a display face of the display unit,
wherein each lens of each of the lens arrays is so formed that its optical axis substantially agrees with a traveling direction of light passing near the apex of the lens.

27. An optical device as set forth in claim 26 characterized in that parameters of every lens of the lens arrays are so adjusted that image-formation characteristics of the lens are optimized with regard to light passing at and near the apex of the lens.

28. An optical device as set forth in claim 26 characterized in that the lens arrays formed on both the front and rear faces of each of said plurality of lens substrates are cylindrical lens arrays, and the generatrix of the cylindrical lens array formed on one face is orthogonal to the generatrix of the cylindrical lens array formed on the other face.

29. An optical device as set forth in claim 28 characterized in that said plurality of lens substrates are constructed of:
a first lens substrate;
a second lens substrate having the same lens shape as that of the lens array on the first lens substrate and disposed adjacently to the first lens substrate so that the generatrix of the lens array on a face opposing to the first lens substrate is parallel to the generatrix of the lens array on an opposing face of the first lens substrate;
a third lens substrate disposed adjacently to the first lens substrate on a different side from a second lens substrate side with respect to the first lens substrate so that the generatrix of the lens array on a face opposing to the first lens substrate is orthogonal to the generatrix of the lens array on an opposing face of the first lens substrate; and
a fourth lens substrate having the same lens shape as that of the lens array on the third lens substrate and disposed adjacently to the second lens substrate on a different side from a first lens substrate side with respect to the second lens substrate so that the generatrix of the lens array on a face opposing to the second lens substrate is orthogonal to the generatrix of the lens array on an opposing face of the second lens substrate.

30. An optical device as set forth in claim 29 characterized in that, in the case where the angle of radiation of light emitted by the display unit varies in two predetermined directions, image formation regarding a direction in which the angle of radiation is larger is effected by a lens on a surface on a display unit side of the third lens substrate which is the nearest to the display unit, a lens on a surface on a display unit side of the first lens substrate, a lens on a surface on a projection face side of the second lens substrate and a lens on a surface on a projection face side of the fourth lens substrate, and image formation regarding a direction orthogonal to the direction in which the angle of radiation is larger is effected by a lens on a surface on a projection face side of the third lens substrate which is the nearest to the display unit, a lens on a surface on a projection face side of the first lens substrate, a lens on a surface on a display unit side of the second lens substrate and a lens on a surface on a display unit side of the fourth lens substrate.

31. An optical device as set forth in claim 26 characterized in that the image formation unit is constructed of two lens substrates, and two-dimensional lens arrays are formed on both the front and rear faces of each of the lens substrates.

32. An optical device as set forth in claim 31 characterized in that in the two-dimensional lens arrays of the lens substrates, lenses of specific shape are arranged at the highest density.

33. An optical device as set forth in any one of claims 26 to 32 characterized in that an array pitch of the lens arrays on each of the lens substrates is larger in a peripheral part of the lens substrate than in a central part of the lens substrate.

34. An optical device as set forth in any one of claims 26 to 32 characterized in that protrusions are formed at joints of lenses of the lens arrays on each of the lens substrates.

35. A display device formed of a plurality of optical devices as recited in claim 26 for forming a magnified image on a screen placed at a distance from the image formation units of the optical devices, characterized in that a Fresnel convex lens is disposed between the image formation units and the screen adjacently to the screen.

36. An optical device characterized by comprising:
an image formation unit having a plurality of lens substrates each formed with cylindrical lens arrays on both a front face and a rear face thereof;
a display unit disposed on an object side with respect to the image formation unit for displaying an image to be projected by the image formation unit, and
a light-shielding member between opposing lens substrates, the light-shielding member being arranged at joints of lenses of the cylindrical lens arrays of opposing lens substrates.

37. An optical device as set forth in claim 36 characterized in that, between the opposing lens substrates, the light-shielding member comprises a support portion disposed at an end portion of the lens substrates and a light-shielding wall supported by the support portion and formed in a lattice form along the joints of lenses of the opposing lens substrates.

38. An optical device as set forth in claim 37 characterized in that the support portion has a groove with a width such that the light-shielding wall can be received and fixed in the groove.

39. An optical device as set forth in claim 38 characterized in that the groove of the support portion becomes wider at least at one end thereof at which the groove contacts the opposing lens substrates.

40. An optical device as set forth in claim 37 characterized in that the generatrices of the lenses of the cylindrical lens arrays formed on opposing surfaces of the opposing lens substrates are orthogonal to each other, and the light-shielding wall has a first plate-form member arranged along the joints of lenses of the cylindrical lens array on the opposing surface of one of the opposing lens substrates and a second plate-form member arranged along the joints of lenses of the cylindrical lens array on the other of the opposing lens substrates, the first plate-form member and the second plate-form member being combined orthogonally to each other in a lattice form.

41. An optical device as set forth in claim 36 characterized in that the light-shielding member is in a two-dimensional lattice form and walls of the lattice form are arranged between the opposing lens substrates to be positioned at the joints of lenses on the opposing lens substrates.

42. An optical device as set forth in claim 41 characterized by further comprising, at the joints of lenses of the cylindrical lens array of at least one of the opposing lens substrates, a light-shielding band extending in the same direction as the generatrix of the lens array.

43. An optical device as set forth in claim 37 characterized in that a wall surface of the light-shielding wall is provided with a pattern of a number of projections and depressions for scattering incident light.

44. An optical device as set forth in any one of claims 36 to 43 characterized in that the light-shielding member has a surface formed of stainless plated in black.

45. An optical device as set forth in any one of claims 36 to 43 characterized in that the light-shielding member is formed using a resinous mold.

\* \* \* \* \*